(12) United States Patent
Hara et al.

(10) Patent No.: US 9,550,463 B2
(45) Date of Patent: Jan. 24, 2017

(54) VEHICLE BODY END SECTION STRUCTURE

(71) Applicant: TOYOTA JIDOSHA KABUSHIKI KAISHA, Toyota-shi (JP)

(72) Inventors: Yasuhiro Hara, Toyota (JP); Tetsuo Nuruki, Toyota (JP); Yoichi Tamura, Nissin (JP); Nobuhisa Ishiyama, Nissin (JP); Hiroshi Mizuo, Toyota (JP); Shintaro Kitakata, Nissin (JP); Hiroshi Kato, Susono (JP); Yukio Oka, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/649,705

(22) PCT Filed: Dec. 9, 2013

(86) PCT No.: PCT/JP2013/083003
§ 371 (c)(1),
(2) Date: Jun. 4, 2015

(87) PCT Pub. No.: WO2014/088117
PCT Pub. Date: Jun. 12, 2014

(65) Prior Publication Data
US 2015/0298634 A1     Oct. 22, 2015

(30) Foreign Application Priority Data

Dec. 7, 2012 (JP) .................................. 2012-268758
Jul. 9, 2013 (JP) .................................. 2013-143782

(51) Int. Cl.
B60R 19/34     (2006.01)
B62D 21/15     (2006.01)
(Continued)

(52) U.S. Cl.
CPC ............ *B60R 19/34* (2013.01); *B60R 19/04* (2013.01); *B60R 19/24* (2013.01); *B62D 21/152* (2013.01);
(Continued)

(58) Field of Classification Search
CPC ...... B62D 21/152; B62D 25/085; B60R 19/34
(Continued)

(56) References Cited

U.S. PATENT DOCUMENTS 6,318,775 B1   11/2001   Heatherington et al.
8,544,589 B1   10/2013   Rupp et al.
(Continued)

FOREIGN PATENT DOCUMENTS

JP    S62-097066     6/1987
JP    10-203411 A    8/1998
(Continued)

OTHER PUBLICATIONS

International Search Report issued Jan. 28, 2014, in PCT/JP2013/083003, filed Dec. 9, 2013.
(Continued)

*Primary Examiner* — Jason S Morrow
(74) *Attorney, Agent, or Firm* — Oblon, McClelland, Maier & Neustadt, L.L.P.

(57) ABSTRACT

A vehicle body end section structure is obtained that enables a spacer member that transmits load to a framework member in a small overlap collision to be suppressed from impinging on a wheel in a minor collision. The vehicle body end section structure comprises a pair of left and right framework members, a bumper framework section connected to leading end portions of the pair of framework members, and a spacer member that projects out from a jutting-out portion of the bumper framework section toward a framework member side. The spacer member is disposed such that a
(Continued)

rotation trajectory of the spacer member about a connection location between the bumper framework section and the framework member, the connection location is positioned on an opposite side in the vehicle width direction of the spacer member, does not impinge on a wheel in plan view.

6 Claims, 41 Drawing Sheets

(51) Int. Cl.
B62D 25/08 (2006.01)
B60R 19/24 (2006.01)
B60R 19/04 (2006.01)
(52) U.S. Cl.
CPC ....... *B62D 25/082* (2013.01); *B60R 2019/247* (2013.01)
(58) Field of Classification Search
USPC ................................. 296/187.1, 133
See application file for complete search history.

(56) References Cited

U.S. PATENT DOCUMENTS

| | | | |
|---|---|---|---|
| 8,991,903 | B1 | 3/2015 | Alavandi et al. |
| 9,073,503 | B2 | 7/2015 | Ookuko et al. |
| 9,102,358 | B2 | 8/2015 | Basappa et al. |
| 9,156,418 | B2 | 10/2015 | Ramoutar et al. |
| 9,199,591 | B2 * | 12/2015 | Weil .............. B60R 19/34 |
| 2003/0090099 | A1 | 5/2003 | Miyasaka |
| 2003/0141712 | A1 | 7/2003 | Miyasaka |
| 2004/0195862 | A1 | 10/2004 | Saeki |
| 2004/0200659 | A1 | 10/2004 | Miyasaka |
| 2008/0023972 | A1 | 1/2008 | Ohno et al. |
| 2011/0049916 | A1 | 3/2011 | Nakanishi |
| 2013/0147233 | A1 | 6/2013 | Miyashita |
| 2013/0320709 | A1 | 12/2013 | Kuwabara et al. |
| 2013/0320710 | A1 | 12/2013 | Watanabe |
| 2014/0008923 | A1 | 1/2014 | Han et al. |
| 2014/0062106 | A1 * | 3/2014 | Han .............. B60R 19/34 |
| | | | 293/133 |
| 2014/0091585 | A1 | 4/2014 | Ramoutar et al. |
| 2014/0091595 | A1 | 4/2014 | Ramoutar et al. |
| 2014/0327254 | A1 | 11/2014 | Miyashita |
| 2014/0361559 | A1 | 12/2014 | Sakakibara et al. |
| 2014/0361561 | A1 | 12/2014 | Kuriyama et al. |
| 2015/0021936 | A1 | 1/2015 | Nusier et al. |
| 2015/0076847 | A1 | 3/2015 | Mori |
| 2015/0102635 | A1 | 4/2015 | Barbat et al. |
| 2015/0115633 | A1 | 4/2015 | Bruanbeck et al. |
| 2015/0137556 | A1 | 5/2015 | Alavandi et al. |
| 2015/0145282 | A1 | 5/2015 | Basappa et al. |
| 2015/0251702 | A1 | 9/2015 | Volz et al. |
| 2015/0274209 | A1 | 10/2015 | Basappa et al. |
| 2015/0298634 | A1 | 10/2015 | Hara et al. |
| 2015/0314742 | A1 | 11/2015 | Kato et al. |
| 2015/0329144 | A1 | 11/2015 | Hara |
| 2015/0336525 | A1 | 11/2015 | Nam et al. |
| 2015/0375789 | A1 | 12/2015 | Kitakata et al. |
| 2016/0101751 | A1 * | 4/2016 | Bou .............. B60R 19/34 |
| | | | 293/133 |
| 2016/0167712 | A1 * | 6/2016 | Ogawa .............. B60R 19/24 |
| | | | 296/187.1 |

FOREIGN PATENT DOCUMENTS

| | | |
|---|---|---|
| JP | 2000-52898 A | 2/2000 |
| JP | 2001-88633 A | 4/2001 |
| JP | 2002-249079 A | 9/2002 |
| JP | 2003-146246 A | 5/2003 |
| JP | 2003-182643 A | 7/2003 |
| JP | 2003-226266 | 8/2003 |
| JP | 2004-66932 A | 3/2004 |
| JP | 2005-119537 A | 5/2005 |
| JP | 2006-175988 A | 7/2006 |
| JP | 2006-224728 A | 8/2006 |
| JP | 2008-30629 A | 2/2008 |
| JP | 2008-213739 A | 9/2008 |
| JP | 2008-222037 A | 9/2008 |
| JP | 2009-248603 A | 10/2009 |
| JP | 2010-132018 A | 6/2010 |
| JP | 2011-051473 | 3/2011 |
| JP | 2012-228907 A | 11/2012 |
| JP | 2013-123957 A | 6/2013 |
| JP | 2013-203320 A | 10/2013 |
| JP | 2013-233820 A | 11/2013 |
| JP | 2014-113894 | 6/2014 |
| WO | WO 2013/157122 A1 | 10/2013 |
| WO | WO 2013/172132 A1 | 11/2013 |

OTHER PUBLICATIONS

Notice of Allowance dated Sep. 15, 2016, in co-pending U.S. Appl. No. 14/652,337, filed Jun. 15, 2015.

\* cited by examiner

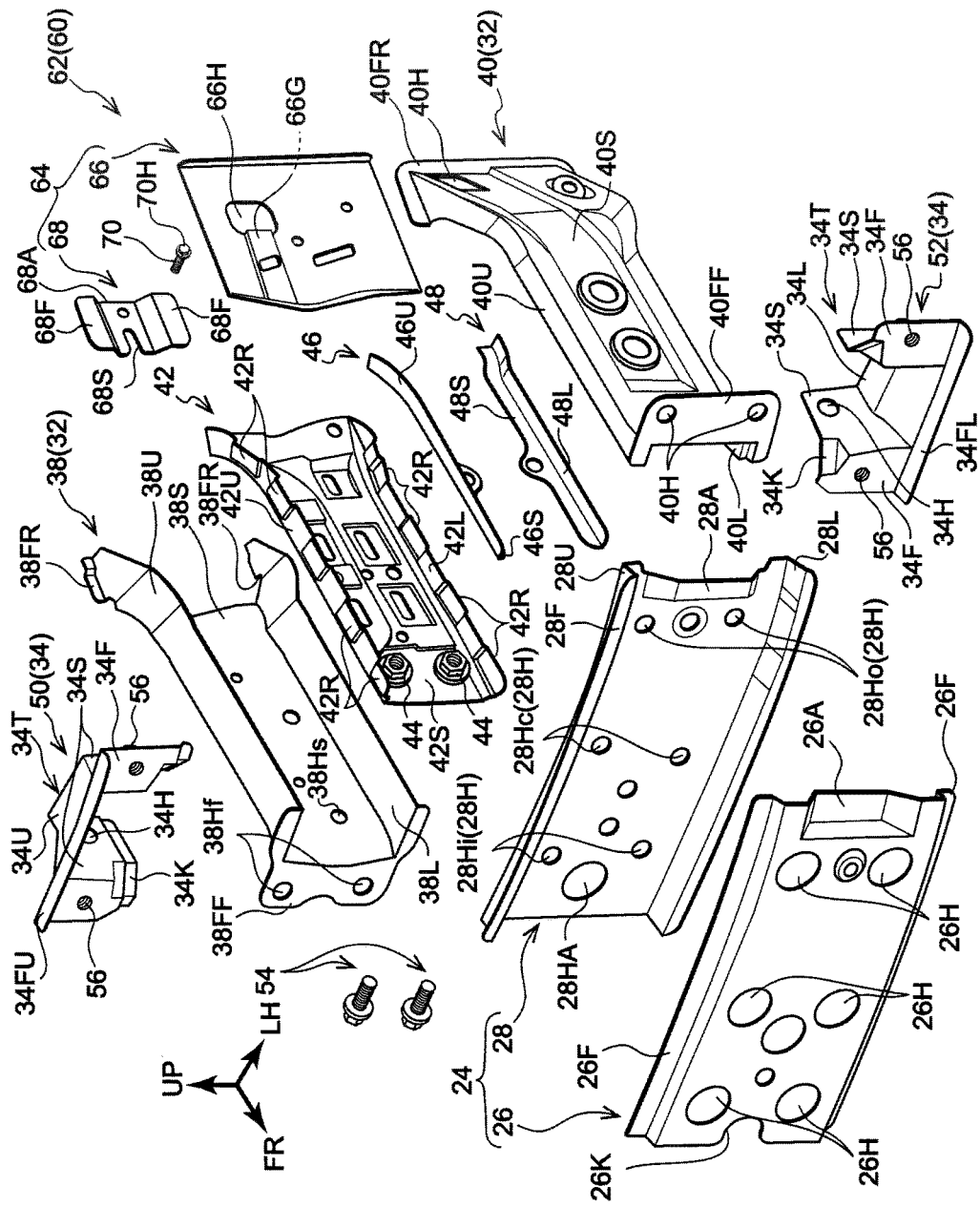

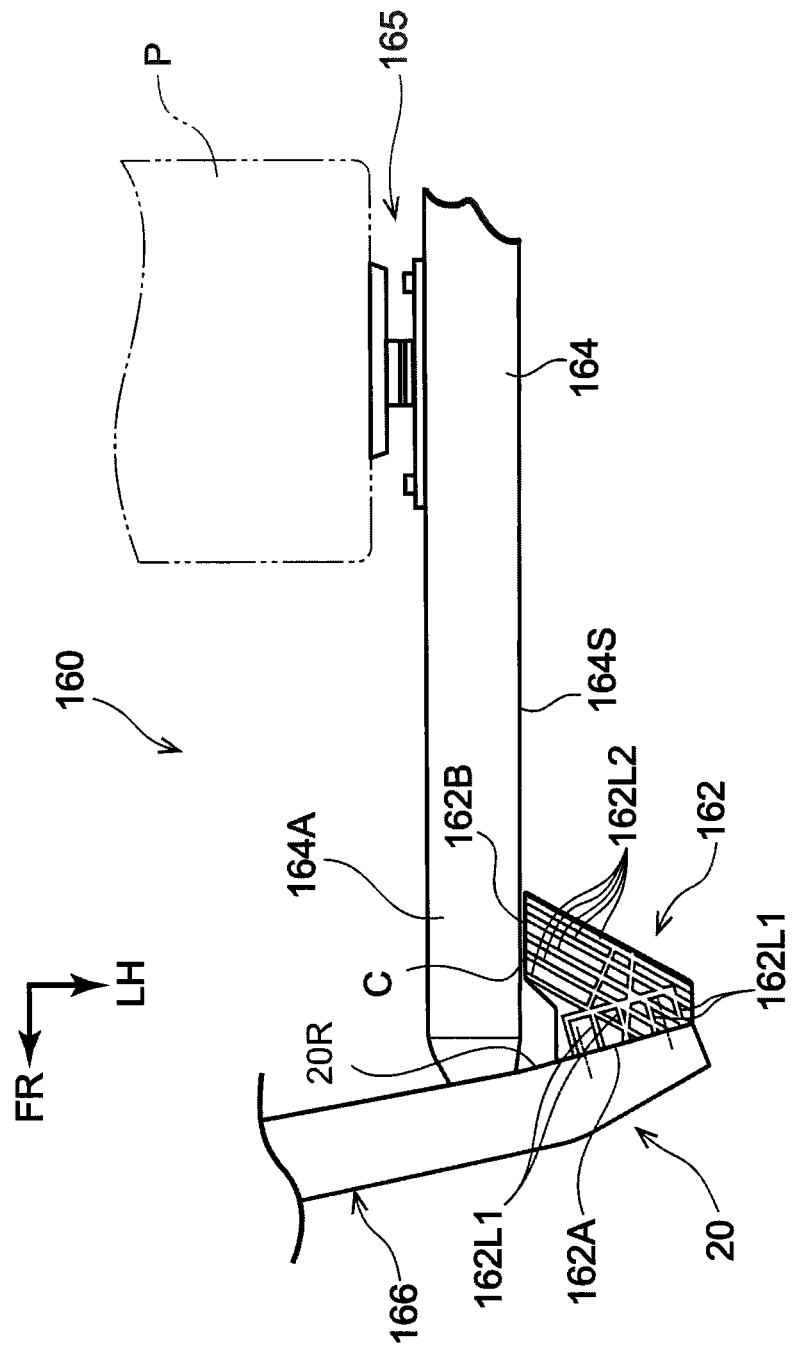

VEHICLE BODY END SECTION STRUCTURE

TECHNICAL FIELD

The present invention relates to a vehicle body end section structure.

BACKGROUND ART

A known bumper structure is configured with a reinforcement extension provided at a vehicle width direction end portion of bumper reinforcement, and load that is input to the reinforcement extension in a small overlap collision is transmitted to a side member (see, for example, Japanese Patent Application Laid-Open (JP-A) No. 2008-213739). A structure is also known that includes a second projection portion provided at a back face side of a bumper beam extension portion, and a first projection portion extending from a side face of a side frame toward the vehicle width direction outside, such that the first projection portion and the second projection portion impinge on each other in the event of a collision between a pole and the bumper beam extension portion (see, for example, JP-A No. 2012-228907).

SUMMARY OF INVENTION

Technical Subject

In the configuration described in JP-A No. 2008-213739, the reinforcement extension is a member that is long in the vehicle front-rear direction, and in the event of a minor collision, there is a concern of the reinforcement extension impinging on a wheel. Moreover, in the configuration described in JP-A No. 2012-228907, in a collision between the bumper beam extension portion and a pole, load is liable to act in a direction to cause a crash box to fold during an initial stage of the collision, before the projections impinge on each other.

An object of the present invention is to obtain a vehicle body end section structure capable of suppressing a spacer member that transmits load to a framework member in a small overlap collision from impinging on a wheel in a minor collision.

Another object of the present invention is to obtain a vehicle body end section structure capable of efficiently transmitting load to a framework member in a collision with an extension portion, while suppressing adverse impact on the energy absorption stroke of an energy absorption section.

Solution to Subject

A vehicle body end section structure according to a first aspect of the present invention includes: a pair of framework members, that are each long in a vehicle front-rear direction, that are disposed side-by-side in a vehicle width direction, and that include leading end sides configured as energy absorption sections; a bumper framework section that is long in the vehicle width direction, that is connected to leading end portions of the pair of framework members, and that has both ends in the vehicle width direction configured as jutting-out portions jutting out to a vehicle width direction outside of the pair of framework members; and a spacer member that projects out from one of the jutting-out portions to a framework member side, and that is disposed such that a rotation trajectory of the spacer member about a connection location between the bumper framework section and the framework member, the connection location is positioned on an opposite side in the vehicle width direction of the spacer member, is configured not to impinge on a wheel in plan view.

According to the above aspect, collision load that has been input to one of the jutting-out portions of the bumper framework section is transmitted to the framework member either as it is through the spacer member, or by the spacer member abutting the framework member accompanying deformation of the bumper framework section (jutting-out portion) due to the collision load. Note that the rotation trajectory of the spacer member about the connection location between the bumper framework section and the framework member on the opposite side in the vehicle width direction of the spacer member is disposed so as not to impinge on the wheel in plan view. The spacer member is accordingly prevented or effectively suppressed from impinging on the wheel in a minor collision mode in which the energy absorption section of one of the framework members is deformed.

In the vehicle body end section structure of the above aspect, the spacer member that transmits load to the framework member in a small overlap collision can be suppressed from impinging on the wheel in a minor collision. The spacer member may, for example, simply project out from the one of the jutting-out portions toward the framework member side in the front-rear direction (to the rear side or the front side), or may project out such that a framework member side of the spacer member is closer to the framework member in the vehicle width direction than a jutting-out portion side of the spacer member.

In the above aspect, configuration may be made wherein the spacer member is formed to be inclined or curved such that a portion of the spacer member on the one of the jutting-out portions side is positioned further to the vehicle width direction outside than a portion of the spacer member on the framework member side, and an end portion of the spacer member on the framework member side configures an opposing face facing a side face of the framework member.

According to the above aspect, load that has been input to the one of the jutting-out portions acts through the spacer member on the framework member as lateral force toward the vehicle width direction inside. Since the spacer member is inclined or curved, and includes the opposing face as described above, rearward load that has been input to the one of the jutting-out portions is efficiently converted into lateral force. The inclined or curved shape moreover contributes to suppressing interference with the wheel.

In the above aspect, configuration may be made wherein: each of the pair of framework members includes a front side member, and a crash box that is provided at a vehicle front end of the front side member and functions as the energy absorption section, and the pair of framework members are each disposed on each respective side of a power unit; and the spacer member is made such that the opposing face is disposed facing a side face of the front side member, and the spacer member is configured to convert rearward load in the vehicle front-rear direction that has been input to the one of the jutting-out portions into load in the vehicle width direction, and transmits the load through the front side member to the power unit.

According to the above aspect, rearward load in the vehicle front-rear direction that has been input to the one of the jutting-out portions is input as lateral force toward the vehicle width direction inside to the front side member at the vehicle front-rear direction rear of the crash box by the spacer member. This load is transmitted to the power unit by deformation of the front side member. This accordingly generates inertia force toward an opposite side to a collision side in the power unit.

In the above aspect, configuration may be made wherein the spacer member includes an inside member forming a portion on the vehicle width direction inside, an outside member forming a portion on the vehicle width direction outside, and a reinforcement portion reinforcing the inside member.

According to the above aspect, the inside member, this being on a compression side during transmission of load from the one of the jutting-out portions to the framework member, is reinforced by the reinforcement portion. Dividing the inside member and the outside member in this manner enables the reinforcement portion to be set selectively at the inside member. Note that the reinforcement portion may be a separate member to the inside member, or may be configured by strengthening (for example thickening, or employing a material with a high yield strength) at least a portion of the inside member with respect to the outside member.

In the above aspect, configuration may be made further including a slide permitting structure that permits sliding of the end portion of the spacer member on the framework member side with respect to the side face of the framework member.

According to the above aspect, when the one of the jutting-out portions is input with collision load, the spacer member slides with respect to the side face of the framework member accompanying deformation of the energy absorption section (a crash box) due to the load. Permitting the spacer member to slide with respect to the framework member in this manner accordingly suppresses the spacer member from obstructing deformation of the energy absorption section (the crash box), and enables efficient collision energy absorption in the initial stage of a small overlap collision.

In the above aspect, configuration may be made wherein the slide permitting structure includes either a non-coupled structure in which the end portion of the spacer member on the framework member side is not coupled to the framework member, or a coupled structure in which the spacer member is coupled to the framework member such that the coupling of the spacer member with respect to the framework member is released by input of load of a specific value or above to the one of the jutting-out portions.

According to the above aspect, the end portion of the spacer member on the framework member side is not coupled to the framework member, thereby permitting sliding of the spacer member with respect to the framework member. Alternatively, the coupled structure of the spacer member with respect to the framework member is released by input of load of a specific value or above to the one of the jutting-out portions, thereby permitting sliding of the spacer member with respect to the framework member.

In the above aspect, configuration may be made further including a stopper structure that restricts sliding of the spacer member in the vehicle front-rear direction with respect to the framework member as a result of load that has been input to the one of the jutting-out portions.

According to the above aspect, sliding of the spacer member with respect to the framework member is restricted by the stopper structure once the spacer member has slid by a specific amount in the vehicle front-rear direction with respect to the framework member in a collision. When this occurs, the spacer member that continues to receive force from the one of the jutting-out portions presses a length direction intermediate portion of the framework member toward the vehicle width direction inside. The framework member accordingly folds toward the vehicle width direction inside, and the load that has been input to the one of the jutting-out portions is transmitted to an opposite side to the collision side of the vehicle body. Transition to a load transmission mode toward the opposite side to the collision side (mode control) is easier and more reliable than in a configuration in which, for example, sliding of the spacer member is restricted due to completion of deforming of the energy absorption section.

In the above aspect, configuration may be made wherein the stopper structure is configured including: a suspension member supported by the framework member; and an abutting portion that is provided at the spacer member, and that abuts the suspension member in the event that the spacer member has reached a position in the vehicle front-rear direction where sliding with respect to the framework member is restricted.

According to the above aspect, the stopper structure is configured including the suspension member, thereby enabling easy and reliable mode control as noted above while suppressing an increase in the number of components.

In the above aspect, configuration may be made further including a restriction structure that restricts relative displacement between the framework member and the spacer member.

According to the above aspect, relative displacement (relative displacement in at least one specific direction, referred to below simply as "relative displacement") of the spacer member with respect to the framework member is restricted by the restriction structure at least prior to a collision occurring. Fluctuation in the position of the spacer member with respect to the framework member during normal operation (prior to a collision) is accordingly suppressed compared to a configuration not including the restriction structure.

In the above aspect, configuration may be made wherein the restriction structure is a front-rear guidance structure that restricts a direction of relative displacement of the spacer member with respect to the framework member to the vehicle front-rear direction.

According to the above aspect, the direction of relative displacement of the spacer member during a collision is restricted to the vehicle front-rear direction, suppressing up-down positional displacement of the spacer member with respect to the framework member. This thereby enables good load transmission to the framework member from the spacer member that undergoes movement in the vehicle front-rear direction (that is one aspect of) relative displacement with respect to the framework member.

In the above aspect, configuration may be made wherein a vehicle rear end side of the spacer member is fastened by a fastener at a fastened portion, to a portion of the framework member at a vehicle front-rear direction rear side of the energy absorption section. The fastened portion includes a slit open toward the vehicle front. The front-rear guidance structure is configured including a guided portion that is guided toward the vehicle rear by the fastener after fastening of the fastened portion by the fastener has been released.

According to the above aspect, relative displacement of the spacer member with respect to the framework member is restricted due to fastening the spacer member at the fastened portion thereof, to the framework member by the fastener. Namely, the fastener configures at least a portion of the restriction structure. When collision load is input to the one of the jutting-out portion and relative displacement (movement in the vehicle front-rear direction) of the spacer member with respect to the framework member occurs, the fastener comes out from the fastened portion through the slit in the fastening portion. The fastener, together with the guided portion, moreover configures the front-rear guidance structure, and positional displacement of the spacer member in the up-down direction with respect to the framework member is accordingly suppressed when the spacer member moves in the vehicle front-rear direction with respect to the framework member.

In the above aspect, configuration may be made wherein the bumper framework section includes: a bumper framework body spanning between the pair of framework members; and an extension member that is fixed at each end in the vehicle width direction of the bumper framework body so as to provide at least portions of the jutting-out portions, and that is made from a stronger material than the bumper framework body.

According to the above aspect, the bumper framework section is made such that the extension members configuring at least the portions of the jutting-out portions are fixed to the bumper framework body. Since the extension members are made from a stronger material than the bumper framework body, deformation (bending) due to collision load is suppressed, enabling the load to be efficiently transmitted to the energy absorption section.

In the above aspect, configuration may be made wherein each jutting-out portion is shaped such that a vehicle width direction outside portion of the jutting-out portion is positioned further to the vehicle rear than a vehicle width direction inside portion of the jutting-out portion; and the spacer member includes a first wall that faces an outside face, that looks outward in the vehicle width direction, of the framework member across a gap, or that contacts the outside face, a second wall that couples together the one of the jutting-out portions and a vehicle front-rear direction front side portion of the first wall, and a third wall that is provided at the vehicle width direction outside of the second wall and that couples together the one of the jutting-out portions and a vehicle front-rear direction rear side portion of the first wall.

According to the above aspect, in the event of a collision from the front, load is readily input to the vehicle width direction inside portion of the one of the jutting-out portions, the inside portion is relatively positioned to the front, as the each of the jutting-out portions is shaped such that the outside portion is positioned further to the vehicle rear than the inside portion, as described above. The load is therefore transmitted to the framework member mainly through the second wall and the first wall. When this occurs, the first wall slides along the outside face of the framework member due to the rearward component of the collision load. This sliding permits deformation of the energy absorption section, such that energy absorption is exhibited due to deformation of the energy absorption section. After energy absorption by the energy absorption section, collision load is also input to the vehicle width direction outside portion of the one of the jutting-out portion as the collision progresses, and this load is transmitted to a specific location in the length direction of the framework member, mainly through the third wall and the first wall.

A vehicle body end section structure according to a second aspect of the present invention includes: a framework member that is long in a vehicle front-rear direction, that includes an energy absorption section at a front end side in the vehicle front-rear direction, and that is disposed offset with respect to center in the vehicle width direction; a jutting-out portion that is formed at a bumper framework section connected to a vehicle front end of the framework member, that juts out further to the vehicle width direction outside than the framework member, and that is shaped such that a vehicle width direction outside portion of the jutting-out portion is positioned further to the vehicle rear than a vehicle width direction inside portion of the jutting-out portion; and a spacer member that includes a first wall that faces an outside face, that looks to outward in the vehicle width direction, of the framework member across a gap, or that contacts the outside face, a second wall that couples together the jutting-out portion and a vehicle front-rear direction front side portion of the first wall, and a third wall that is provided at the vehicle width direction outside of the second wall, and that couples together the jutting-out portion and a vehicle front-rear direction rear side portion of the first wall.

According to the above aspect, in the event of a collision from the front, load is readily input to the vehicle width direction inside portion of the jutting-out portion, the inside portion is relatively positioned to the front, as the jutting-out portion is shaped such that the outside portion is positioned further to the vehicle rear than the inside portion, as described above. The load is therefore transmitted to the framework member mainly through the second wall and the first wall. When this occurs, the first wall slides along the outside face of the framework member due to the rearward component of the collision load. This sliding permits deformation of the energy absorption section, such that energy absorption is exhibited due to deformation of the energy absorption section. After energy absorption by the energy absorption section, collision load is also input to the vehicle width direction outside portion of the jutting-out portion as the collision progresses, and this load is transmitted to a specific location in the length direction of the framework member, mainly through the third wall and the first wall.

The vehicle body end section structure of the above aspect is accordingly capable of efficiently transmitting load to the framework member in a collision with the jutting-out portion, while suppressing adverse impact on the energy absorption stroke of the energy absorption section.

In the above aspect, configuration may be made wherein the third wall is angled or curved such that a vehicle front-rear direction rear side of the third wall is positioned to be closer to the second wall than a vehicle front-rear direction front side of the third wall.

According to the above aspect, (at least a portion of) the second wall forms a smaller angle with the framework member than (at least a portion of) the third wall, thereby suppressing a vehicle width direction inward component force of the collision load acting on the framework member to a small value. The first wall accordingly slides readily with respect to the framework member. Since the third wall forms a larger angle with the framework member than the second wall, a large vehicle width direction inward component force of the collision load acts on the framework member through the third wall and the first wall after energy absorption by the energy absorption section. This component force bends (folds) the framework member about the transmission location of the component force, such that the framework member projects out in the vehicle width direction, thereby exhibiting energy absorption due to bending.

A vehicle body end section structure according to a third aspect of the present invention includes a framework member that is long in a vehicle front-rear direction, that includes an energy absorption section at a front end side in the vehicle front-rear direction, and that is disposed offset with respect to center in the vehicle width direction; a jutting-out portion that is formed at a bumper framework section connected to a vehicle front end of the framework member, that juts out further to the vehicle width direction outside than the framework member, and that is shaped such that a vehicle width direction outside portion of the jutting-out portion is positioned further to the vehicle rear than a vehicle width direction inside portion of the jutting-out portion; a first wall that faces an outside face, that looks to outward in the vehicle width direction, of the framework member across a gap, or that contacts the outside face; a second wall that couples together the jutting-out portion and a vehicle front-rear direction front side portion of the first wall; and a third wall that is provided at the vehicle width direction outside of the second wall, and that is angled or curved such that a vehicle front-rear direction rear side of the third wall is positioned to be closer to the second wall than a vehicle front-rear direction front side of the third wall, and that couples together the jutting-out portion and a vehicle front-rear direction rear side portion of the first wall.

According to the above aspect, during a collision from the front, load is readily input to the vehicle width direction inside portion of the jutting-out portion that is relatively positioned to the front, as the jutting-out portion is shaped (for example angled or curved) such that the outside portion is positioned further to the vehicle rear than the inside portion, as described above. The load is accordingly transmitted to the framework member mainly through the second wall and the first wall. Since (at least a portion of) the second wall forms a smaller angle with the framework member than (at least a portion of) the third wall, a vehicle width direction inward component force of the collision load acting on the framework member is suppressed to a small value. The first wall accordingly slides along the outside face of the framework member due to the rearward component of the collision load. This sliding permits deformation of the energy absorption section, such that energy absorption is exhibited due to deformation of the energy absorption section.

After energy absorption by the energy absorption section, collision load is also input to the vehicle width direction outside portion of the jutting-out portion as the collision progresses, and this load is transmitted to a specific location in the length direction of the framework member, mainly through the third wall and the first wall. Since the third wall forms a larger angle with the framework member than the second wall, a large vehicle width direction inward component force of the collision load acts on the framework member. This component force bends (folds) the framework member about the transmission location of the component force, such that the framework member projects out in the vehicle width direction, thereby exhibiting energy absorption due to bending.

The vehicle body end section structure of the above aspect is accordingly capable of efficiently transmitting load to the framework member in a collision with the jutting-out portion, while suppressing adverse impact on the energy absorption stroke of the energy absorption section.

In the above aspect, configuration may be made wherein the jutting-out portion is shaped, in plan view, including a first angled portion angled with respect to the vehicle width direction such that a vehicle width direction outside thereof to be positioned further to the vehicle front-rear direction rear side than a vehicle width direction inside, and a second angled portion disposed at the vehicle width direction outside of the first angled portion, at a greater angle with respect to the vehicle width direction than the first angled portion; the second wall couples together the first angled portion and the vehicle front side portion of the first wall; and the third wall couples together the second angled portion and the vehicle rear side portion of the first wall.

According to the above aspect, load from a colliding body is readily input to the first angled portion in the initial stage of a collision with the jutting-out portion, and load from the colliding body is input to the second angled portion from an intermediate stage of the collision onwards. Since the first angled portion has a smaller angle with respect to the vehicle width direction than the second angled portion, load transmitted to the framework member through the second wall has a relatively large rearward component force. The first wall therefore slides readily along the outside face of the framework member, contributing to improved energy absorption performance by the energy absorption section. When collision load is input to the second angled portion, the load is transmitted to the framework member from the second angled portion, mainly through the third wall and the first wall. Since the second angled portion has a larger angle with respect to the vehicle width direction, the vehicle width direction inward component force of the collision load transmitted to the framework member is larger than in cases in which the jutting-out portion is configured with only the (angle of) the first angled portion. Namely, load that is input in a collision with the jutting-out portion can be transmitted to the framework member even more efficiently.

In the above aspect, configuration may be made further including a plate member including a portion at the vehicle width direction inside, the portion is interposed at a connection location between a front end of the framework member and the bumper framework section, and the plate member further includes another portion at the vehicle width direction outside, the other portion is interposed between the jutting-out portion and the second wall and third wall.

According to the above aspect, the plate member is connected to the front end of the framework member (energy absorption section) and the respective front ends of the second wall and the third wall. Vehicle width direction inside component force can accordingly be transmitted from the plate member, through the third wall, and into the framework member even when, for example, the jutting-out portion breaks due to localized input. Energy absorption due to bending of the framework member is accordingly exhibited.

In the above aspect, configuration may be made wherein a low strength portion, having lower strength with respect to bending load than other portions, is formed at the framework member at a position offset toward the rear from the facing location or contact location of the first wall, by an amount of an energy absorption stroke of the energy absorption section.

According to the above aspect, the low strength portion is configured at the location to which collision load is transmitted from the first wall after energy absorption by the energy absorption section. The framework member accordingly bends around the low strength portion, thereby improving the robustness of energy absorption due to bending of the framework member.

In the above aspect, configuration may be made wherein at least front portions in the vehicle front-rear direction of the second wall and the third wall are formed by flat plate portions with a straight line shape in plan view.

According to the above aspect, at least the front portions of the second wall and the third wall are formed by flat plate portions, thereby enabling collision load to the jutting-out portion to be more efficiently transmitted to the framework member as axial force than in cases in which, for example, the front portions of the second wall and the third wall are curved walls.

In the above aspect, configuration may be made wherein an end portion of the spacer member on the framework member side is separated from the framework member.

According to the above aspect, when collision load is input to the jutting-out portion, energy absorption is exhibited by compression of the energy absorption section during a period in which the bumper framework section (jutting-out portion) undergoes deformation due to the load, until the spacer member abuts the framework member. Namely, the spacer member is suppressed from obstructing deformation of the energy absorption section (crash box), and efficient collision energy absorption is exhibited during the initial stage of a small overlap collision.

Advantageous Effects of Invention

The vehicle body end section structure according to the first aspect of the present invention described above exhibits the excellent advantageous effect of enabling the spacer member that transmits load to the framework member in a small overlap collision to be suppressed from impinging on the wheel in a minor collision.

The vehicle body end section structure according to the second and third aspects of the present invention described above exhibits the excellent advantageous effect of enabling efficient transmission of load to the framework member in a collision with the jutting-out portion, while suppressing adverse impact on the energy absorption stroke of the energy absorption section.

BRIEF DESCRIPTION OF DRAWINGS

FIG. 11 is an exploded perspective view illustrating a slide spacer configuring a vehicle body end section structure according to a second exemplary embodiment.

FIG. 22 is a plan view illustrating relevant portions of a vehicle body end section structure according to a ninth exemplary embodiment.

DESCRIPTION OF EMBODIMENTS

Explanation follows regarding a vehicle body front section structure 10 serving as a vehicle body end section structure according to an exemplary embodiment of the present invention, with reference to the drawings. Note that in each of the drawings, the arrow FR, the arrow UP, the arrow RH, and the arrow LH respectively indicate the front direction, upward direction, and the left direction and right direction as facing toward the front direction of a vehicle A applied with the vehicle body front section structure 10, as appropriate. In the following, explanation referring simply to front and rear, up and down, and left and right directions refers to the front and rear in the vehicle front-rear direction, up and down in the vehicle up-down direction, and left and right as facing toward the front direction, unless specifically stated otherwise.

General Vehicle Configuration

Figure 1:
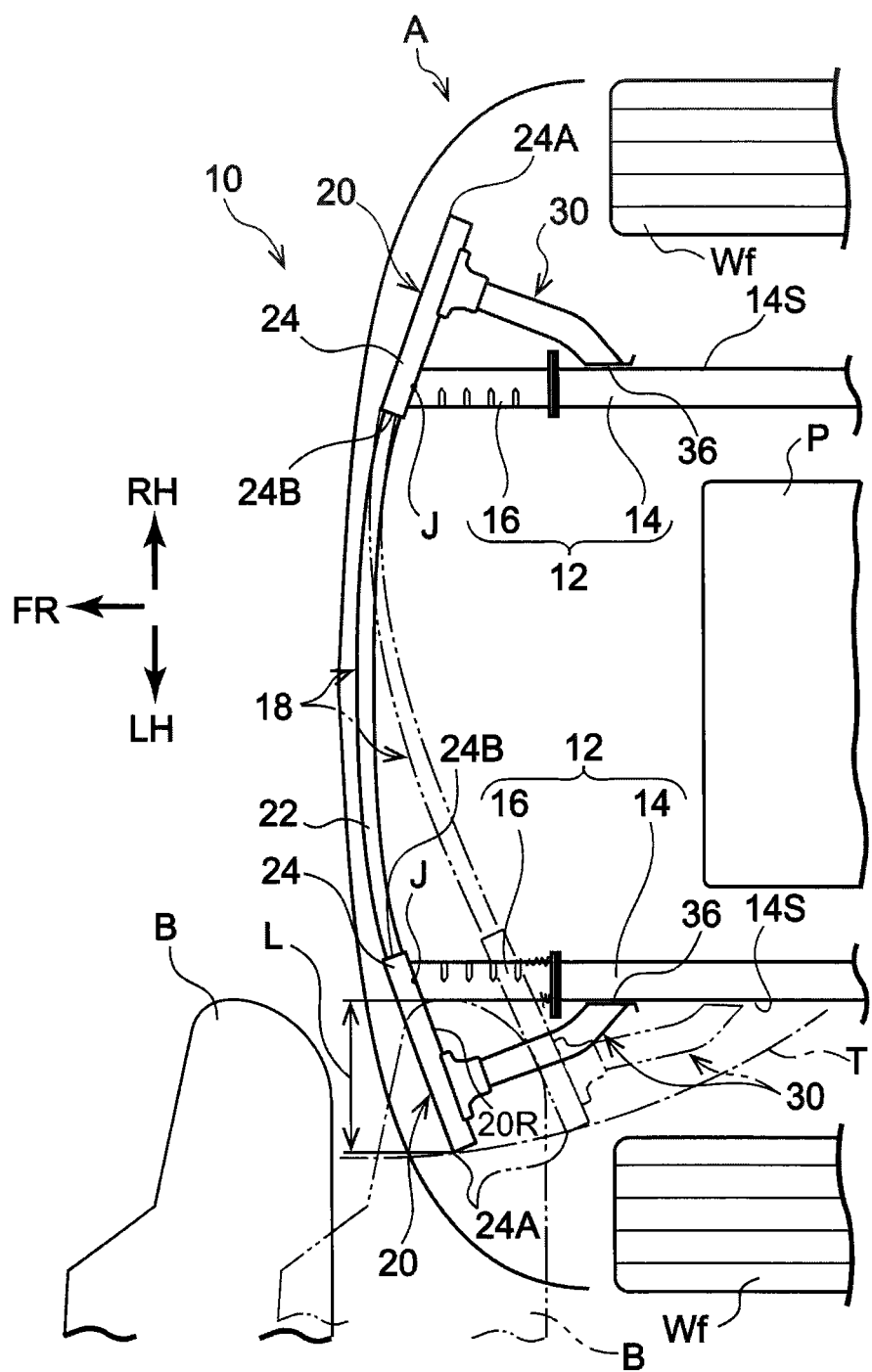
FIG. 1 is a plan view schematically illustrating an overall configuration of a vehicle body front section structure according to a first exemplary embodiment.

FIG. 1 is a plan view schematically illustrating an overall configuration of the vehicle body front section structure 10. As illustrated in FIG. 1, the vehicle body front section structure 10 includes a pair of framework members 12 that are long in the front-rear direction, and are side-by-side in the vehicle width direction. Namely, the framework members 12 are provided in a left and right pair.

Each of the framework members 12 is mainly configured by a front side member 14, and a crash box 16 provided at a front end of the front side member 14. Although not illustrated in the drawings, a rear portion of the front side member 14 extends under the lower side of a dash panel to below the floor of the vehicle compartment.

Figure 2:
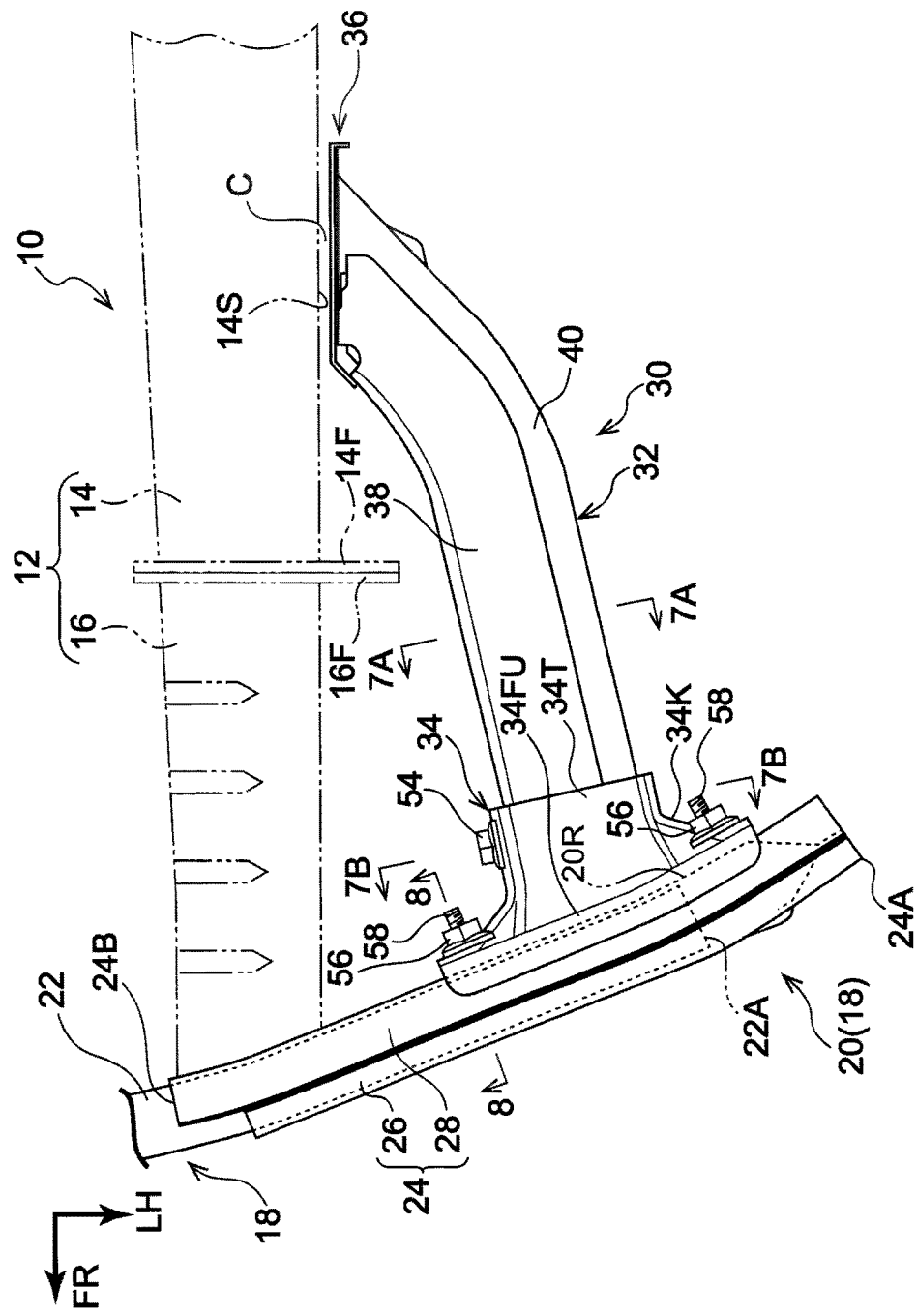
FIG. 2 is a plan view illustrating relevant portions of a vehicle body end section structure according to the first exemplary embodiment.

Each front side member 14 has a closed cross-section structure as viewed in cross-section taken orthogonally to the length (front-rear) direction (not illustrated in the drawings). Similarly, each crash box 16 has a closed cross-section structure as viewed in a cross-section taken orthogonally to the length (front-rear) direction. As illustrated in FIG. 2, a flange 16F formed at a rear end of each crash box 16 is fixed to a flange 14F formed at a front end of the corresponding front side member 14 by fastening with nuts and bolts. Each of the flanges 14F, 16F in the present exemplary embodiment jut out to the top, bottom, and vehicle width direction outsides of the respective front side members 14 and the crash boxes 16.

Each of the crash boxes 16 is configured so as to undergo compression deformation (crushing) more readily than the front side members 14 with respect to load in the front-rear direction. Accordingly, the respective framework members are configured such that the crash boxes 16 undergo compression deformation first when load is received from bumper reinforcement 18, described later. The crash boxes 16 of the present exemplary embodiment are energy absorption sections of the framework members 12, and correspond to an energy absorption section of the present invention.

As illustrated in FIG. 1, the bumper reinforcement 18 serving as a bumper framework section spans between the front ends of the left and right crash boxes 16. The bumper reinforcement 18 configures a framework member that is long in the vehicle width direction, and has a closed cross-section structure as viewed in cross-section taken orthogonally to the length direction. Both length direction end portions of the bumper reinforcement 18 configure jutting-out portions 20 that jut out to the vehicle width direction outsides of the framework members 12.

First Exemplary Embodiment

Bumper Reinforcement

In the present exemplary embodiment, the bumper reinforcement 18 is mainly configured by a reinforcement body 22 serving as a bumper frame body, and a pair of extensions 24 that serve as extension members and configure the respective jutting-out portions 20.

Reinforcement Body

Although not illustrated in the drawings, the reinforcement body 22 is formed with a closed cross-section structure, for example by extrusion molding aluminum, or an aluminum alloy. In the present exemplary embodiment, the cross-section profile of the reinforcement body 22 is configured with a profile of three rectangular shaped frames stacked one above the other (a cross-section profile resembling a rectangle divided into three from top-to-bottom). Both length direction end portions of the reinforcement body 22 configure part of the respective jutting-out portions 20.

Extensions

As illustrated in FIG. 2, each extension 24 is fixed to a length direction end portion of the reinforcement body 22, and respective vehicle width direction outside ends 24A thereof jut out further to the vehicle width direction outsides than vehicle width direction outside ends 22A of the reinforcement body 22. The extensions 24 may therefore be understood as extension members that extend the bumper reinforcement 18 beyond the reinforcement body 22 in the vehicle width direction.

Vehicle width direction inside ends 24B of the respective extensions 24 reach join portions between the reinforcement body 22 and the crash boxes 16, and are joined to front ends of the crash boxes 16 as well as to the reinforcement body 22. Each extension 24 is configured from a steel material. Namely, each extension 24 is configured from a material with a higher strength (yield value) than the material (aluminum or the like) configuring the reinforcement body 22.

More specific explanation follows regarding the extensions 24. Note that the pair of extensions 24 are formed with basically left-right symmetry, other than at portions specifically mentioned. The following explanation is therefore given in the singular, referring chiefly to the left side extension 24. Similarly, explanation regarding slide spacers 30, described later, is also given in the singular, referring chiefly to that on the left side.

Figure 6:
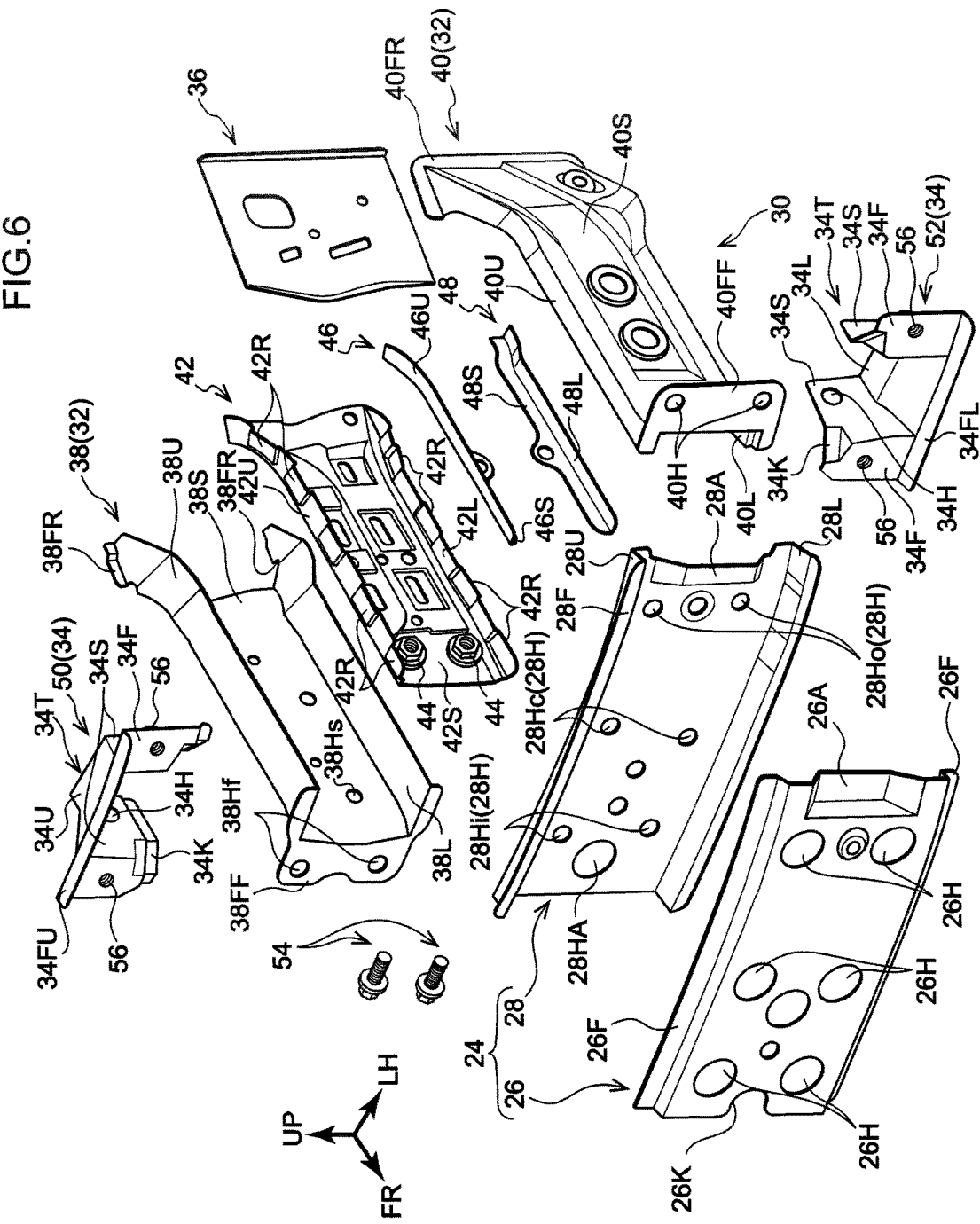
FIG. 6 is an exploded perspective view illustrating a slide spacer configuring a vehicle body end section structure according to the first exemplary embodiment.

As illustrated in FIG. 2 and FIG. 6, the extension 24 is configured from two members by joining together a front panel 26 and a rear panel 28. The front panel 26 has a hat-shaped cross-section, open toward the rear as viewed in cross-section taken orthogonally to the length (vehicle width) direction. The rear panel 28 has a hat-shaped cross-section, open toward the front as viewed in cross-section taken orthogonally to the length (vehicle width) direction. Upper and lower flanges 26F, 28F of the front panel 26 and the rear panel 28 are joined together to configure the extension 24 with a closed cross-section structure as viewed in cross-section taken orthogonally to the length (vehicle width) direction. In the present exemplary embodiment, the upper and lower flanges 26F, 28F of the front panel 26 and the rear panel 28 are joined together by continuous arc welding along substantially the entire length of the extension 24.

Figure 4:
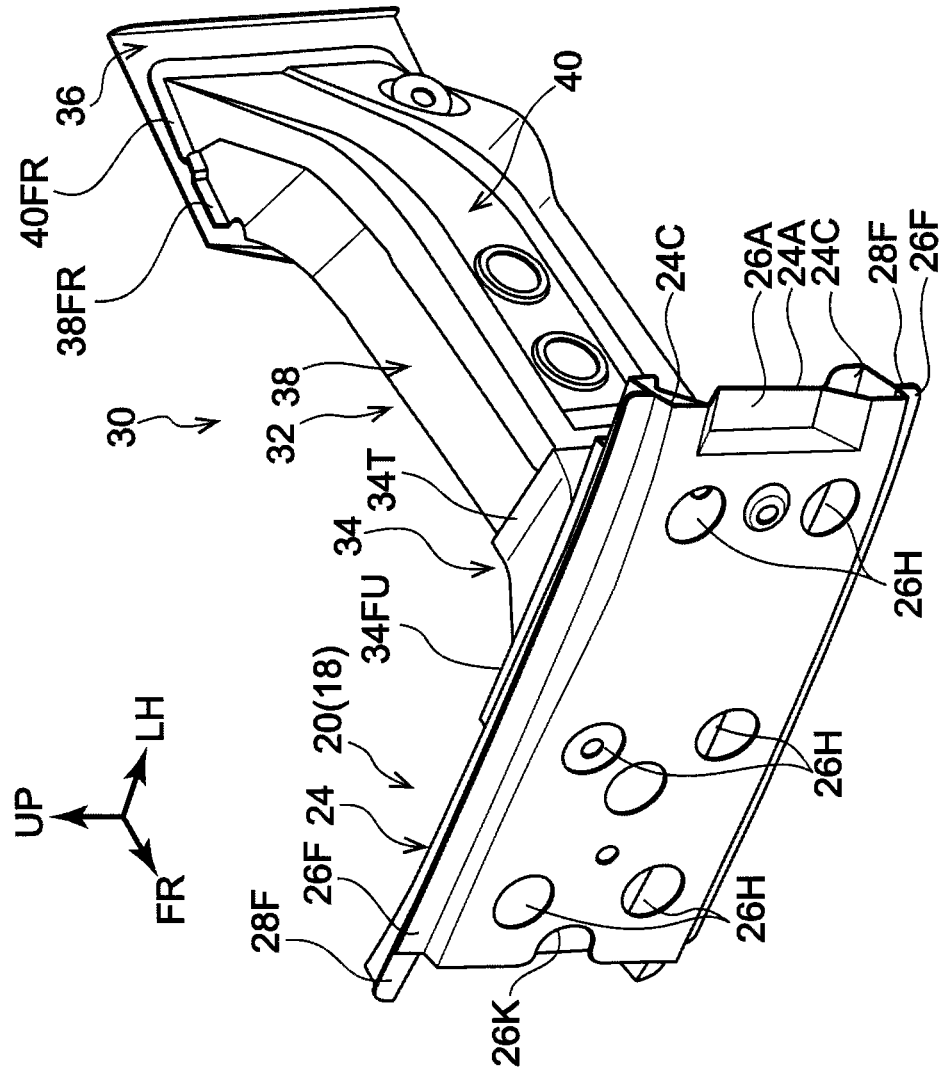
FIG. 4 is a perspective view illustrating relevant portions of a vehicle body end section structure according to the first exemplary embodiment.

As illustrated in FIG. 4, the extension 24 of closed cross-section structure is open at the vehicle width direction inside end 24B, and is closed off at the vehicle width direction outside end 24A. Specifically, as illustrated in FIG. 6, raised seat portions 26A, 28A project out from vehicle width direction outside end sides of the front panel 26 and the rear panel 28 toward the front and rear directions, so as to approach each other from the front and rear. The raised seat portions 26A, 28A are joined together to close off the vehicle width direction outside end 24A of the extension 24. The raised seat portions 26A, 28A are also joined together by arc welding. Note that the raised seat portions 26A, 28A are formed at a portion encompassing an up-down direction central portion of the extension 24. Open portions 24C that are open toward the vehicle width direction outside are formed above and below the portion that is closed off by joining together the raised seat portions 26A, 28A in the extension 24.

As illustrated in FIG. 6, plural bolt holes 28H are formed to the rear panel 28 configuring the extension 24, further to the vehicle width direction inside than the raised seat portion 28A. Corresponding to the bolt holes 28H, tool holes 26H for allowing tool access to the inside of the closed cross-section are formed to the front panel 26 configuring the extension 24, further to the vehicle width direction inside than the raised seat portion 26A. The front panel 26 and the rear panel 28 are also respectively formed with an access notch 26K and an access hole 28HA to allow access to a nut member of a lashing hook or towing hook fixed to the crash box 16.

Out of the left and right extensions 24, the nut member, the access notch 26K, and the access hole 28HA are only provided to the extension 24 on one side in the vehicle width direction (on the left side in the present exemplary embodiment). Although not illustrated in the drawings, a portion of the reinforcement body 22 that fits together with the extension 24 is formed with holes corresponding to the various holes in the extension 24.

A vehicle width direction outside end portion of the reinforcement body 22 is inserted into the extension 24 with the closed cross-section structure described above. In this state, the extension 24 is fastened and fixed (jointly fastened) (not illustrated in the drawings) to both the reinforcement body 22 and the crash box 16 at upper and lower bolt holes 28Hi (see FIG. 6) positioned furthest to the vehicle width direction inside out of the respective bolt holes 28H.

In this state, the vehicle width direction outside end 24A of the extension 24 juts out further to the vehicle width direction outside than the vehicle width direction outside ends 22A of the reinforcement body 22, as described above. More specifically, out of the respective bolt holes 28H illustrated in FIG. 6, a pair of upper and lower bolt holes 28Ho positioned furthest to the vehicle width direction outside, and a pair of upper and lower bolt holes 28Hc positioned at the vehicle width direction center, are employed in fastening of the slide spacer 30, described later. The extension 24 is fastened to both the reinforcement body 22 and the slide spacer 30 at the bolt holes 28Hc, and is fastened to the slide spacer 30 alone at the bolt holes 28Ho.

Slide Spacers

The vehicle body front section structure 10 further includes the slide spacers 30, serving as spacer members disposed between the jutting-out portions 20 of the bumper reinforcement 18 and the framework members 12. In the present exemplary embodiment, the slide spacers 30 are provided to the jutting-out portions 20, and function as load transmission members that convert rearward load that has been input to the jutting-out portion 20 into load toward the vehicle width direction inside, and transmit the load to the vicinity of the front ends of the front side members 14. In the following explanation, the load toward the vehicle width direction inside, converted by the slide spacers 30, is also referred to as "lateral force". In the present exemplary embodiment, the slide spacers 30 are configured with bending strength and compression strength higher than the bending strength of the front side members 14. The slide spacers 30 are thus configured to deform the front side members 14 using lateral force, and transmit the lateral force to a power unit P, while hardly undergoing any compression or bending themselves. Specific explanation follows thereof.

As illustrated in FIG. 2 to FIG. 5, each slide spacer 30 is mainly configured by a spacer body 32, a front side fixing portion 34 fixed to the jutting-out portion 20, and a slide plate portion 36, serving as a first wall that faces a side face of the front side member 14 across a gap C. In the slide spacer 30 of the present exemplary embodiment, the spacer body 32, the front side fixing portion 34, and the slide plate portion 36 are configured integrally (are integrated) with one another.

Spacer Body

As illustrated in FIG. 2, the slide spacer 30 is disposed occupying (part of) a space between a back face 20R of the jutting-out portion 20 facing toward the rear (and slightly toward the vehicle width direction inside), and a side face 14S of the front side member 14 facing toward the vehicle width direction outside. Configuration is thus made such that when rearward load of a specific value or above acts on the jutting-out portion 20, the slide spacer 30 transmits (a portion of) the load from the back face 20R of the jutting-out portion 20 to the side face 14S of the front side member 14.

In plan view, the spacer body 32 configuring the slide spacer 30 is moreover configured with an angled or curved shape with respect to the front-rear direction. In the present exemplary embodiment, from a front portion to a central portion, the spacer body 32 is configured in a straight line shape at an angle with respect to the front-rear direction, such that the front end side is positioned further to the vehicle width direction outside than the rear end side. A rear portion of the spacer body 32 is formed in a curving shape forming a protrusion toward the rear and the vehicle width direction outside. Due to having this shape, the slide spacer 30 curls around the flanges 14F, 16F of the framework member 12 to reach from the back face 20R of the jutting-out portion to the side face 14S of the front side member 14. In the present exemplary embodiment, the configuration by which the spacer body 32 curls around the flanges 14F, 16F forms part of the slide permitting structure of the present invention.

Figure 3:
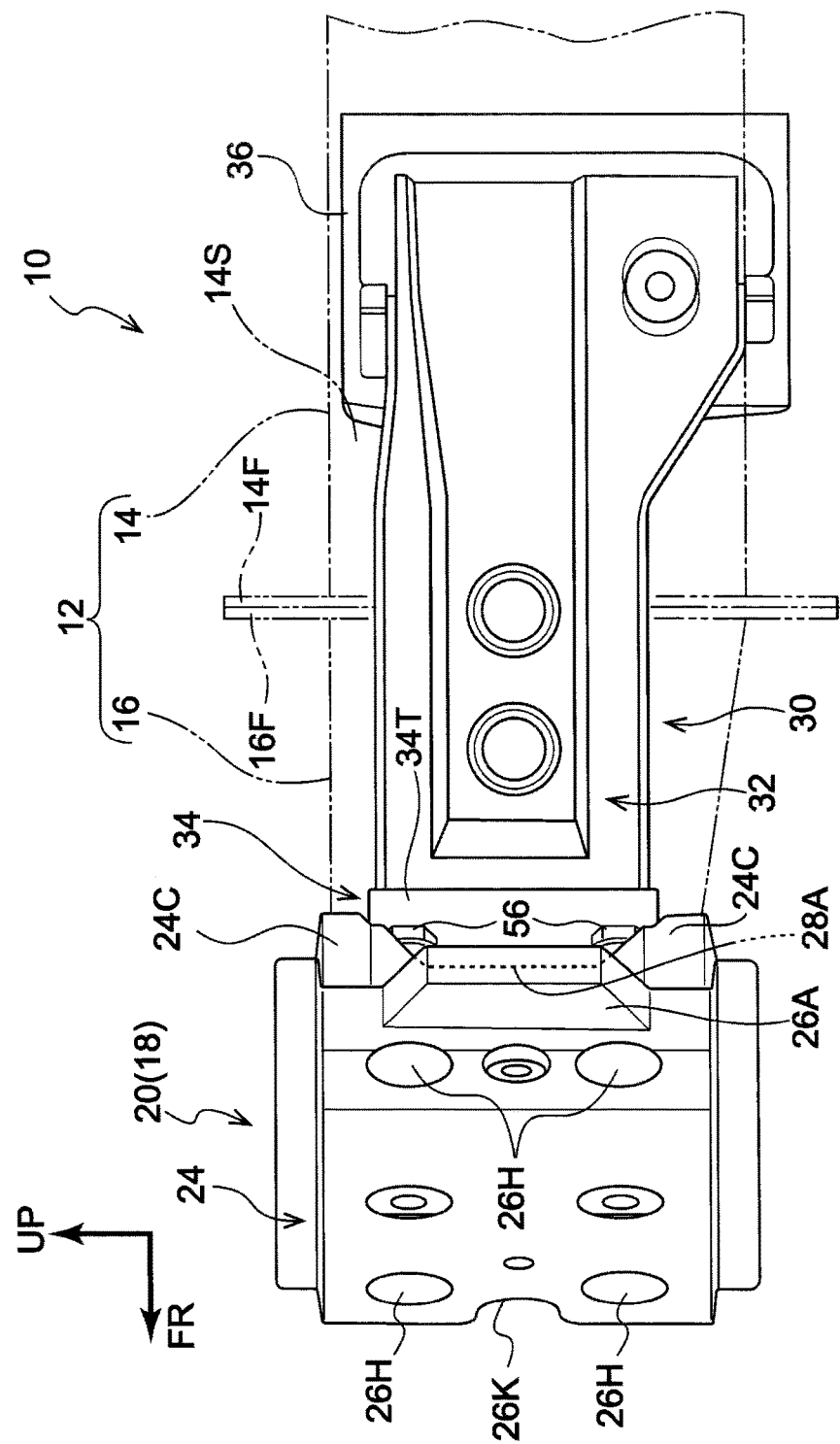
FIG. 3 is a side view illustrating relevant portions of a vehicle body end section structure according to the first exemplary embodiment.

As illustrated in FIG. 3, as viewed from the side, the rear portion of the spacer body 32 has a greater height in the up-down direction than the portion running from the front portion to the central portion of the spacer body 32. In the present exemplary embodiment, configuration is made so as to bulge gradually downward, increasing the up-down height on progression from the vicinity of the front end of the portion that is curved in plan view, as mentioned above, to a connection portion with the slide plate portion 36. Note that an upper face of the spacer body 32 drops down gently and continuously, within a range in which the up-down height gradually increases as mentioned above.

Figure 7A:
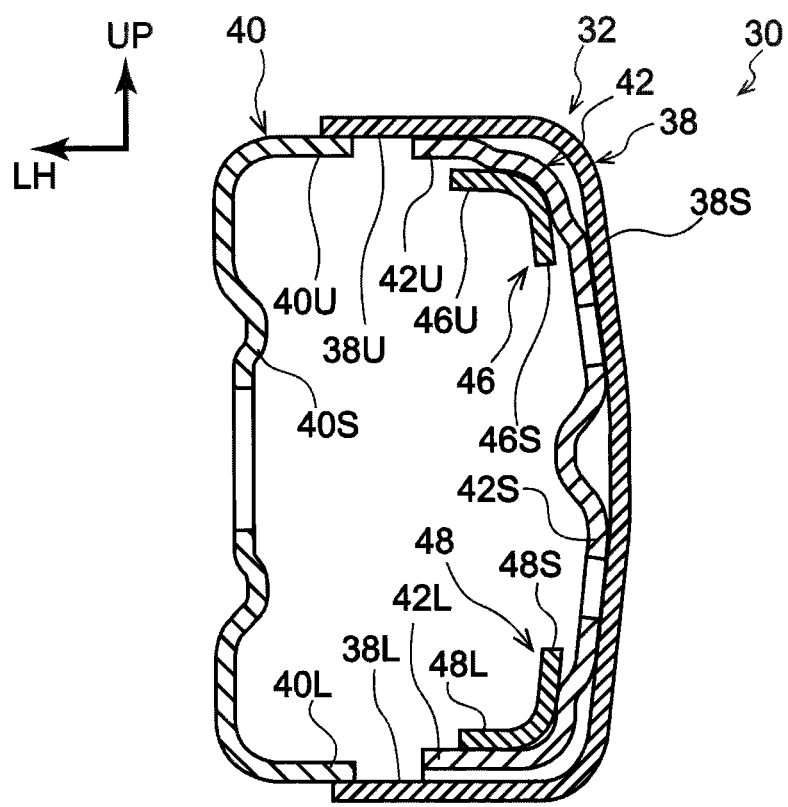
FIG. 7A is a cross-section taken along line 7A-7A in FIG. 2.
Figure 7B:
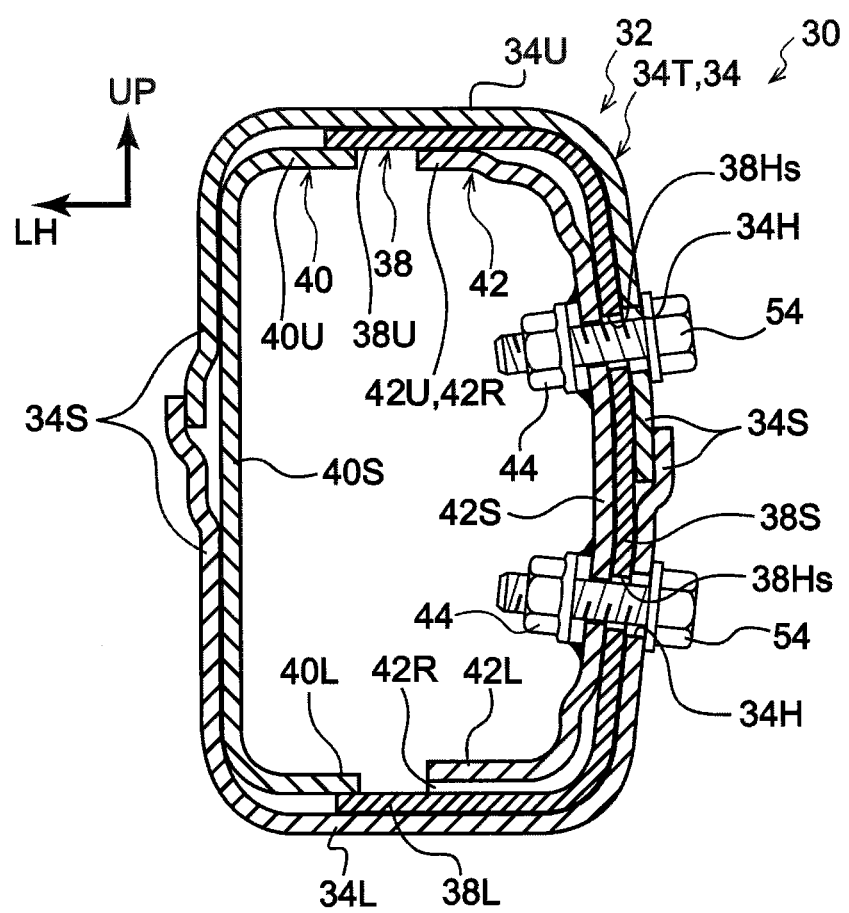
FIG. 7B is a cross-section taken along line 7B-7B in FIG. 2.

As illustrated in cross-section in FIG. 7A and FIG. 7B, the external profile of the spacer body 32 is defined by an inner panel 38 serving as an inside member, and an outer panel 40 serving as an outside member, joined together to configure a closed cross-section structure. As illustrated in the exploded perspective view of FIG. 6, the inner panel 38 has an angular, or rounded, substantially U-shaped cross-section open toward the vehicle width direction outside as viewed in cross-section taken orthogonally to the length (substantially front-rear) direction. More specifically, the inner panel 38 is configured including an upright wall 38S configuring an inside wall and serving as a second wall of the spacer body 32, and an upper wall 38U and lower wall 38L jutting out from the upper and lower ends of the upright wall 38S toward the vehicle width direction outside. A front portion of the upright wall 38S is formed with a pair of upper and lower bolt holes 38Hs for joining to the front side fixing portion 34.

Figure 5:
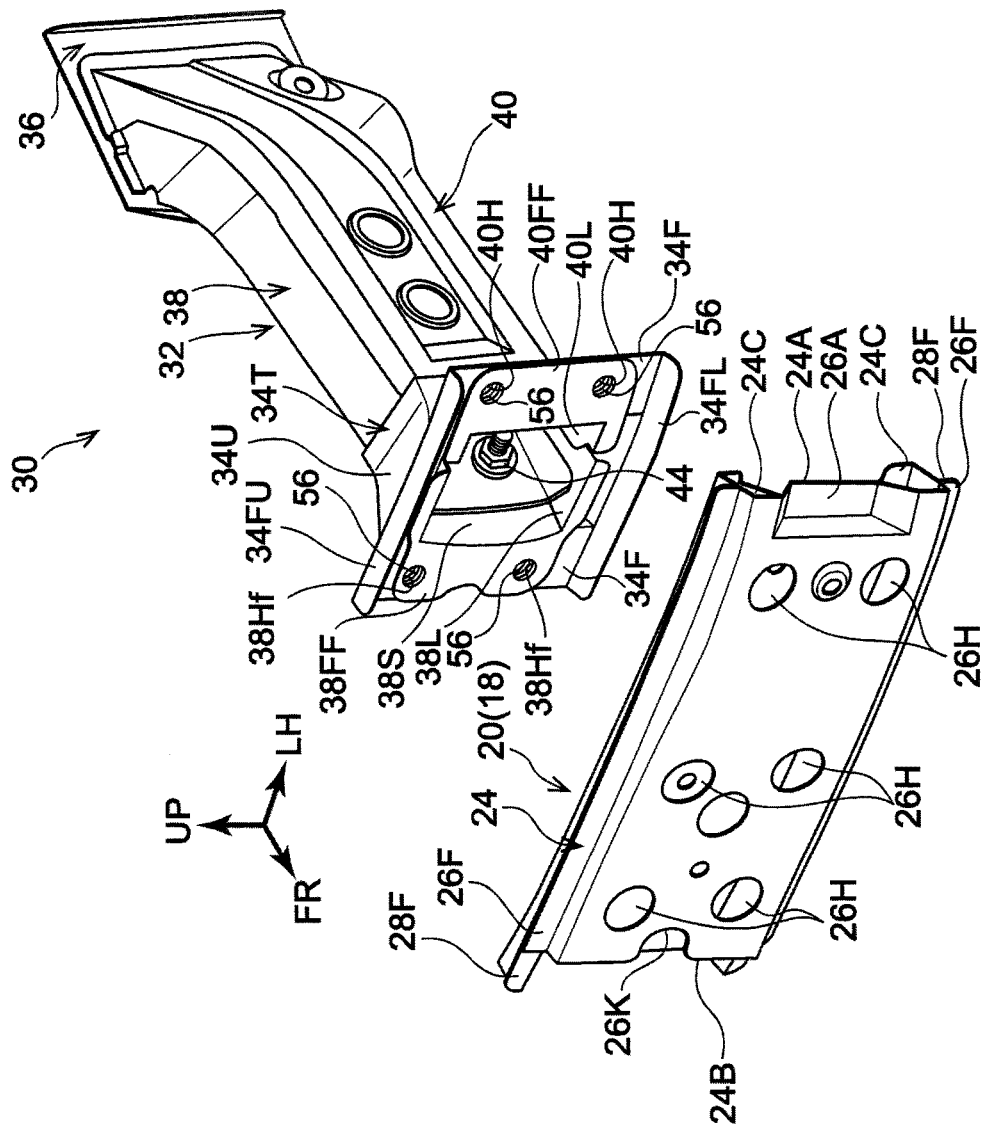
FIG. 5 is a partially exploded perspective view illustrating relevant portions of a vehicle body end section structure according to the first exemplary embodiment.

In the present exemplary embodiment, as illustrated in cross-section in FIG. 5 and FIG. 6, at a front end of the inner panel 38, a front flange 38FF facing substantially toward the front is formed jutting out from the upright wall 38S, the upper wall 38U, and the lower wall 38L toward the outside of the closed cross-section of the spacer body 32. A pair of upper and lower bolt holes 38Hf are formed to a portion of the front flange 38FF jutting out to the vehicle width direction inside of the upright wall 38S. The upright wall 38S is not formed at a rear portion of the inner panel 38, and the upper wall 38U and the lower wall 38L extend further to the rear than the rear end of the upright wall 38S. Rear flanges 38FR that face toward the vehicle width direction inside, for joining to the slide plate portion 36, jut out toward the top and bottom from edge portions running in the front-rear direction of the respective portions of the upper wall 38U and the lower wall 38L extending further to the rear than the rear end of the upright wall 38S.

As viewed in cross-section taken orthogonally to the length (substantially front-rear) direction, in cross-section view the outer panel 40 forms a shallow angular, or rounded, substantially U-shape open toward the vehicle width direction inside. More specifically, the outer panel 40 is configured including an upright wall 40S configuring an outside wall, and serving as a third wall of the spacer body 32, and an upper wall 40U and lower wall 40L jutting out from the upper and lower ends of the upright wall 40S toward the vehicle width direction inside.

In the present exemplary embodiment, at the front end of the outer panel 40, a front flange 40FF is formed jutting out from the upright wall 40S, the upper wall 40U, and the lower wall 40L toward the outside of the closed cross-section of the spacer body 32. A pair of upper and lower bolt holes 40H are formed in a portion of the front flange 40FF jutting out from the upright wall 40S toward the vehicle width direction outside. At the rear end of the outer panel 40, a rear flange 40FR for joining to the slide plate portion 36 juts out from the upper wall 40U and the lower wall 40L toward the top, bottom, and rear, and faces toward the vehicle width direction inside.

As illustrated in cross-section in FIG. 7A and FIG. 7B, the inner panel 38 and the outer panel 40 are joined together at the upper wall 38U and the upper wall 40U, and at the lower wall 38L and the lower wall 40L, to form a rectangular shaped closed cross-section structure as viewed in cross-section taken orthogonally to the length direction. In the present exemplary embodiment, the inner panel 38 and the outer panel 40 are joined together by continuous arc welding along substantially the entire length of the spacer body 32.

As illustrated in FIG. 6 and in cross-section in FIG. 7, etc., the spacer body 32 is configured including inner reinforcement 42 serving as a reinforcement portion. Specifically, in the spacer body 32 that is formed so as to be angled and curved as described above, the inner panel 38 side configures a compression side when rearward load that has been input to the jutting-out portion 20 is transmitted through the slide plate portion 36 to the front side member 14. The inner reinforcement 42 is configured so as to reinforce the inner panel 38 side that is the compression side of the spacer body 32. In the present exemplary embodiment, as illustrated in FIG. 6 and FIG. 7, the inner reinforcement 42 has an angular, or rounded, substantially U-shaped cross-section open toward the vehicle width direction outside as viewed in cross-section taken orthogonally to the length (substantially front-rear) direction.

More specifically, the inner reinforcement 42 is configured including an upright wall 42S following the upright wall 38S of the inner panel 38, and an upper wall 42U and a lower wall 42L respectively jutting out from upper and lower ends of the upright wall 42S toward the vehicle width direction outside. The upright wall 42S has a corrugated structure (ribbed structure) to raise rigidity and strength, and has a perforated structure in order to reduce weight. A pair of upper and lower weld nuts 44 are provided at a front end side of the upright wall 42S so as to correspond to the bolt holes 38Hfs in the upright wall 38S configuring the inner panel 38. The weld nuts 44 are used in fastening of the front side fixing portion 34, and the inner reinforcement 42 has a length extending from a fastening location of the front side fixing portion 34 to the rear end of the spacer body 32. As illustrated in FIG. 5, a front end of the inner reinforcement 42 is positioned slightly further to the rear side than the front end of the inner panel 38 (spacer body 32).

As illustrated in FIG. 6, protruding ribs 42R protruding out toward the top and bottom respectively are formed intermittently along vehicle width direction outer end sides, configuring free ends, of the upper wall 42U and the lower wall 42L. The inner panel 38 and the inner reinforcement 42 are intermittently joined together along the front-rear direction between the upper wall 38U and the protruding ribs 42R of the upper wall 42U, and are intermittently joined together along the front-rear direction between the lower wall 38L and the protruding ribs 42R of the lower wall 42L (not illustrated in the drawings). In the present exemplary embodiment, the inner panel 38 and the outer panel 40 are joined together by arc welding along substantially the entire length of the respective protruding ribs 42R. In this joined state, as illustrated in FIG. 7A and FIG. 7B, (a general portion of) the upright wall 42S is either in contact with, or very close to, an inner face of the upright wall 38S of the inner panel 38.

As illustrated in FIG. 6 and FIG. 7A, the spacer body 32 is configured including a pair of upper and lower corner reinforcement members 46, 48, disposed inside the closed cross-section configured by the inner panel 38 and the outer panel 40. As illustrated in FIG. 6, the corner reinforcement members 46, 48 are each long in the length direction of the spacer body 32, and are formed by an angled material with a substantially L-shaped cross-section taken orthogonally to the length direction. More specifically, the upper side corner reinforcement member 46 includes an upright wall 46S following the upright wall 42S of the inner reinforcement 42, and an upper wall 46U jutting from an upper end of the upright wall 46S out toward the vehicle width direction outside. The lower side corner reinforcement member 48 includes an upright wall 48S following the upright wall 42S of the inner reinforcement 42, and a lower wall 48L jutting out from a lower end of the upright wall 48S toward the vehicle width direction outside.

As illustrated in FIG. 7B, the upper side corner reinforcement member 46 is joined to the upright wall 42S of the inner reinforcement 42 at a free end (lower edge) of the upright wall 46S, and is joined to the upper wall 42U of the inner reinforcement 42 at a free end (vehicle width direction outside edge) of the upper wall 46U. Joining is performed by continuous arc welding along the free ends of the upright wall 46S and the upper wall 46U. The lower side corner reinforcement member 48 is joined to the upright wall 42S of the inner reinforcement 42 at a free end (upper edge) of the upright wall 48S, and is joined to the lower wall 42L of the inner reinforcement 42 at a free end (vehicle width direction outside edge) of the lower wall 48L. Joining is performed by continuous arc welding along the free ends of the upright wall 48S and the lower wall 48L.

Front Side Fixing Portion

As illustrated in FIG. 2 to FIG. 5, the front side fixing portion 34 is provided to the front end of the spacer body 32 and forms a fixing location of the slide spacer 30 to the jutting-out portion 20. In the present exemplary embodiment, four bolts 58 that penetrate the bolt holes 28Hc, 28Ho of the rear panel 28 configuring the extension 24 are employed to fix the front side fixing portion 34 to the extension 24 (jutting-out portion 20). Specific explanation follows hereafter.

As illustrated in FIG. 2, the front side fixing portion 34 includes a rectangular tube shaped tube portion 34T that fits together with a front end portion of the spacer body 32, and a front flange 34F that juts out from both the left and right sides of the tube portion 34T. The tube portion 34T is formed by joining together a pair of left and right side walls 34S at the top and bottom with an upper wall 34U and a lower wall 34L. The front side fixing portion 34 also includes an upper flange 34FU and a lower flange 34FL respectively jutting out toward the front from upper and lower ends of the front flange 34F and the upper and lower walls 34U, 34L of the tube portion 34T. As described in detail later, the front side fixing portion 34 is configured by an upper panel 50 and a lower panel 52 that are divided from top to bottom.

Although not illustrated in the drawings, the pair of left and right side walls 34S configuring the tube portion 34T contact inner and outer side walls (the upright walls 38S, 40S) of the spacer body 32 over substantially their entire faces. Rear portions of the upper wall 34U and the lower wall 34L contact upper and lower wall portions (the upper and lower walls 38U, 38L of the inner panel 38 illustrated in FIG. 7B) of the spacer body 32. The upper wall 34U and the lower wall 34L gradually move away (in a tapered shape) from the upper and lower wall portions of the spacer body 32 on progression from an intermediate portion toward the front portion. More specifically, the upper wall 34U is inclined so as to be positioned higher on progression toward the front, and the lower wall 34L is inclined so as to be positioned lower on progression toward the front. Front ends of the upper wall 34U and the lower wall 34L are respectively contiguous to the upper flange 34FU and the lower flange 34FL.

In the present exemplary embodiment, as illustrated in FIG. 6, the front side fixing portion 34 has a two-part upper and lower structure, configured by joining together the upper panel 50 and the lower panel 52. The upper panel 50 and the lower panel 52 are formed with substantially up-down symmetry so as to divide the front side fixing portion 34 into top and bottom at the pair of side walls 34S and the front flange 34F. Note that the upper panel 50 and the lower panel 52 overlap in the plate thickness direction at the pair of side walls 34S and the front flange 34F, and the overlapping portions do not have up-down symmetry (see FIG. 7B and FIG. 8). The upper panel 50 and the lower panel 52 are joined together by arc welding at the overlapping portions. At joint (divided) portions of the upper panel 50 and the lower panel 52, portions between the front flange 34F and the side walls 34S configure angled portions 34K that are angled with respect to both the side walls 34S and the front flange 34F.

The vehicle width direction inside side wall 34S of the front side fixing portion 34 is formed with a pair of upper and lower bolt holes 34H corresponding to the bolt holes 38Hs of the inner panel 38 configuring the spacer body 32. The front side fixing portion 34 is fastened to the spacer body 32 by screwing a pair of bolts 54 that pass through the bolt holes 34H, 34F, namely that pass through the side walls 34S, 38S, together with the weld nuts 44 of the inner reinforcement 42.

In this fixed state, the front flange 34F of the front side fixing portion 34 overlaps with the front flanges 38FF, 40FF of the spacer body 32 from the rear side, as illustrated in FIG. 5. Weld nuts 56 (see FIG. 2) are provided to a back face side of the front flange 34F so as to correspond to the upper and lower bolt holes 38Hf, 40H of the front flanges 38FF, 40FF. The front side fixing portion, namely the slide spacer 30, is fixed to the jutting-out portion 20, namely the bumper reinforcement 18, by screwing plural (a total of 4) bolts 58 into the corresponding weld nuts 56.

Figure 8:
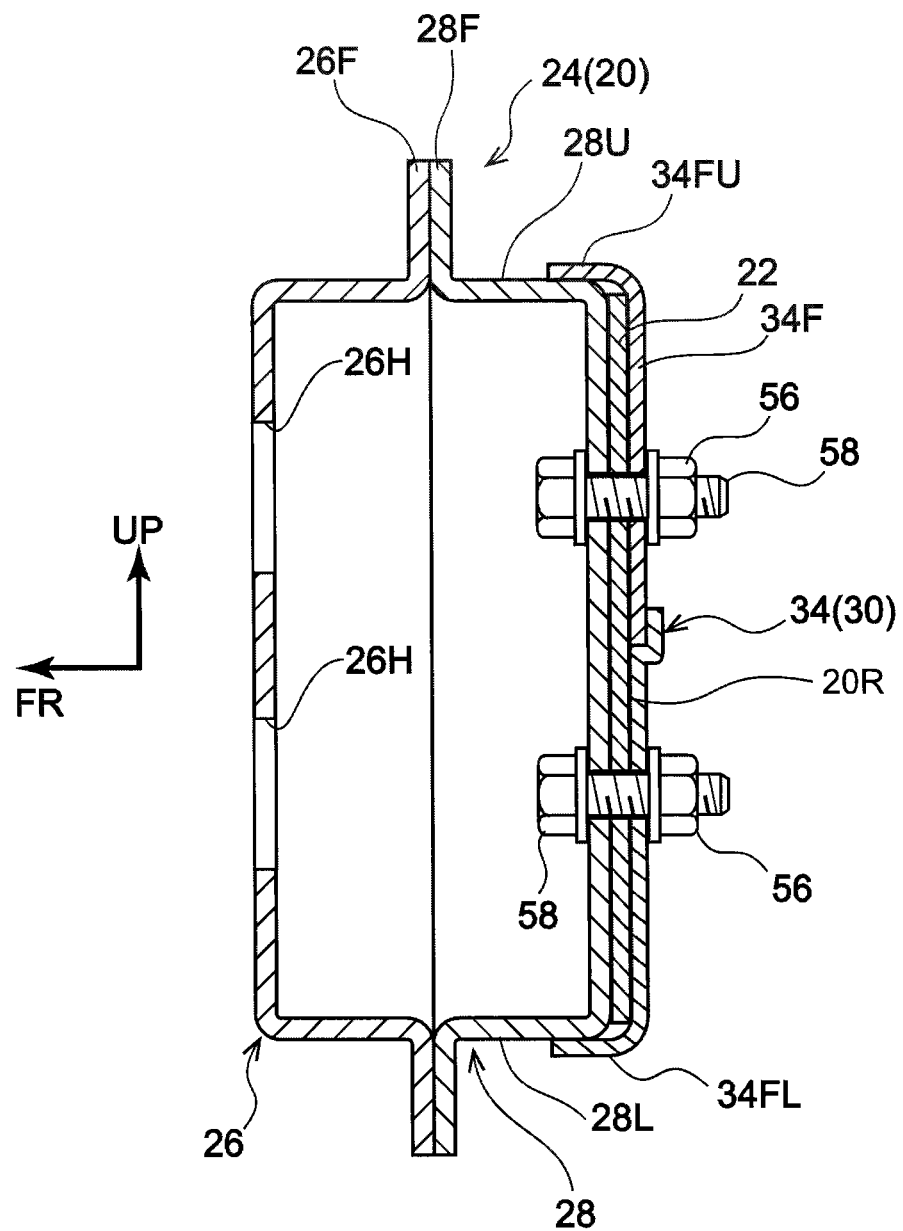
FIG. 8 is a cross-section taken along line 8-8 in FIG. 2.

In this state, the pair of upper and lower bolts 58 positioned relatively at the vehicle width direction inside pass through the reinforcement body 22, the rear panel 28 of the extension 24 (the bolt holes 28Hc), the bolt holes 38Hf of the inner panel 38, and the front flange 34F (see FIG. 8). Namely, the slide spacer 30 is jointly fastened to both the reinforcement body 22 and the extension 24 configuring the bumper reinforcement 18. However, the pair of upper and lower bolts 58 positioned relatively at the vehicle width direction outside pass through the rear panel 28 of the extension 24 (the bolt holes 28Ho), the bolt holes 40H of the outer panel 40, and the front flange 34F (not illustrated in the drawings). Namely, out of the configuration members of the bumper reinforcement 18, the slide spacer 30 is fixed to the extension 24.

In this state, as illustrated in FIG. 8, the upper flange 34FU and the lower flange 34FL face (or contact) upper and lower walls 28U, 28L of the rear panel 28 configuring the extension 24 in the up-down direction.

Slide Plate Portion

As illustrated in FIG. 2 and FIG. 3, the slide plate portion 36 is formed in a plate shape facing toward the vehicle width direction inside. The slide plate portion 36 is joined to the rear end of the spacer body 32. More specifically, it is joined to the respective rear flanges 38FR, 40FR of the inner panel 38 and outer panel 40 configuring the spacer body 32. The rear flanges 38FR of the inner panel 38 are joined to the slide plate portion 36 by arc welding along upper and lower edge portions of the rear flanges 38FR. The rear flange 40FR of the outer panel 40 is joined to the slide plate portion 36 by arc welding along substantially the entire length of a peripheral edge portion of the rear flange 40FR.

The slide plate portion 36 faces the side face 14S of the front side member 14 from the vehicle width direction outside, across the gap C. Namely, in the present exemplary embodiment, the rear end of the slide spacer 30 is not restrained by (is free with respect to) the front side member 14 (the framework member 12). The slide spacer 30 is thereby configured so as to slide along the side face 14S of the front side member 14 accompanying compression deformation of the crash box 16. This configuration of the slide plate portion 36 facing the front side member 14 in a non-restrained state corresponds to a non-coupled structure of the present invention, and configures a slide permitting structure of the present invention together with the structure described above by which the spacer body 32 curls around the flanges 14F, 16F of the framework member 12.

Placement of the Slide Spacer, Etc.

As illustrated in FIG. 1 and FIG. 2, the entire slide spacer 30 described above is positioned further to the vehicle width direction inside than the vehicle width direction outside end 24A of the extension 24 configuring the jutting-out portion 20 of the bumper reinforcement 18. As described above, the slide spacer 30 is moreover formed with an angled and curved shape, such that the front end side thereof is positioned further toward the vehicle width direction outside than the rear end side.

Note that a trajectory T, illustrated by a single-dotted intermittent line in FIG. 1, is a rotation trajectory of the vehicle width direction outside end 24A of the extension 24 about a connection location J between the right side (vehicle width direction opposite side) framework member 12 (crash box 16) and the bumper reinforcement 18. As can be seen from FIG. 1, in the vehicle body front section structure 10, the trajectory T is configured so as not to impinge on a front wheel Wf of the vehicle A. With respect to the trajectory T, the entire slide spacer 30 is moreover disposed on the side of the connection location J, this being the center of rotation. The placement, dimensions and shape of the slide spacer 30 are accordingly determined so as not to impinge on the front wheel Wf accompanying rotation about the connection location J.

Namely, the extension 24 and slide spacer 30 configuring the vehicle body front section structure 10 are configured so as not to impinge on the front wheel Wf accompanying rotation of the extension 24 and slide spacer 30 about the connection location J that is positioned on the vehicle width direction opposite side with respect to the vehicle width direction center. The extension 24 and the slide spacer 30 are preferably configured so as not to impinge on a wheel housing (not illustrated in the drawings) housing the front wheel Wf accompanying rotation of the extension 24 and slide spacer 30 about the connection location J that is positioned on the vehicle width direction opposite side with respect to the vehicle width direction center.

Operation

Explanation follows regarding operation of the first exemplary embodiment.

Minor Collision

In a minor collision (a collision at 15 km/h or below) to the front section of the vehicle A applied with the vehicle body front section structure 10 configured as described above, the crash boxes 16 undergo compression deformation due to load that has been input to the bumper reinforcement 18, thereby absorbing collision energy. If the minor collision is an offset collision, the compression amount of the crash box 16 on the collision side is greater than the compression amount of the crash box 16 on an opposite side to the collision side. The compression amount of the crash box 16 on the collision side is also greater than the compression amount of the crash box 16 in a full overlap frontal collision at the same speed (when energy is absorbed by the two crash boxes).

In a comparative example in which spacer members, that transmits load that has been input to the jutting-out portion 20 to the framework member 12, are disposed projecting out to the opposite side with respect to the trajectory T described above from the connection location J that is the center of rotation, it is conceivable that the spacer members may impinge on the front wheel Wf in an offset collision. This gives rise to the concern that even in a minor collision, impinging in this manner could result in damage to the front wheel Wf, deformation of suspension arms, or the like, making the vehicle A difficult to drive, and leading to expensive repair costs.

In contrast, in the vehicle body front section structure 10 according to the present exemplary embodiment, the slide spacer 30 is disposed on the connection location J side with respect to the rotation trajectory T of the outside end 24A of the extension 24 in the event that the outside end 24A moves about the connection location J on the opposite side to the collision side. In other words, in the vehicle body front section structure 10, configuration is made such that the rotation trajectory T of the extension 24 about the connection location J between the crash box 16 on the opposite side to the collision side and the bumper reinforcement 18 does not impinge on the front wheel Wf. This enables the slide spacer 30 to be prevented or effectively suppressed from impinging on the front wheel Wf, even with a large compression amount of the crash box 16 on the collision side. The likelihood of the vehicle A becoming difficult to drive, leading to expensive repair costs, after being involved in a minor collision is therefore greatly reduced in comparison to the comparative example.

Small Overlap Collision (Passing Collision)

In a small overlap collision of the vehicle A applied with the vehicle body front section structure 10 configured as described above, the jutting-out portion 20 is input with rearward collision load. Note that a small overlap collision is a collision mode in which collision load is input to the front section of the vehicle A at the vehicle width direction outside of the framework member 12, in other words a collision mode with a colliding body (illustrated by a barrier B in FIG. 1 etc.) at the vehicle width direction outside of the framework member 12.

When the jutting-out portion 20 (bumper reinforcement 18) bends (folds) due to the collision load, the slide plate portion 36 of the slide spacer 30 abuts the side face 14S of the front side member 14. A portion of the collision load that has been input to the jutting-out portion 20 is accordingly transmitted through the slide spacer 30 to the front side member 14 (a first load transmission mode).

Figure 9:
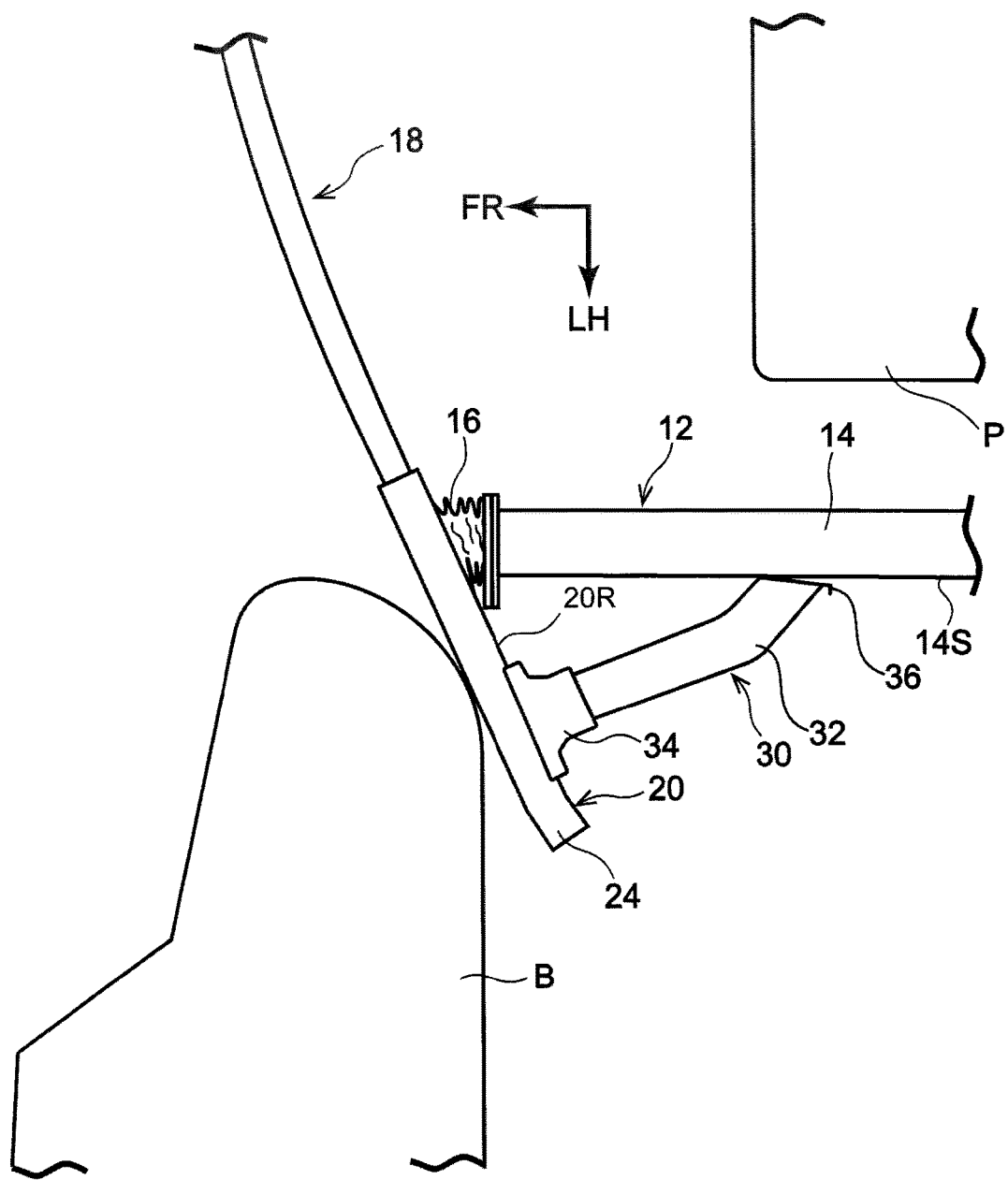
FIG. 9 is a plan view schematically illustrating a state in an initial stage of a small overlap collision with a vehicle body front section structure according to the first exemplary embodiment.

Namely, the bumper reinforcement 18 is supported at the jutting-out portion 20 from the rear by the slide spacer 30 and the front side member 14, preventing or effectively suppressing folding of the bumper reinforcement 18 at the connection location with the crash box 16. Another portion of the load that has been input to the jutting-out portion 20 is accordingly transmitted to the crash box 16 on the collision side, and the crash box 16 undergoes compression deformation as illustrated in FIG. 9. Energy absorption is accordingly exhibited in the initial stage of a small overlap collision.

As the crash box 16 undergoes compression deformation, load is transmitted to the front side member 14 while the slide plate portion 36 of the slide spacer 30 slides with respect to the front side member 14 (moves toward the rear while in contact). As the compression amount of the crash box 16 increases, the front side member 14, of which a load-receiving location moves toward the rear, also functions to guide the slide spacer 30 toward the rear, without the front side member 14 folding.

Figure 10:
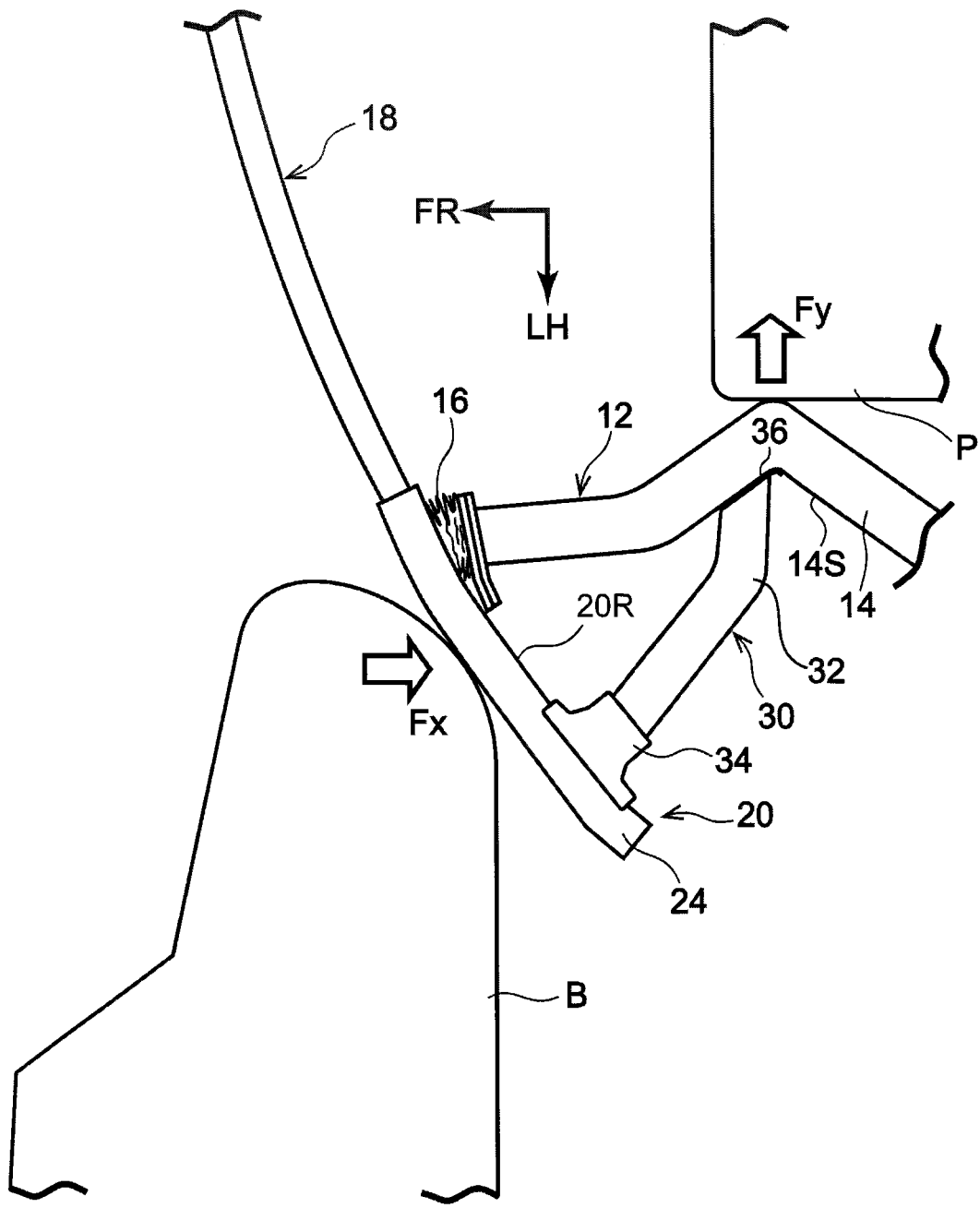
FIG. 10 is a plan view schematically illustrating a state in an intermediate stage of a small overlap collision with a vehicle body front section structure according to the first exemplary embodiment.

Sliding of the slide spacer 30 with respect to the front side member 14 is restricted once the crash box 16 has been compressed (crushed) to its limit. Collision load that continues to be input to the jutting-out portion 20 is accordingly input to a specific location of the front side member 14 as lateral force that is load toward the vehicle width direction inside, converted by the slide spacer 30 (a second load transmission mode). Accordingly, as illustrated in FIG. 10, the front side member 14 folds (deforms) toward the vehicle width direction inside, and load from the slide spacer 30 is transmitted through the front side member 14 into the power unit P (structural components and the like inside an engine compartment).

Collision load that has been input to the jutting-out portion 20 is thus transmitted to the vehicle rear and the opposite side to the collision side through the power unit P, supporting structures thereof, and the like (transmitted to respective sections of the vehicle body as front-rear direction load Fx and as vehicle width direction load Fy (lateral force)). This thereby enables heavy localized deformation of the collision side end section of the vehicle body in a small overlap collision to be prevented or effectively suppressed. Moreover, lateral force (inertia force) input to the power unit P that is (one) section where mass is concentrated in the vehicle A moves the vehicle A itself toward the opposite side to the collision side, eliminating or lessening the input of collision load to the jutting-out portion 20 per se. This also enables heavy localized deformation of the collision side end section of the vehicle body to be prevented or effectively suppressed.

The vehicle body front section structure 10 according to the first exemplary embodiment accordingly enables the slide spacer 30 that transmits load to the framework member 12 in a small overlap collision to be suppressed from impinging on the front wheel Wf in a minor collision.

In the vehicle body front section structure 10, the slide spacer 30 is formed angled and curved such that the rear end thereof is positioned further toward the vehicle width direction inside than the front end thereof. This thereby enables a configuration in which the slide spacer 30 fixed to the jutting-out portion 20 does not impinge on the front wheel Wf, while securing an overlap amount L (see FIG. 1) between the jutting-out portion 20 and the colliding body at the vehicle width direction outer end side of the vehicle A. Moreover, the angled and curved shape of the slide spacer 30 enables rearward load that has been input to the jutting-out portion 20 to be effectively converted into lateral force after compression of the crash box 16, thereby contributing to load transmission (distribution) toward the respective sections of the vehicle body due to folding of the front side member 14. Moreover, the rear end of the slide spacer 30 is configured by the slide plate portion 36 that faces the front side member 14 across the gap C. Accordingly, load can be effectively transmitted from the slide spacer 30 to the front side member 14 in either load transmission mode of the crash box 16, namely during a compression process (with folding of the jutting-out portion 20 prevented), or after compression (lateral force transmission to the front side member 14).

In the vehicle body front section structure 10, the vehicle width direction inside portion of the slide spacer 30, this being the compression side when the jutting-out portion 20 is input with rearward load, is reinforced by the inner reinforcement 42. More specifically, the closed cross-section structure configured by joining together the inner panel 38 and the outer panel 40 is reinforced by the inner reinforcement 42 at the inner panel 38 on the side subject to compression. Buckling of the compression side of the slide spacer 30 in a small overlap collision is accordingly prevented or effectively suppressed, and load that has been input to the jutting-out portion 20 is efficiently transmitted to the front side member 14.

Moreover, the vehicle body front section structure 10 is configured with the framework member 12 in which the crash box 16 is provided at the front end of the front side member 14, and the slide spacer 30 configured so as to transmit load to the front side member 14. In the present exemplary embodiment, the slide plate portion 36 of the slide spacer 30 is not restrained with respect to the front side member 14. The slide spacer 30, of which the front end side is fixed to the jutting-out portion 20, curls around the flanges 14F, 16F of the front side member 14 and the crash box 16 to face the side face 14S of the front side member at the rear end side. Accordingly, as described above, folding of the jutting-out portion 20 is suppressed by support from the rear by the slide spacer 30 and the front side member 14, such that a portion of the load that has been input to the jutting-out portion 20 is expended in compression of the crash box 16. This compression of the crash box 16 enables energy absorption to be exhibited in the initial stage of a small overlap collision.

Moreover, the bumper reinforcement 18 of the vehicle body front section structure 10 is configured with the extensions 24, configured from a stronger material that the material configuring the reinforcement body 22, joined to both ends of the reinforcement body 22. The extensions 24 are respectively provided over a range from the connection location J with the crash box 16 to the leading end of the bumper reinforcement 18, namely the leading end of the jutting-out portion 20. The jutting-out portions 20 are less liable to undergo bending deformation (fold) or undergo cross-sectional crushing in a small overlap collision than if the bumper reinforcement 18 were to be configured from extrusion-molded aluminum along its entire length. This thereby enables efficient transmission of collision load from the jutting-out portions 20 and through the slide spacers 30 to the front side members 14.

Other Exemplary Embodiments

Explanation follows in sequence regarding other exemplary embodiments. Note that configurations substantially the same as those of the exemplary embodiment described above are allocated the same reference numerals as in the exemplary embodiment described above, and explanation and illustration thereof may be omitted.

Second Exemplary Embodiment

Explanation follows regarding a vehicle body front section structure 60 according to a second exemplary embodiment of the present invention, with reference to FIG. 11 and FIG. 12. FIG. 11 is an exploded perspective view corresponding to FIG. 6, illustrating a slide spacer 62 serving as a spacer member configuring the vehicle body front section structure 60. The vehicle body front section structure 60 has similar configuration to the vehicle body front section structure 10 according to the first exemplary embodiment, with the exception of the slide spacer 62 provided in place of the slide spacer 30, and a retaining structure of the slide spacer 62 with respect to the front side member 14.

As illustrated in FIG. 11, the slide spacer 62 includes a slide plate portion 64 in place of the slide plate portion 36. The slide plate portion 64 is configured including a slide plate 66 facing the side face 14S of the front side member 14 across the gap C, and a fastened member 68, serving as a fastened portion, fastened to the front side member 14. In the present exemplary embodiment, the slide plate 66 has a similar external shape to the slide plate portion 36. The fastened member 68 is configured as a separate member, and is joined to the slide plate 66. Detailed explanation follows herebelow.

Between upper and lower flanges 68F that are joined to the slide plate 66, the fastened member 68 is configured with a raised seat portion 68A projecting out further toward the vehicle width direction inside than the slide plate 66. Namely, the fastened member 68 has a substantially hat-shaped cross-section orthogonal to the front-rear direction. The raised seat portion 68A is formed with a slit 68S that is long in the front-rear direction and open toward the front. The fastened member 68 is fastened to the front side member by a bolt 70 passing through the slit 68S.

Figure 12A:
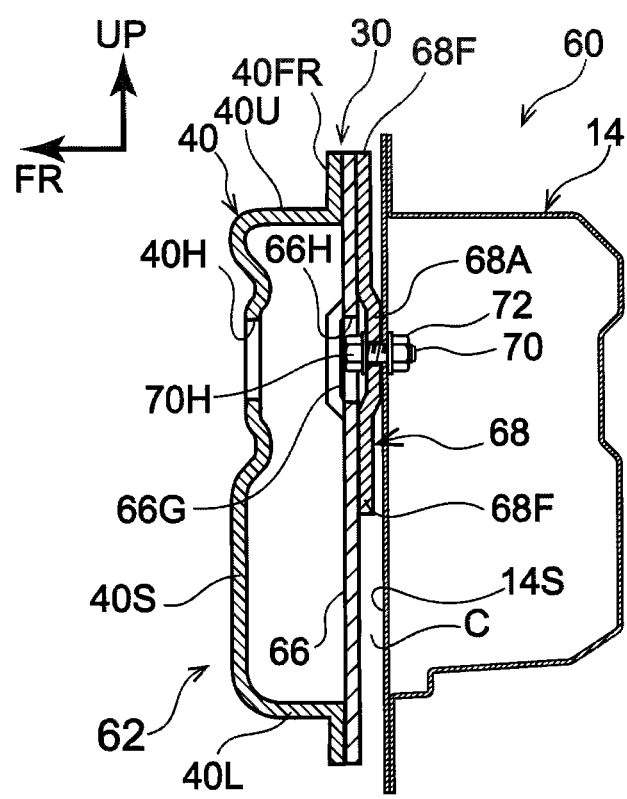
FIG. 12A illustrates relevant portions of a vehicle body end section structure according to the second exemplary embodiment, and is a front-on cross-section illustrating a fastened state of a slide spacer to a front side member.
Figure 12B:
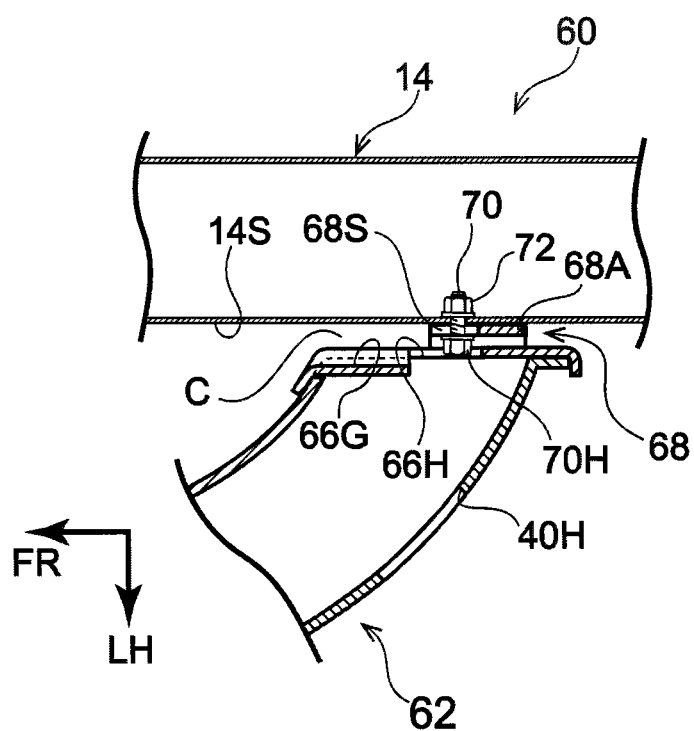
FIG. 12B illustrates relevant portions of a vehicle body end section structure according to the second exemplary embodiment, and is a plan view cross-section illustrating a fastened state of a slide spacer to a front side member.

Specifically, as illustrated in FIG. 12A and FIG. 12B, a weld nut 72 is provided to an outer panel 14A having the side face 14S that is the outside face of the front side member 14. The fastened member 68 is fastened and fixed to the front side member 14 by screwing the bolt 70 that has passed through the slit 68S into the weld nut 72. In the present exemplary embodiment, the bolt 70 and the weld nut 72 correspond to an embodiment of a restriction structure of the present invention.

Figure 12C:
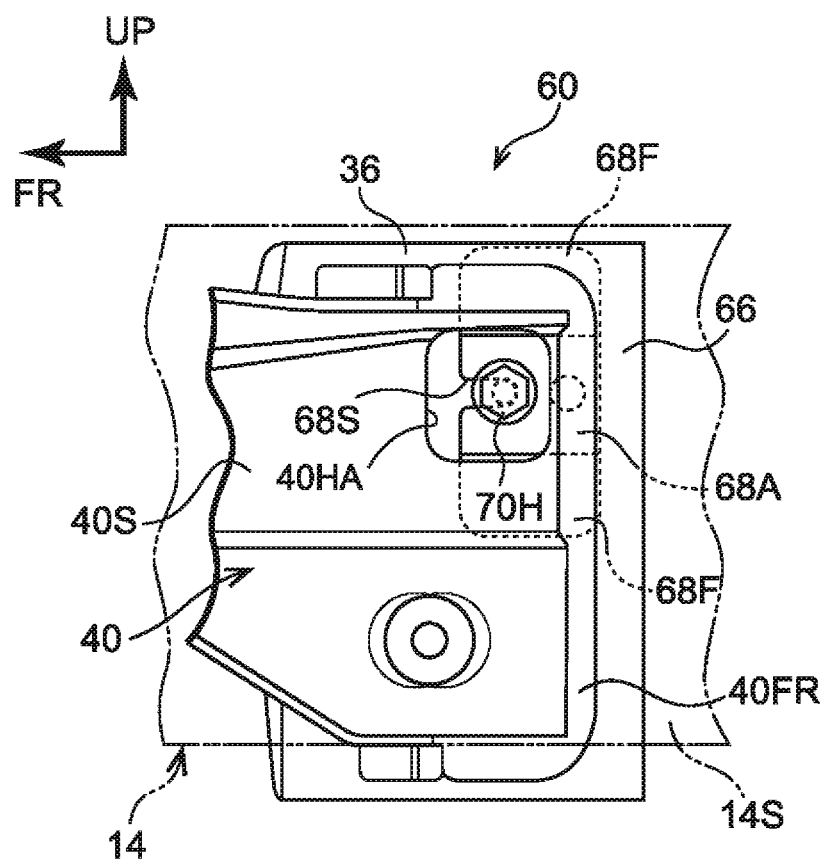
FIG. 12C illustrates relevant portions of a vehicle body end section structure according to the second exemplary embodiment, and is a side view illustrating a state in which a slide plate is guided by a bolt.

The slide plate 66 is formed with an access hole 66H to allow the bolt 70 and a tool to access the raised seat portion 68A of the fastened member 68. As illustrated in FIG. 12C, a rear portion of the outer panel 40 of the spacer body 32 configuring the slide spacer 62 is also formed with an access hole 40HA to allow the bolt 70 and the tool to access the raised seat portion 68A of the fastened member 68.

Due to fastening the fastened member 68 at the slit 68S, the bolt 70 comes out of the slit 68S in cases in which the slide spacer 62 is input with rearward load of a specific value or above. Namely, configuration is made such that the fastened state (restriction of relative displacement) of the slide spacer 62 by the bolt 70 and the weld nut 72 is released in the event of a collision to the jutting-out portion 20 at a set speed or above. The restriction structure of the present exemplary embodiment is thus configured so as to restrict relative displacement of the slide spacer 62 in any direction with respect to the front side member 14 in a state prior to a collision. Moreover, the restriction structure of the present exemplary embodiment is configured so as to release at least the restricted state of sliding toward the rear (one mode within relative displacements) following a collision, and corresponds to a coupled structure and slide permitting structure of the present invention. Note that the coupled structure and slide permitting structure of the present invention may, for example, employ a coupled structure that is partially or completely broken when the jutting-out portion 20 is input with collision load.

The slide plate 66 is formed with a guide groove 66G serving as a guided portion that is guided by the bolt 70, that is a member on the front side member 14 side, accompanying sliding of the slide spacer 62 toward the rear with respect to the front side member 14. As illustrated in FIG. 11 and FIG. 12B, the guide groove 66G is formed as a groove that is long in the front-rear direction and that is open toward the vehicle width direction inside.

Figure 12D:
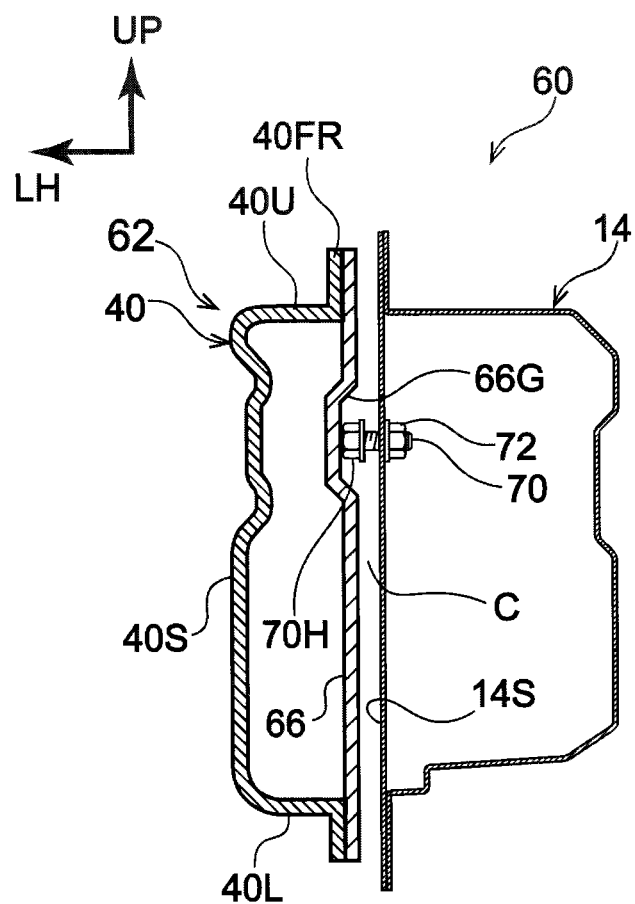
FIG. 12D illustrates relevant portions of a vehicle body end section structure according to the second exemplary embodiment, and is a front-on cross-section illustrating a state in which a slide plate is guided by a bolt.

The head 70H of the bolt 70 that has come out from the slit 68S, accompanying sliding of the slide spacer 62, namely the slide plate portion 64, with respect to the front side member 14, accordingly enters the guide groove 66G from the rear side thereof (see FIG. 12D). Namely, in the vehicle body front section structure 60, movement of the slide spacer 62 in the up-down direction (one mode of relative displacement) is restricted by the bolt 70. The bolt 70 and the guide groove 66G accordingly correspond to a front-rear guidance structure that is another embodiment of a restriction structure of the present invention.

Although not illustrated in the drawings, the slide spacer 62 is disposed on the connection location J side with respect to the rotation trajectory T. Other configurations of the vehicle body front section structure 60, including those of portions not illustrated in the drawings, are configured similarly to the corresponding configurations in the vehicle body front section structure 10.

Operation

Explanation follows regarding operation of the second exemplary embodiment, in particular regarding portions having operation that differs to that of the first exemplary embodiment.

In the vehicle body front section structure 60 configured as described above, the slide plate portion 64 that is a rear end portion of the slide spacer 62 is fastened to the front side member 14 by screwing the bolt 70 together with the weld nut 72. Displacement of the slide spacer 62 with respect to the vehicle body due to vibration or the like during normal operation prior to a collision is accordingly suppressed more effectively than in the slide spacer 30 having a cantilever structure. The slide spacer 62 also faces the side face 14S of the front side member 14 without undergoing positional displacement during normal operation. Namely, the slide spacer 62 is retained at an appropriate position with respect to the front side member 14 prior to a small overlap collision.

When the vehicle A applied with the vehicle body front section structure 60 is involved in a small overlap collision, and the jutting-out portion 20 is input with rearward collision load, the slide spacer 62 moves toward the rear with respect to the front side member 14. Accompanying this movement, the bolt 70 comes out from the slit 68S of the fastened member 68. Note that this coming-out action may be understood as an initial slide mode of the slide spacer 62 with respect to the front side member 14. In the slide spacer 62, the bolt 70 then enters the guide groove 66G of the slide plate 66 configuring the slide plate portion 64, and the slide spacer 62 slides toward the rear while being guided (up and down positional displacement is restricted) by the head 70H of the bolt 70. Subsequent operation is basically the same as the operation of the vehicle body front section structure 10 according to the first exemplary embodiment.

Third Exemplary Embodiment

Figure 13A:
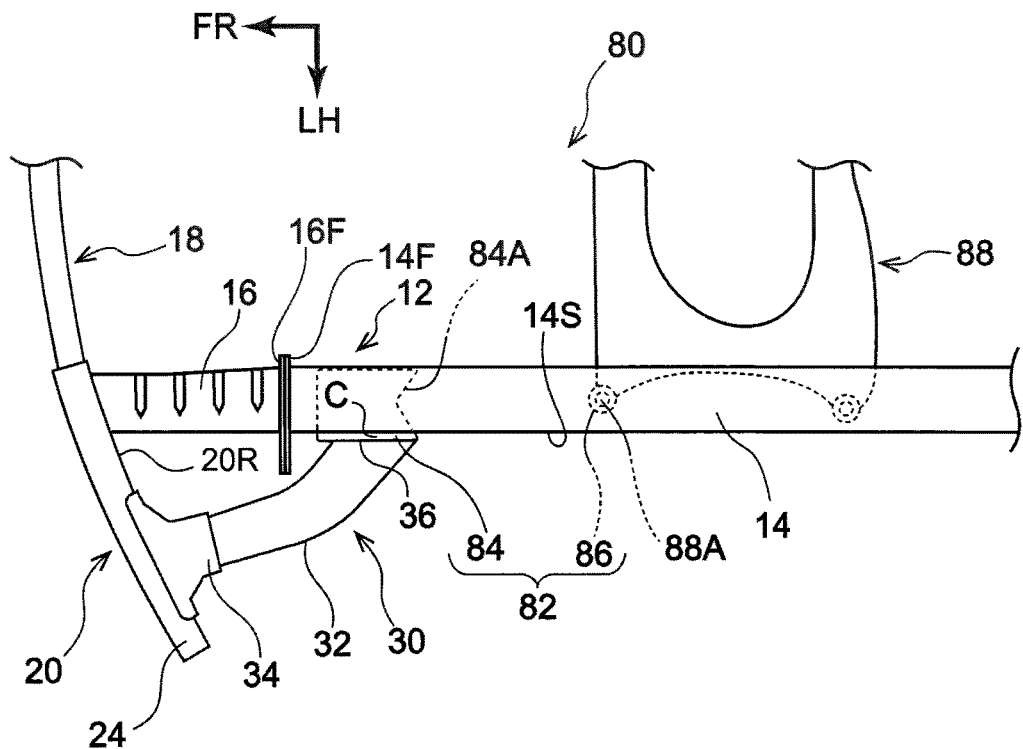
FIG. 13A is a plan view illustrating relevant portions of a vehicle body end section structure according to a third exemplary embodiment.
Figure 13B:
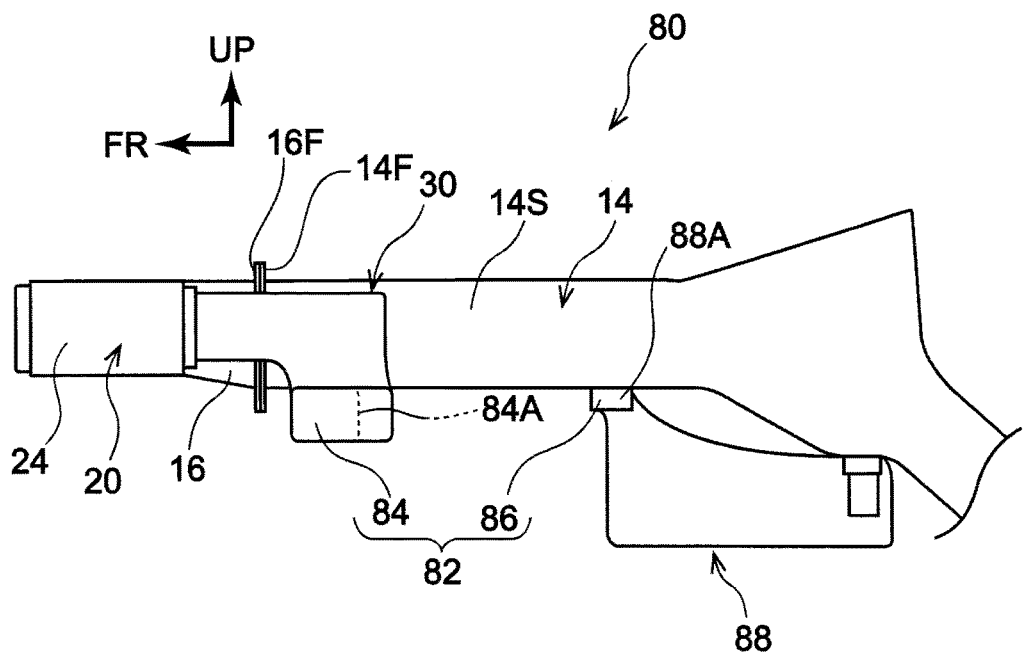
FIG. 13B is a side view illustrating relevant portions of a vehicle body end section structure according to the third exemplary embodiment.

Explanation follows regarding a vehicle body front section structure 80 according to a third exemplary embodiment of the present invention, with reference to FIG. 13A to FIG. 14B. FIG. 13A is a plan view schematically illustrating a partial configuration of a left end side of the vehicle body front section structure 80, and FIG. 13B is a side view schematically illustrating a partial configuration of the vehicle body front section structure 80. The vehicle body front section structure 80 has similar configuration to the vehicle body front section structure 10 according to the first exemplary embodiment, with the exception of a stopper structure 82 that restricts sliding of the slide spacer 30. Detailed explanation follows thereof.

The stopper structure 82 includes a stopped member 84, serving as an abutting portion, provided at a rear end side of the slide spacer 30. The stopped member 84 is configured so as to move toward the rear with respect to the front side member 14 accompanying sliding of the slide spacer 30 with respect to the front side member 14 as a result of rearward load that has been input to the jutting-out portion 20. When a movement amount of the stopped member 84 toward the rear with respect to the front side member 14 reaches a set movement amount, the stopped member 84 abuts a vehicle body side stopper portion 86 from the front side. Further movement of the stopped member 84 toward the rear with respect to the front side member 14, namely further sliding of the slide spacer 30, is accordingly restricted (blocked).

Note that the vehicle body side stopper portion 86 of the present exemplary embodiment is configured on a suspension member 88 that is supported by the front side member 14. To describe the suspension member 88 in more detail, the suspension member 88 of the present exemplary embodiment is a member formed in a substantially rectangular frame shape in plan view, and supports the front wheel Wf (not illustrated in FIG. 13A to FIG. 14B) through a lower arm, not illustrated in the drawings. A front side corner portion of the suspension member 88 is coupled to a front-rear direction intermediate portion of the front side member 14. A rear side corner portion of the suspension member 88 is coupled to a portion of the front side member 14 positioned below the dash panel, not illustrated in the drawings.

In the present exemplary embodiment, a front side coupling portion 88A of the suspension member 88 to the front side member 14 is either directly coupled to the front side member 14, or indirectly coupled through a mounting member. The front side coupling portion 88A functions as the vehicle body side stopper portion 86 that is abutted by the stopped member 84 (that stops the stopped member 84) moving relatively toward the rear. In the present exemplary embodiment, the stopped member 84 is configured with a recess (notch) 84A open toward the rear, into which enters the vehicle body side stopper portion 86 that is substantially circular shaped in plan view. In the present exemplary embodiment, an edge portion of the recess 84A is formed with a substantially V-shape in plan view.

In the stopper structure 82, the stroke of the stopped member 84 before it abuts the vehicle body side stopper portion 86 is set equal to, or longer than, the length (or the difference in length before and after compression) of the crash box 16. The stopper structure 82 is accordingly suppressed from obstructing compression of the crash box 16.

Operation

Explanation follows regarding operation of the third exemplary embodiment, in particular regarding portions having operation that differs to that of the first exemplary embodiment.

Figure 14A:
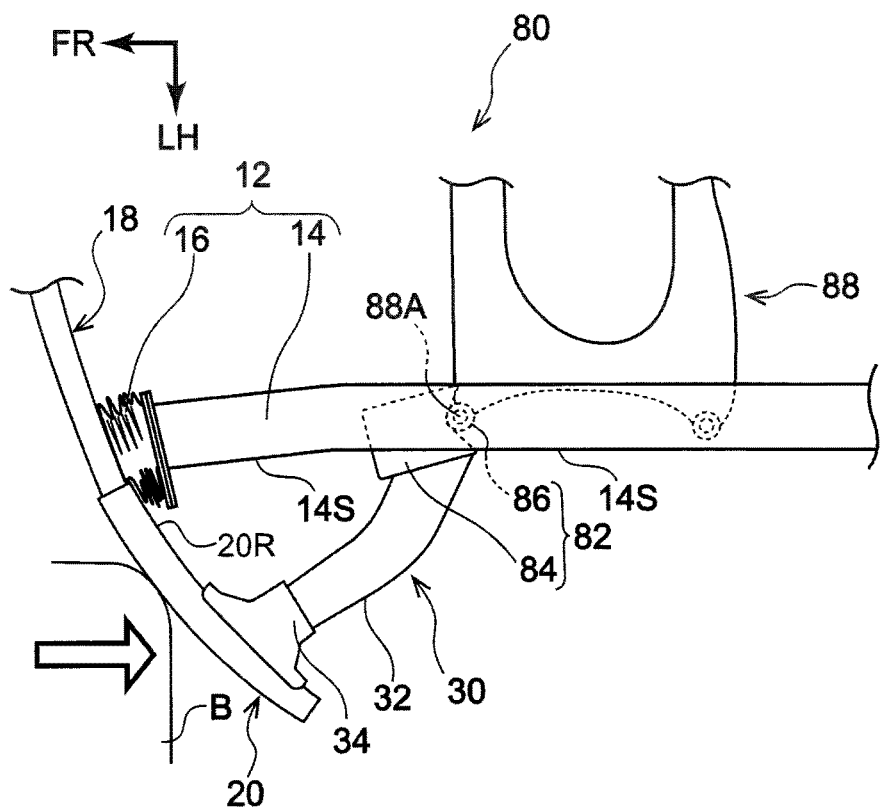
FIG. 14A is a drawing to explain operation of a vehicle body end section structure according to the third exemplary embodiment, and is a plan view illustrating the start of slide restriction of a slide spacer by a stopper structure.

In the vehicle body front section structure 80 configured as described above, when the vehicle A applied with the vehicle body front section structure 80 is involved in a small overlap collision, and the jutting-out portion 20 is input with rearward collision load, the crash box is compressed and exhibits energy absorption in the initial collision stage similarly to in the first exemplary embodiment. Once the crash box 16 has been compressed (crushed) to its limit, the stopped member 84 of the stopper structure 82 abuts the vehicle body side stopper portion 86 as illustrated in FIG. 14A.

Figure 14B:
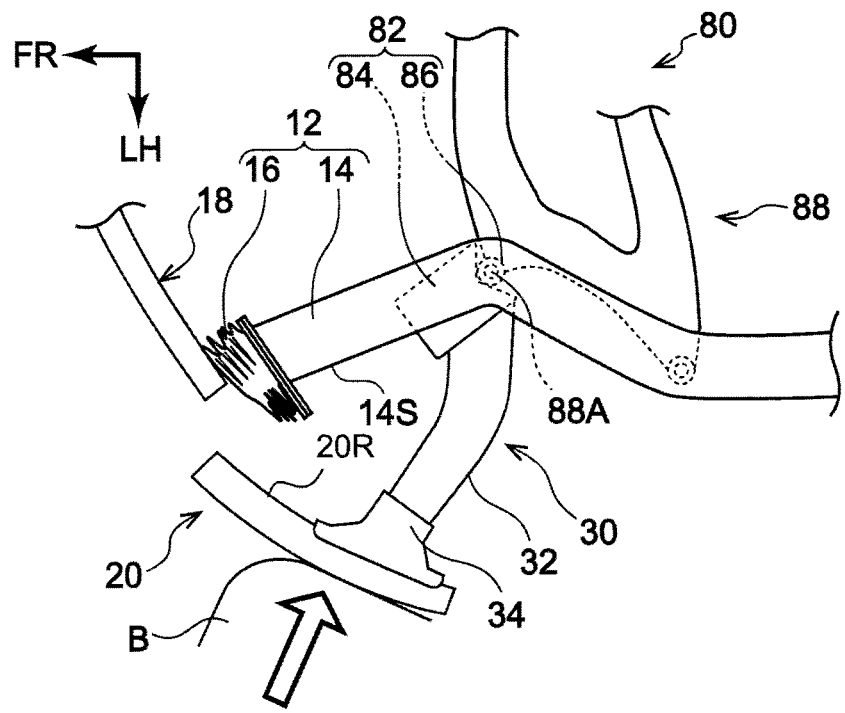
FIG. 14B is a drawing to explain operation of a vehicle body end section structure according to the third exemplary embodiment, and is a plan view illustrating the aftermath of slide restriction of a slide spacer by a stopper structure.

Further displacement of the slide spacer 30 toward the vehicle rear is accordingly blocked. When this occurs, the slide spacer 30 presses the front side member 14 toward the vehicle width direction inside while undergoing rotational displacement about the vehicle body side stopper portion 86 due to collision load that continues to be input to the jutting-out portion 20. Namely, lateral force acts on the front side member 14 through the slide spacer 30, such that the front side member 14 folds toward vehicle width direction inside as illustrated in FIG. 14B, transmitting load to the power unit P. Subsequent operation is basically the same as operation of the vehicle body front section structure 10 according to the first exemplary embodiment.

A folding location and folding start timing of the front side member 14 can accordingly be controlled due to providing the vehicle body front section structure 80 with the stopper structure 82. Namely, transition from an energy absorption mode in the initial stage, in which the crash box 16 is compressed, to a lateral force generation mode in an intermediate-to-final stage, in which the front side member 14 is folded, can be controlled (mode-controlled) easily and reliably.

Moreover, due to employing the front side coupling portion 88A of the suspension member 88 to the front side member 14 as the vehicle body side stopper portion 86, the mode control described above can be achieved while suppressing an increase in the number of components. The stopper structure 82, configured without joining a dedicated stopper member on the front side member 14 side or the like, either does not affect impact absorption performance in collision modes other than a small overlap collision (such as a full overlap collision or an offset collision), or any effect is very small.

Modified Examples of the Stopper Structure

Figure 15A:
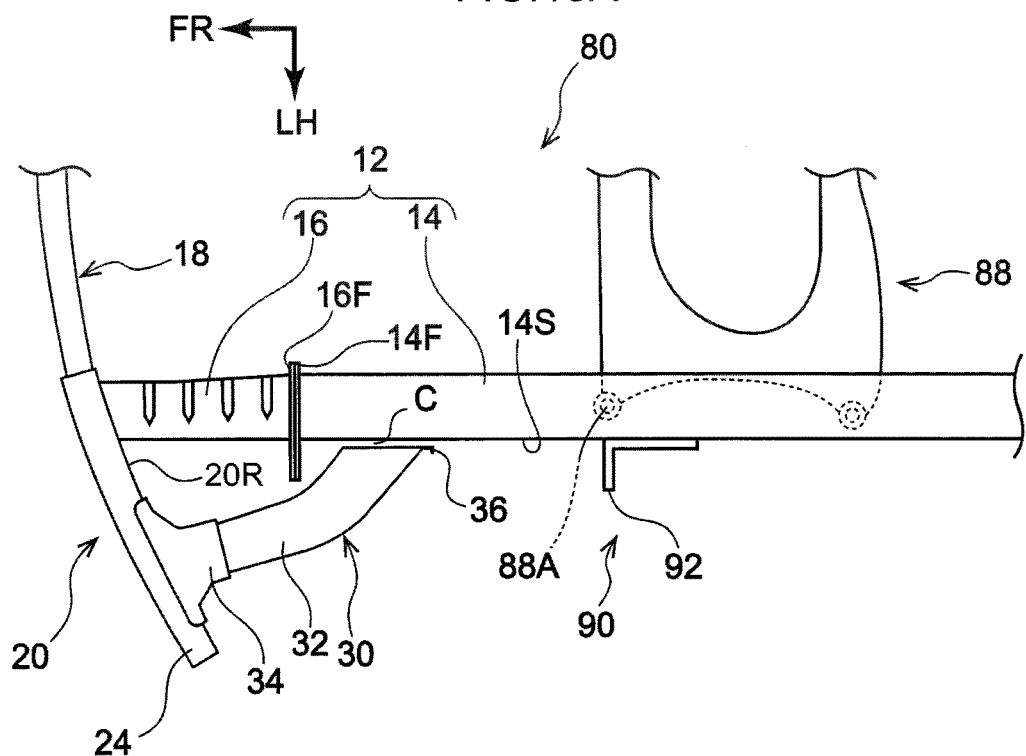
FIG. 15A is a plan view illustrating a first modified example of a stopper structure configuring a vehicle body end section structure according to the third exemplary embodiment.
Figure 15B:
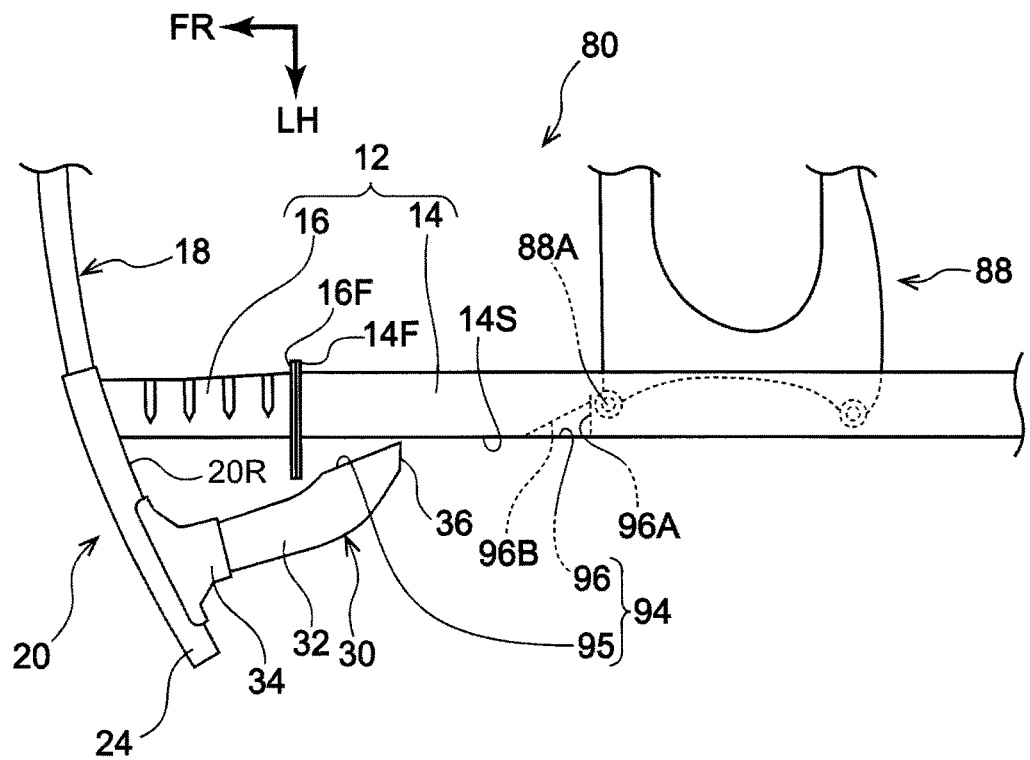
FIG. 15B is a plan view illustrating a second modified example of a stopper structure configuring a vehicle body end section structure according to the third exemplary embodiment.

The configurations illustrated in FIG. 15A and FIG. 15B may be employed as modified examples of the stopper structure. In a stopper structure 90 according to a first modified example illustrated in FIG. 15A, a patch member 92 fixed to the front side member 14 in the vicinity of the front side coupling portion 88A directly abuts the slide spacer 30. Sliding of the slide spacer 30 toward the rear is restricted (blocked) due to abutting the patch member 92. In this configuration, there is no need to provide the stopped member 84 on the slide spacer 30 side.

In a stopper structure 94 according to a second modified example illustrated in FIG. 15B, the slide plate portion 36 is formed with an angled face (wedge shape) 95 facing toward the front and the vehicle width direction inside, and a recessed bead 96 is formed to the front side member 14 in the vicinity of the front side coupling portion 88A. The recessed bead 96 has a substantially right-angled triangular shape in plan view, and includes a stopper wall 96A that faces the front, and a guide wall 96B that faces the stopper wall 96A. In the stopper structure 94, the rear end portion of the slide spacer 30 enters the recessed bead 96 when the crash box 16 undergoes compression deformation and the slide spacer 30 undergoes rotational displacement. Sliding of the slide spacer 30 toward the rear is accordingly restricted. After sliding has been restricted, further rotational displacement of the slide spacer 30 is promoted, contributing to folding of the front side member 14.

Modified Examples of the Slide Spacer

In the first to the third exemplary embodiments described above, explanation has been given regarding examples in which the slide spacer 30, 62 includes the inner reinforcement 42; however the present invention is not limited thereto. Whether or not to include the inner reinforcement 42 may be determined as appropriate according to the demanded strength or the like. Accordingly, configuration may be made in which the slide spacer 30, 62 does not include the inner reinforcement 42, and configuration may be made in which the slide spacer 30, 62 is provided with a reinforcement portion of a different configuration to the inner reinforcement 42. For example, a reinforcement portion may be configured by utilizing the plate thickness, rib settings, material and the like of the inner panel 38. Similarly to in the case of the inner reinforcement 42, there is likewise no limitation to the configuration of the slide spacer 30, 62 including the corner reinforcement members 46, 48.

Fourth Exemplary Embodiment

Figure 16:
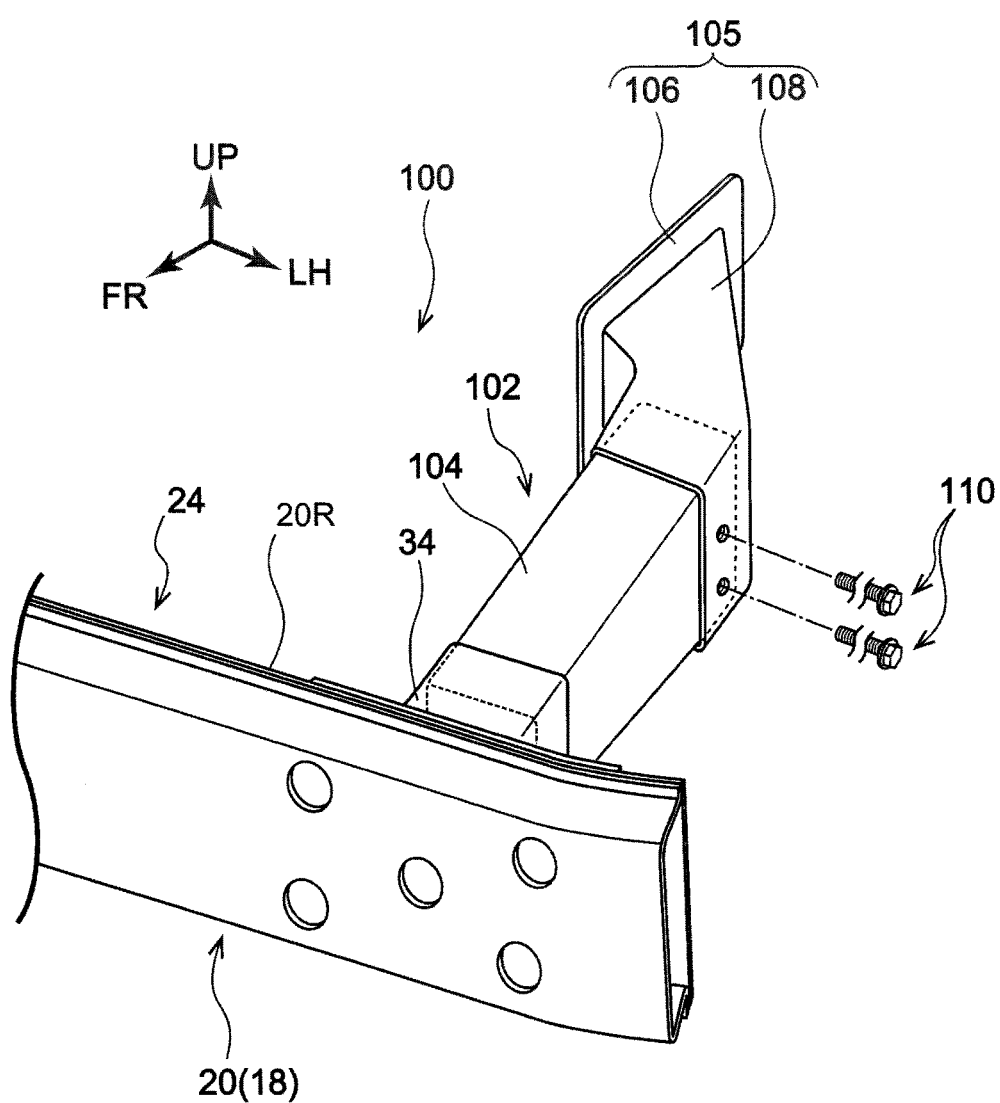
FIG. 16 is a perspective view illustrating relevant portions of a vehicle body end section structure according to a fourth exemplary embodiment.

Explanation follows regarding a vehicle body front section structure 100 according to a fourth exemplary embodiment of the present invention, with reference to FIG. 16. FIG. 16 is a perspective view illustrating relevant portions of the vehicle body front section structure 100. The vehicle body front section structure 100 has similar configuration to the vehicle body front section structure 10 according to the first exemplary embodiment, with the exception that the structure of a slide spacer 102, serving as a spacer member, differs from that of the slide spacer 30. Note that the extension 24 illustrated in FIG. 16 has a different shape to the extension 24 illustrated in the first exemplary embodiment; however the basic configuration and function thereof are the same as those of the extension 24 illustrated in the first exemplary embodiment. Specific explanation follows regarding the vehicle body front section structure 100.

The slide spacer 102 is mainly configured by a spacer body 104, a front side fixing portion 34, and a rear side slide portion 105. The spacer body 104 has a rectangular tube shaped closed cross-section structure, and in plan view is inclined with respect to the front-rear direction (the front side member 14) at the same angle as the angle from the front portion to the central portion of the spacer body 32. Namely, the spacer body 104 is configured without a curved portion like that of the rear portion of the spacer body 32. The spacer body 104 may be configured with a closed cross-section structure by joining together an inner panel and an outer panel, or an upper panel and a lower panel, or may be configured as a single member such as an extrusion molded component. A vehicle width direction inside side wall of the spacer body 104 corresponds to a main portion of a second wall (at least a portion of a second wall), and a vehicle width direction outside side wall of the spacer body 104 corresponds to a main portion of a third wall (at least a portion of a third wall).

The rear side slide portion 105 includes a slide plate 106 serving as a first wall facing the side face 14S of the front side member 14 across the gap C, and a rectangular tube shaped member 108 that fits together with the rear end side of the spacer body 104. In plan view, the tube shaped member 108 has a bent shape connecting a rear portion of the spacer body 104, disposed at an angle as described above, and the slide plate 106 that faces the side face 14S of the front side member 14. Note that the tube shaped member 108 may have a curved shape similar to that of the rear portion of the spacer body 32 described above.

The slide plate 106 is joined to a rear end of the tube shaped member 108 by welding or the like. A rear end portion of the spacer body 104 is fastened and fixed to a front end of the tube shaped member 108. Although omitted from illustration, weld nuts, not illustrated in the drawings, are provided at a vehicle width direction inside portion of the tube shaped member 108. The spacer body 104 and the tube shaped member are fixed together by passing through bolts 110 through the tube shaped member 108 and the spacer body 104 from the vehicle width direction outside of the tube shaped member 108, and screwing the through bolts 110 together with the weld nuts. Note that collar members, through which shaft portions of the respective through bolts 110 pass, are disposed at the rear end portion of the spacer body 104 to support fastening load.

As described above, a front end portion of the spacer body 104 is fastened and fixed to the front side fixing portion 34, and a rear end portion of the spacer body 104 is fastened and fixed to the rear side slide portion 105. Namely, the slide spacer 102 configuring the vehicle body front section structure 100 has a three-member configuration (three part structure) of the front side fixing portion 34, the spacer body 104, and the rear side slide portion 105. Note that although not illustrated in the drawings, the slide spacer 102 is disposed on the connection location J side with respect to the rotation trajectory T.

Operation

The vehicle body front section structure 100 configured as described above has basically the same operation as the vehicle body front section structure 10 according to the first exemplary embodiment, thereby enabling similar advantageous effects. Moreover, the slide spacer 102 has a three part structure, thereby enabling a contribution to a reduction in weight and a reduction in costs through optimization of the respective component structures.

Fifth Exemplary Embodiment

Figure 17:
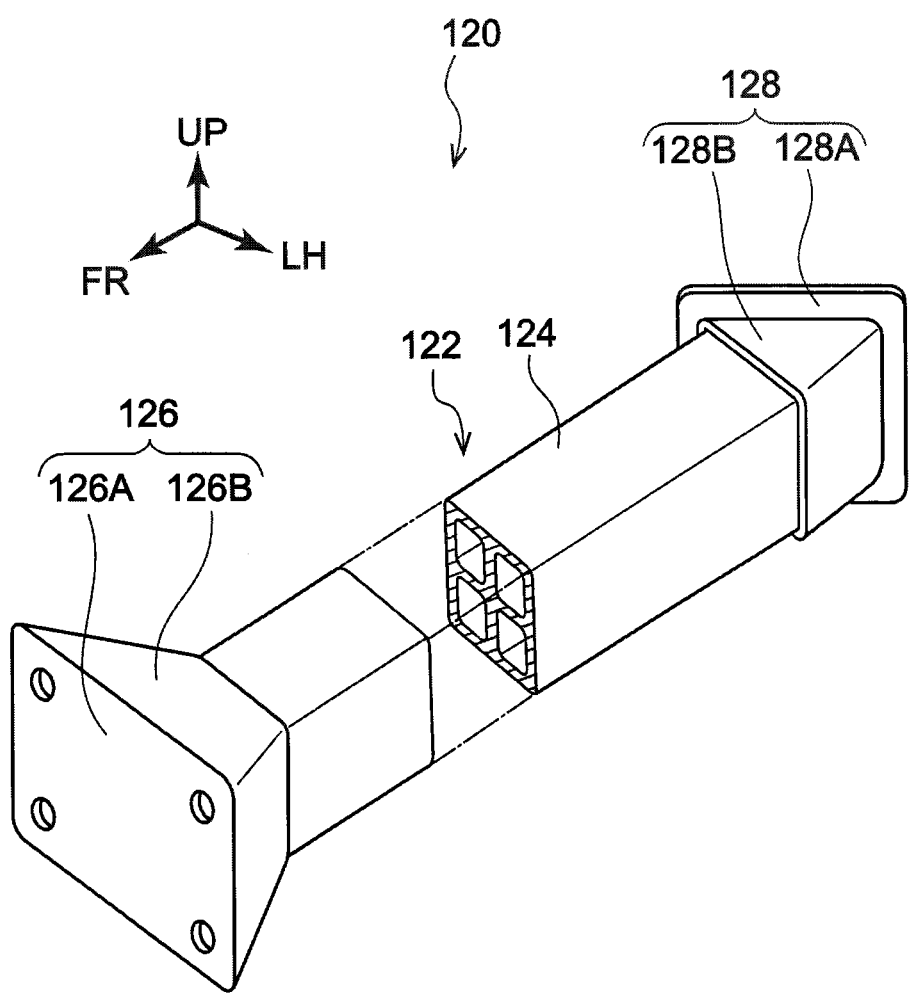
FIG. 17 is a perspective view illustrating relevant portions of a vehicle body end section structure according to a fifth exemplary embodiment.

Explanation follows regarding a vehicle body front section structure 120 according to a fifth exemplary embodiment of the present invention, with reference to FIG. 17. FIG. 17 is a perspective view illustrating a slide spacer 122 serving as a spacer member configuring the vehicle body front section structure 120. The vehicle body front section structure 120 has similar configuration to the vehicle body front section structure 10 according to the first exemplary embodiment, with the exception that the structure of the slide spacer 122 differs to that of the slide spacer 30. Detailed explanation follows thereof.

The slide spacer 122 is mainly configured by a spacer body 124, a front side fixing portion 126, and a rear side slide portion 128. The spacer body 124 is an extruded aluminum or aluminum alloy component, with a cross-section profile taken orthogonally to the length direction resembling four horizontally and vertically adjacent rectangles (a cross-section profile resembling a horizontally and vertically bisected rectangle). A vehicle width direction inside side wall of the spacer body 124 corresponds to a main portion of a second wall (at least a portion of a second wall), and a vehicle width direction outside side wall of the spacer body 124 corresponds to a main portion of a third wall (at least a portion of a third wall).

The front side fixing portion 126 is configured including an abutting plate portion 126A that abuts the back face (rear panel 28) of the extension 24, and a peripheral side-plate portion 126B projecting out toward the rear from the periphery of the abutting plate portion 126A. The peripheral side-plate portion 126B has a decreasing cross-section on progression toward the rear so as to form a truncated four-sided pyramid shape, and a rear end portion thereof is joined to a front end of the spacer body 124 by welding or the like. The abutting plate portion 126A of the front side fixing portion 126 is either provided with weld nuts to which bolts 58 are screwed, or formed with screw holes into which the bolts 58 are screwed. In the present exemplary embodiment, the front side fixing portion 126 is a die-cast aluminum component formed from ADC3.

The rear side slide portion 128 is configured including a slide plate 128A serving as a first wall facing the side face 14S of the front side member 14 across the gap C, and a coupling tube portion 128B projecting out toward the vehicle width direction outside from the slide plate 128A. The coupling tube portion 128B is formed with a triangular column shaped external profile, of which the upper and lower faces are substantially right-angled triangles. The slide plate 128A is contiguous to a rear end portion, that corresponds to the hypotenuse of the right-angled triangular shape, of the coupling tube portion 128B. The coupling tube portion 128B is joined to a rear end of the spacer body 124 by welding or the like at a side of the substantially right-angled triangular shape facing toward both the front side and the vehicle width direction outside. In the present exemplary embodiment, the rear side slide portion 128 is a die-cast aluminum component formed from ADC3.

The abutting plate portion 126A of the front side fixing portion 126 of the slide spacer 122 described above is fixed to the jutting-out portion 20 of the bumper reinforcement 18 by screwing the bolts 58 into the weld nuts, not illustrated in the drawings, or the screw holes. The slide spacer 122 faces the side face 14S of the front side member 14 across the gap C at the slide plate 128A of the rear side slide portion 128. Note that although not illustrated in the drawings, the slide spacer 122 is disposed on the connection location J side with respect to the rotation trajectory T.

Operation

The vehicle body front section structure 120 configured as described above has basically the same operation as the vehicle body front section structure 10 according to the first exemplary embodiment, thereby enabling similar advantageous effects. A reduction in weight is also enabled due to configuring the slide spacer 122 from aluminum or an aluminum alloy.

In the fifth exemplary embodiment, an example is described in which the entire slide spacer 122 is configured from aluminum or an aluminum alloy; however there is no limitation thereto. For example, configuration may be made in which only the spacer body of the slide spacer 122 is configured from aluminum, and the front side fixing portion and the rear side slide portion are configured from other materials. In such cases, the manufacturing costs of the slide spacer 122 can be suppressed further than when the entire slide spacer 122 is configured from aluminum or the like.

Sixth Exemplary Embodiment

Figure 18:
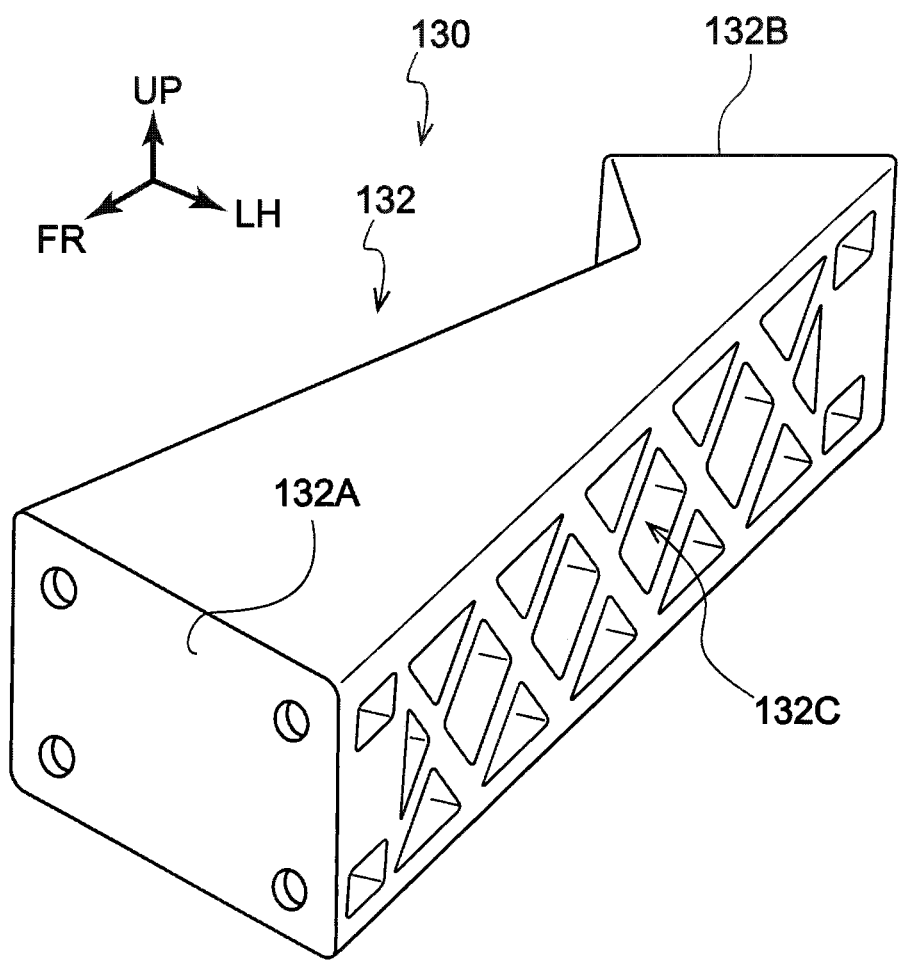
FIG. 18 is a perspective view illustrating relevant portions of a vehicle body end section structure according to a sixth exemplary embodiment.

Explanation follows regarding a vehicle body front section structure 130 according to a sixth exemplary embodiment of the present invention, with reference to FIG. 18. FIG. 18 is a perspective view illustrating a slide spacer 132 serving as a spacer member configuring the vehicle body front section structure 130. The vehicle body front section structure 130 has similar configuration to the vehicle body front section structure 10 according to the first exemplary embodiment, with the exception that the structure of the slide spacer 132 differs to that of the slide spacer 30. Specific explanation follows thereof.

The slide spacer 132 is configured from a resin material, and a portion including a front side fixing portion 132A that is fixed to the jutting-out portion 20, and a rear side slide portion 132B facing the side face 14S of the front side member 14 across the gap C, is integrally formed by injection molding or the like. In the present exemplary embodiment, as viewed from the side, the slide spacer 132 has a honeycomb ribbed structure 132C between the front side fixing portion 132A and the rear side slide portion 132B serving as a first wall, thereby securing mold-removal properties and the required rigidity (load transmission performance). Nuts, into which bolts 58 are screwed, are integrated to a front end of the slide spacer 132 by insert molding or the like. Note that although not illustrated in the drawings, the slide spacer 132 is disposed on the connection location J side with respect to the rotation trajectory T. A side wall on the vehicle width direction inside of the slide spacer 132 corresponds to a main portion of a second wall (at least a portion of a second wall), and a side wall on the vehicle width direction outside of the slide spacer 132 corresponds to a main portion of a third wall (at least a portion of a third wall).

Operation

The vehicle body front section structure 130 configured as described above has basically the same operation as the vehicle body front section structure 10 according to the first exemplary embodiment, thereby enabling similar advantageous effects. A reduction in weight and reduction in costs can also be achieved, due to configuring the slide spacer 132 by resin molding.

Seventh Exemplary Embodiment

Figure 19:
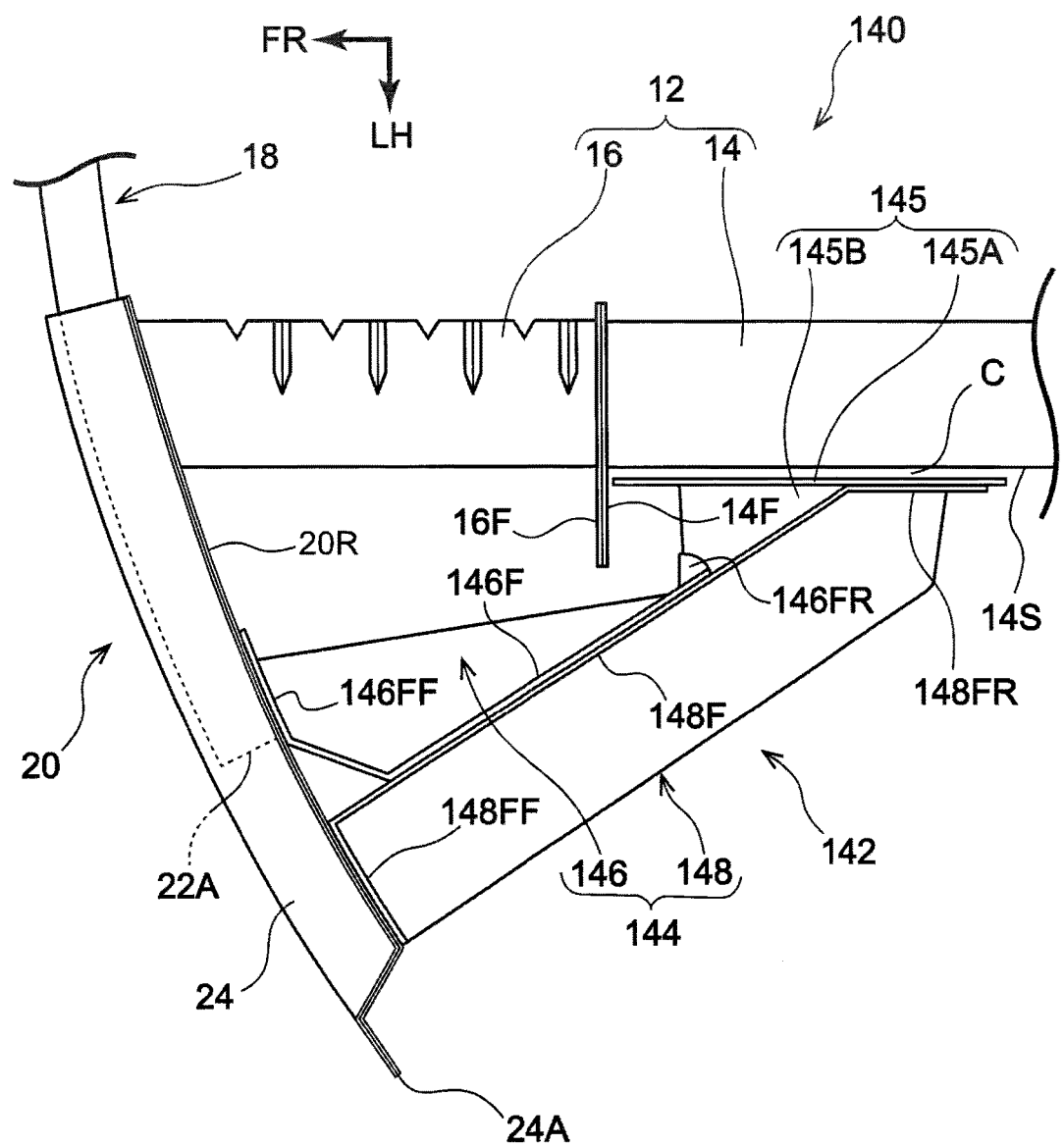
FIG. 19 is a plan view illustrating relevant portions of a vehicle body end section structure according to a seventh exemplary embodiment.
Figure 20:
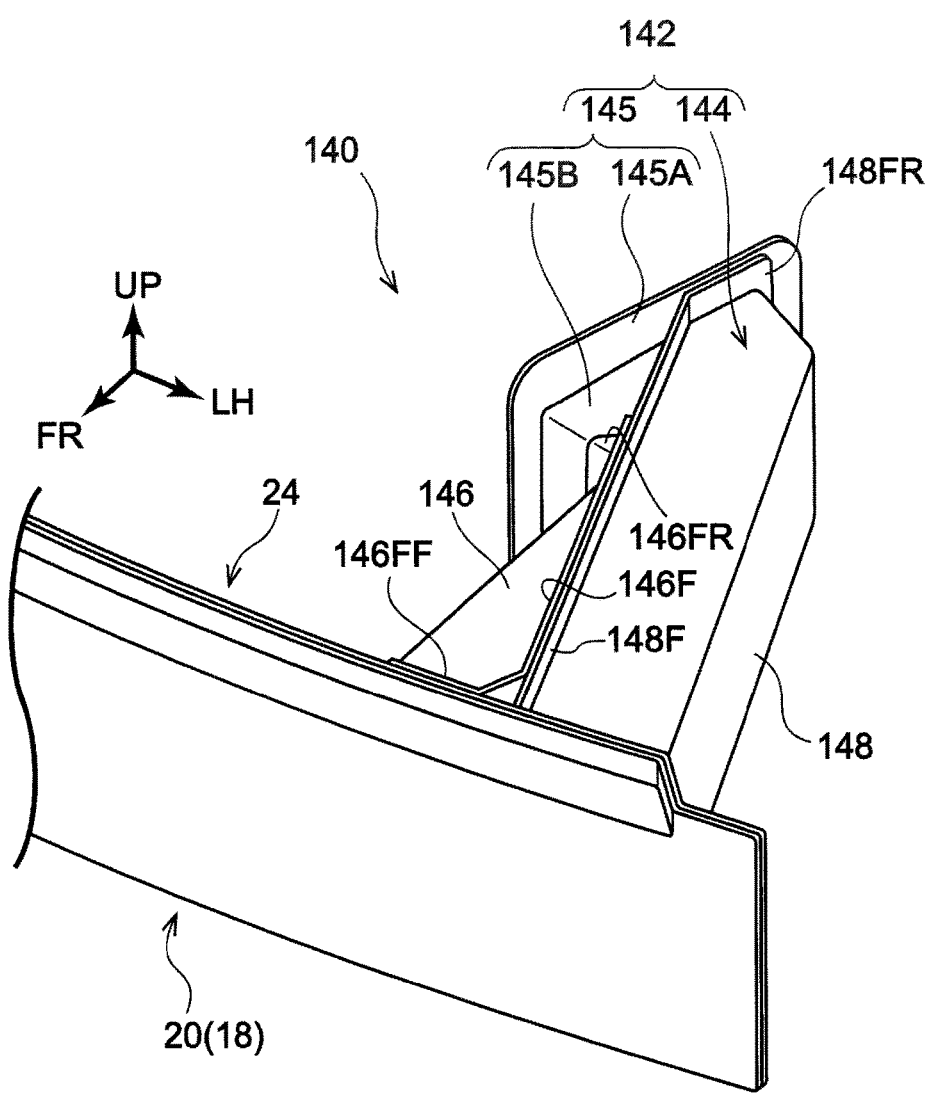
FIG. 20 is a perspective view illustrating relevant portions of a vehicle body end section structure according to the seventh exemplary embodiment.

Explanation follows regarding a vehicle body front section structure 140 according to a seventh exemplary embodiment of the present invention, with reference to FIG. 19 and FIG. 20. FIG. 19 is a plan view illustrating relevant portions of the vehicle body front section structure 140, and FIG. 20 is a perspective view illustrating relevant portions of the vehicle body front section structure 140. The vehicle body front section structure 140 has similar configuration to the vehicle body front section structure 10 according to the first exemplary embodiment, with the exception that the structure of a slide spacer 142 serving as a spacer member differs to that of the slide spacer 30. Note that the extension 24 illustrated in FIG. 19 and FIG. 20 has a different shape to the extension 24 illustrated in the first exemplary embodiment; however the basic structure and function thereof are similar to those of the extension 24 illustrated in the first exemplary embodiment. Specific explanation follows regarding the vehicle body front section structure 140.

The slide spacer 142 is mainly configured by a spacer body 144 that is joined to the extension 24, and a slider portion 145 that is provided at a rear end of the spacer body 144 and faces the side face 14S of the front side member 14. An inner panel 146 and an outer panel 148 are joined together to configure the spacer body 144 with a closed cross-section structure, having a closed cross-section as viewed in cross-section taken orthogonally to the length direction (not illustrated in the drawings).

The outer panel 148 is configured with a hat shaped profile open toward the vehicle width direction inside as viewed in cross-section, and includes upper and lower flanges 148F. A front flange 148FF and a rear flange 148FR jut out from a front edge and a rear edge of the outer panel 148, respectively. The inner panel 146 has a hat shaped cross-section open toward the vehicle width direction outside as viewed in cross-section, and includes upper and lower flanges 146F. A vehicle width direction dimension (cross-section depth) of the inner panel 146 gradually decreases on progression toward the rear, and a flat plate shaped rear flange 146FR is configured at a rear end thereof. A front flange 146FF juts out from a front edge of the inner panel 146.

The inner panel 146 and the outer panel 148 are joined by welding together the upper and lower flanges 146F, 148F to configure the closed cross-section structure of the spacer body 144. In the present exemplary embodiment, front end portions of the inner panel 146 and the outer panel 148 are separated in the vehicle width direction, and not joined together. Namely, the spacer body 144 is formed in a "y" shape, as illustrated in FIG. 19. In the spacer body 144, a vehicle width direction inside side wall of the inner panel 146 corresponds to a main portion of a second wall (at least a portion of a second wall), and a vehicle width direction outside side wall of the outer panel 148 corresponds to a main portion of a third wall (at least a portion of a third wall).

The spacer body 144 is joined to the back face of the rear panel 28 configuring the extension 24 by welding at the front flanges 146FF, 148FF described above. Accordingly, in the present exemplary embodiment, the extension 24 is not formed with the bolt holes 28H, the tool holes 26H, or the like. The access hole 28HA is omitted from illustration in FIG. 20.

The slider portion 145 is mainly configured by a slide plate 145A serving as a first wall, facing the side face 14S of the front side member 14 across the gap C, and a connection portion 145B that is fitted into the rear end of the spacer body 144. In a fitted state of the connection portion 145B into the rear end of the spacer body 144, the rear flange 146FR of the inner panel 146 is joined, by welding or the like, to an open edge portion of the outer panel 148 that faces toward the vehicle width direction inside. The rear flange 148FR of the outer panel 148 is joined to the slide plate 145A by welding or the like. Note that although not illustrated in the drawings, the slide spacer 142 is disposed on the connection location J side with respect to the rotation trajectory T.

Operation

The vehicle body front section structure 140 configured as described above has basically the same operation as the vehicle body front section structure 10 according to the first exemplary embodiment, thereby enabling similar advantageous effects. Moreover, since the spacer body 144 of the slide spacer 142 configures a "y" shape, load that is input to the jutting-out portion 20 over a wide range in the vehicle width direction can be transmitted to the front side member 14. Moreover, configuring the spacer body 144 of the slide spacer 142 by joining together the inner panel 146 and the outer panel 148 enables the inner panel 146, this being the compression side, to be selectively reinforced as required.

In the seventh exemplary embodiment, an example has been described in which the spacer body 144 is configured with a "y" shape; however there is no limitation thereto. For example, the inner panel and the outer panel may be joined together up to their respective front ends. In such cases, configuring a tapered shape such that the width is wider on the front end side than at the rear end side enables load that has been input to the jutting-out portion 20 over a wide range in the vehicle width direction to be transmitted to the front side member 14.

Eighth Exemplary Embodiment

Figure 21A:
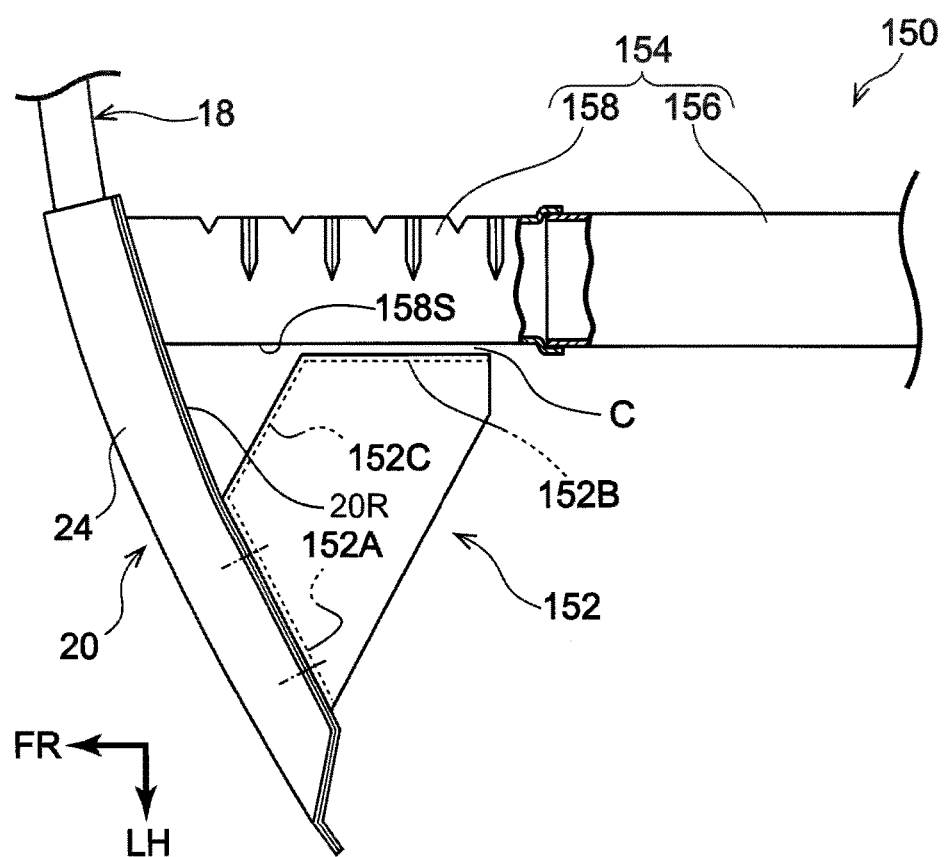
FIG. 21A is a plan view illustrating relevant portions of a vehicle body end section structure according to an eighth exemplary embodiment.
Figure 21B:
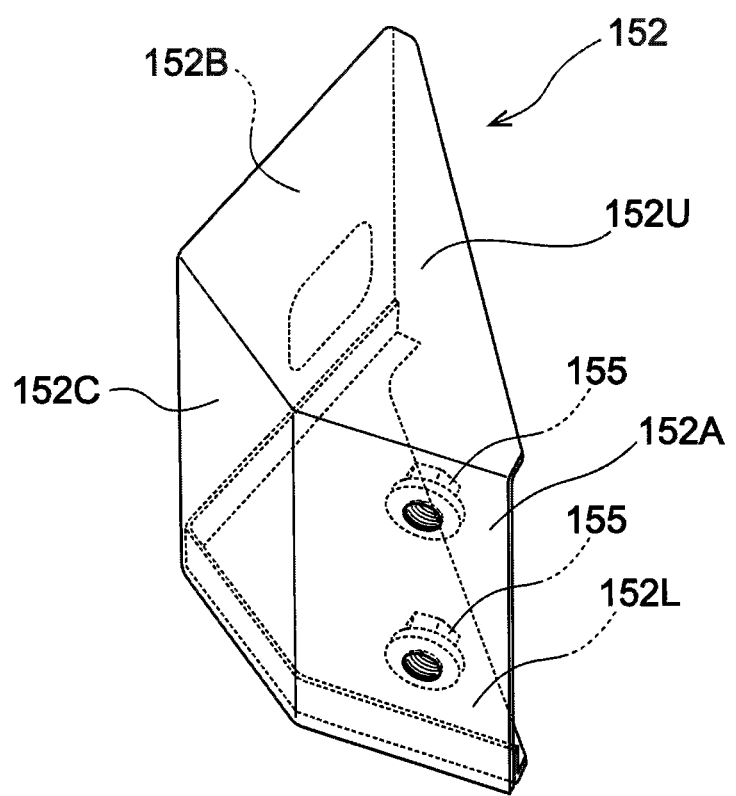
FIG. 21B is a perspective view illustrating a slide spacer of a vehicle body end section structure according to the eighth exemplary embodiment.

Explanation follows regarding a vehicle body front section structure 150 according to an eighth exemplary embodiment of the present invention, with reference to FIGS. 21A and 21B. FIG. 21A is a plan view illustrating relevant portions of the vehicle body front section structure 150. Since the vehicle body structure for which the vehicle body front section structure 150 is envisaged differs from that for the vehicle body front section structure 10, explanation will first be given regarding the vehicle body structure, followed by explanation regarding configuration of a slide spacer 152 serving as a spacer member.

The vehicle body front section structure 150 includes a framework member 154 in place of the framework member 12. The framework member 154 is configured by joining together a front side member 156 and a crash box 158 by welding or the like. More specifically, the front side member 156 and the crash box 158, each of which is configured with a rectangular shaped closed cross-section structure, are fixed by welding in a fitted-together state.

The framework member 154 of the present exemplary embodiment accordingly does not include a portion that juts out toward the vehicle width direction outside corresponding to the flanges 14F, 15F of the framework member 12. The front end of the front side member 156 is fitted inside the crash box 158 so as not to form a step at the front end face of the front side member 156. The crash box 158 of the present exemplary embodiment is an energy absorption section of the framework member 154, and corresponds to an energy absorption section of the present invention.

Slide Spacer

The slide spacer 152 is disposed between the jutting-out portion 20 of the bumper reinforcement 18 and the framework member 154. In the present exemplary embodiment, the slide spacer 152 is provided to the jutting-out portion 20, and rearward load that has been input to the jutting-out portion 20 is transmitted to the framework member 154. Specifically, as illustrated in FIG. 21B, the slide spacer 152 includes a fixing wall 152A that is fixed to the jutting-out portion 20, and a slide wall 152B, serving as a first wall, that faces a side face 158S of the crash box 158 across a gap C in an initial state. In the slide spacer 152, the fixing wall 152A and the slide wall 152B are coupled together by a coupling wall 152C serving as a second wall, an upper wall 152U, and a lower wall 152L. The slide spacer 152 is open facing toward the diagonally rear direction as a whole. In the present exemplary embodiment, the slide spacer 152 is configured from a steel material. The slide spacer 152 does not include a wall portion corresponding to a third wall.

The fixing wall 152A is provided with weld nuts 155, and the slide spacer 152 is fixed to the jutting-out portion 20 by bolts 58 (not illustrated in the drawings) that are screwed together with the weld nuts 155. Note that the above configuration by which the slide wall 152B faces the crash box 158 across the gap C, and the configuration that does not include portions like the flanges 14F, 16F behind the crash box 158, correspond to a slide permitting structure of the present invention. Note that although not illustrated in the drawings, the slide spacer 152 is disposed on the connection location J side with respect to the rotation trajectory T.

Operation

Explanation follows regarding operation of the eighth exemplary embodiment, in particular where it differs to operation of the first exemplary embodiment.

In a small overlap collision of the vehicle A applied with the vehicle body front section structure 150 configured as described above, the jutting-out portion 20 is input with rearward collision load. When this occurs, a portion of the collision load that has been input to the jutting-out portion 20 is transmitted through the slide spacer 152 to the side face 158S of the crash box 158. The bumper reinforcement 18, of which the jutting-out portion 20 is supported by the framework member 154 through the slide spacer 152, is prevented or effectively suppressed from folding at the connection location with the framework member 154. Another portion of the collision load that has been input to the jutting-out portion 20 is transmitted from the bumper reinforcement 18 to the crash box 158 as axial force, compressing (crushing) the crash box 158. Energy absorption is accordingly exhibited in the initial stage of a small overlap collision.

As the crash box 158 is compressed from the front end side, the slide spacer 30 transmits load to the framework member 154 as the slide wall 152B slides with respect to the framework member 154 including the crash box 158. Note that the framework member 154, that does not include flanges or the like between the crash box 158 and the front side member 156, is suppressed from obstructing sliding of the slide spacer 152 (permits sliding) along the side face of the framework member 154.

Sliding of the slide spacer 152 with respect to the framework member 154 is restricted once the crash box 16 has deformed to its limit. Collision load that continues to be input to the jutting-out portion 20 accordingly acts as lateral force on a specific location of the front side member 14 through the slide spacer 152. The front side member 154 folds toward the vehicle width direction inside, and load is transmitted to the power unit P.

As described above, the operation of the present exemplary embodiment enables interference between the slide spacer 152 and the front wheel Wf to be suppressed (prevented) in a minor collision, and enables energy absorption in the initial stage, and folding of the framework member 154 in the intermediate and final stages, of a small overlap collision. Namely, although the vehicle body has a different configuration in the vehicle body front section structure 150 according to the present exemplary embodiment, the same basic operation is exhibited to the first exemplary embodiment, thereby enabling similar advantageous effects to the first exemplary embodiment, with the exception of the specific operation and advantageous effects relating to the shape of the slide spacer 30, and so on.

Ninth Exemplary Embodiment

Explanation follows regarding a vehicle body front section structure 160 according to a ninth exemplary embodiment of the present invention, with reference to FIG. 22. FIG. 22 is a plan view illustrating relevant portions of the vehicle body front section structure 160. Since the vehicle body structure envisaged for the vehicle body front section structure 160 differs from that of the vehicle body front section structure 10, explanation will first be given regarding the vehicle body structure, followed by explanation regarding configuration of a spacer member 162.

The vehicle body front section structure 160 includes a front side member 164 serving as a framework member in place of the framework member 12. A front portion of the front side member 164 configures an energy absorption section 164A; however there is no independent crash box. The vehicle body front section structure 160 therefore does not include a portion that juts out toward the vehicle width direction outside corresponding to the flanges 14F, 16F of the framework member 12. Moreover, in the present exemplary embodiment, an intermediate portion of the front side member 164 (a portion to the rear of the energy absorption section 164A) is coupled to the power unit P through a coupling member 165. This structure is applied in cases in which, for example, the front side members 14 and the power unit P are separated in the vehicle width direction (when there is a large space between the left and right front side members, and a small power unit P).

In the vehicle body front section structure 160, bumper reinforcement 166 spans between front ends of the left and right front side members 164. The bumper reinforcement 166 includes jutting-out portions 20 that are shorter in length than in the bumper reinforcement 18 (there is a wider space between the left and right front side members). In the example illustrated, there is no member corresponding to the extensions 24.

Spacer Member

As illustrated in FIG. 22, the spacer member 162 is configured by a molded resin component, or by an aluminum or steel material die-cast component or the like, with the mold removal direction running along the up-down direction. A front end side fixing portion 162A of the spacer member 162 is fastened and fixed to the jutting-out portion 20. A slide portion 162B at a rear end of the spacer member 162 faces a side face 164S of the front side member 164 (the energy absorption section 164A) across a gap C.

The spacer member 162 also includes plural first ribs 162L1 extending from the fixing portion 162A so as to form right angles with respect to the fixing portion 162A. The spacer member 162 also includes plural second ribs 162L2 extending toward the side face 164S of the front side member 164 at an angle following the external profile (load transmission direction) of the spacer member 162. The plural first ribs 162L1 and second ribs 162L2 mutually intersect each other.

In the spacer member 162, rearward load that has been input to the jutting-out portion 20 is efficiently transmitted to the front side member 164 along the plural first ribs 162L1 and the second ribs 162L2. Note that although not illustrated in the drawings, the spacer member 162 is disposed on the connection location J side with respect to the rotation trajectory T of a leading end of the bumper reinforcement that moves about a connection location J between the front side member 164 and the bumper reinforcement 166 positioned on the vehicle width direction opposite side. The rotation trajectory T is designed so as not to impinge on a front wheel Wf.

Operation

Explanation follows regarding operation of the ninth exemplary embodiment, in particular where it differs to operation of the first exemplary embodiment.

Minor Collision

In a minor collision to the front section of the vehicle A applied with the vehicle body front section structure 160 configured as described above, the energy absorption sections 164A undergo axial direction compression due to load that is input to the bumper reinforcement 166, absorbing collision energy. Note that in the vehicle body front section structure 160, the spacer member 162 is disposed on the connection location J side with respect to the rotation trajectory T of a leading end of the jutting-out portion 20 centered on the connection location J on the opposite side from the collided side. The spacer member 162 is accordingly prevented or effectively suppressed from impinging on the front wheel Wf, even with a large deformation amount of the energy absorption section 164A on the collision side.

Small Overlap Collision

In a small overlap collision of the vehicle A applied with the vehicle body front section structure 160 configured as described above, the jutting-out portion 20 is input with rearward collision load. When the jutting-out portion 20 (bumper reinforcement 166) bends (folds) due to this load, the slide portion 162B of the spacer member 162 abuts the side face 164S of the front side member 164. A portion of the load that has been input to the jutting-out portion 20 is accordingly transmitted to the side face 164S of the front side member 164 through the spacer member 162 (a third load transmission mode).

Energy absorption is accordingly exhibited in the initial stage of a small overlap collision as the jutting-out portion 20 folds (deforms in a collapsing direction). Namely the present exemplary embodiment exhibits different operation and advantageous effects to the first exemplary embodiment in the respect that neither the first load transmission mode from the spacer member to the framework member, suppressing bending (folding) of the jutting-out portion 20, nor the second load transmission mode causing lateral force to act on the front side member 164, occur.

Note that although an example has been described in which a resin, aluminum, or the like is employed as the material configuring the spacer member 162, there is no limitation thereto. For example, the spacer member 162 may be configured from steel or another material. The spacer member 162 may also be configured by a combination of some or all out of a resin, aluminum or the like, steel, or other materials.

Tenth Exemplary Embodiment

Figure 23:
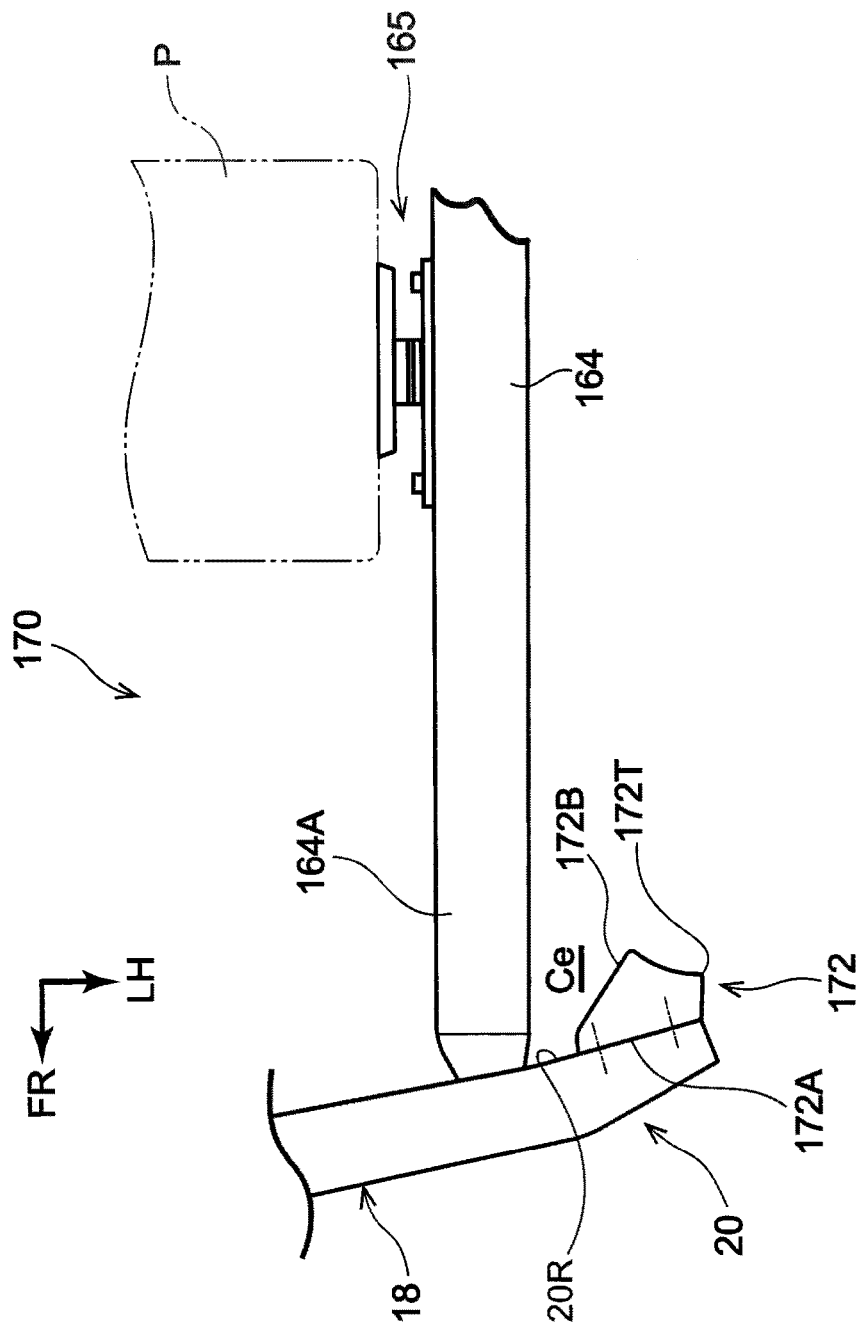
FIG. 23 is a plan view illustrating relevant portions of a vehicle body end section structure according to a tenth exemplary embodiment.

Explanation follows regarding a vehicle body front section structure 170 according to a tenth exemplary embodiment of the present invention, with reference to FIG. 23. FIG. 23 is a plan view illustrating a spacer member 172 configuring the vehicle body front section structure 170. The vehicle body front section structure 170 has similar configuration to the vehicle body front section structure 160 according to the ninth exemplary embodiment, with the exception that a spacer member 172 is provided in place of the spacer member 162.

As illustrated in FIG. 23, in a state in which a front end side fixing portion 172A is fixed to the jutting-out portion 20, the spacer member 172 has a shape in which a gap Ce between a rear end side angled abutting portion 172B and a side face of the front side member 164 gradually widens on progression toward the rear. Configuration is thereby made such that there is a specific free-moving angular displacement (time lag) between input to the jutting-out portion 20 of rearward load, and the angled abutting portion 172B of the spacer member 172 abutting the front side member 164. The free-moving angular displacement is set so as to correspond to the deformation (axial compression) stroke of the energy absorption section 164A of the front side member 164.

Note that a leading end 172T of the spacer member 172 projects out further to the vehicle width direction outside than an end portion of the bumper reinforcement 166, and the a rotation trajectory (not illustrated in the drawings) of the leading end 172T about the connection location J on the vehicle width direction opposite side is set so as not to impinge on the front wheel Wf. Accordingly, in a minor collision, similar operation and advantageous effects are enabled to those of the ninth exemplary embodiment.

Operation

Explanation follows regarding operation of the tenth exemplary embodiment, in particular where it differs to operation of the first and ninth exemplary embodiments.

In a small overlap collision of the vehicle A applied with the vehicle body front section structure 170 configured as described above, the jutting-out portion 20 is input with rearward collision load. When the jutting-out portion 20 (bumper reinforcement 166) bends (folds) due to this load, during the period of free-moving angular displacement until the spacer member 172 abuts the side face 164S of the front side member 164, the energy absorption section 164A is compressed in the axial direction. Energy absorption is accordingly exhibited during the initial stage of a small overlap collision.

Around the time that the energy absorption section 164A reaches its deformation limit, the angled abutting portion 172B of the spacer member 172 abuts the side face 164S of the front side member 164. When this occurs, collision load that continues to be input to the jutting-out portion 20 acts through the spacer member 172 on a specific location of the front side member 164 as lateral force (a second load transmission mode). The front side member 164 is accordingly folded toward the vehicle width direction inside, transmitting load to the power unit P.

As described above, in the present exemplary embodiment, energy absorption in the initial stage, and generation of lateral force to the front side member 164 in the intermediate and final stages are performed in a small overlap collision. Namely, in the present exemplary embodiment, although operation differs to that of the first exemplary embodiment in that there is no first load transmission mode from the spacer member to the framework member in which bending (folding) of the jutting-out portion 20 is suppressed, the second load transmission mode in which lateral force acts on the front side member 164 is present. Energy absorption in the initial stage, and lateral force to the front side member 164 in the intermediate and final stages of a small overlap collision are therefore enabled, enabling similar advantageous effects to be obtained to in the first exemplary embodiment.

Moreover, in the present exemplary embodiment, the gap Ce between the angled abutting portion 172B of the spacer member 172 and the side face of the front side member 164 enables the timing at which the angled abutting portion 172B abuts (inputs lateral force to) the front side member 164 to be set. Namely, control of the transition (mode control) from the energy absorption mode due to compression of the energy absorption section 164A in the initial stage, to the lateral force generation mode due to folding of the front side member 164 of the intermediate and final stages, is made simple and reliable.

Modified Examples of the Spacer Member

Figure 24:
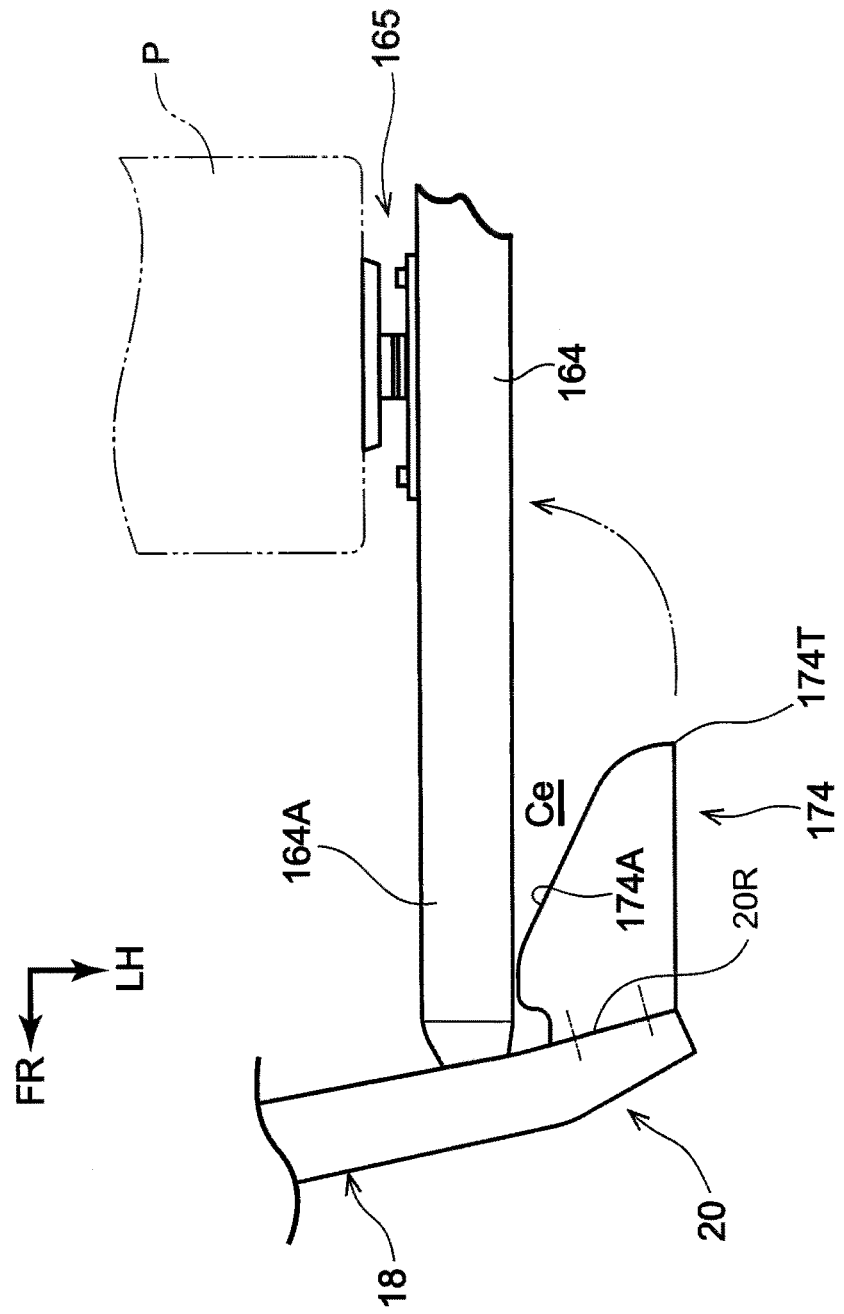
FIG. 24 is a plan view illustrating a first modified example of a spacer member configuring a vehicle body end section structure according to the tenth exemplary embodiment.

A spacer member 174 according to a modified example illustrated in FIG. 24 has an angled abutting portion 174A extending further to the rear than that of the spacer member 172. In a small overlap collision, the spacer member 174 generates lateral force pressing the front side member 164 in the vehicle width direction as shown by the trajectory illustrated by the arrow in FIG. 24 due to compression deformation of the energy absorption section 164A, and due to folding deformation of the jutting-out portion 20 (bumper reinforcement 166). When this occurs, the spacer member 174 inputs lateral force in the vicinity of the power unit P (the coupling member 165) since the angled abutting portion 174A of the spacer member 174 abuts the front side member 164 over a long front-to-rear range. This thereby promotes movement of the vehicle body toward the opposite side to the collision side due to the lateral force, and reduces the extent of interference with the colliding body in the vehicle width direction.

Figure 25:
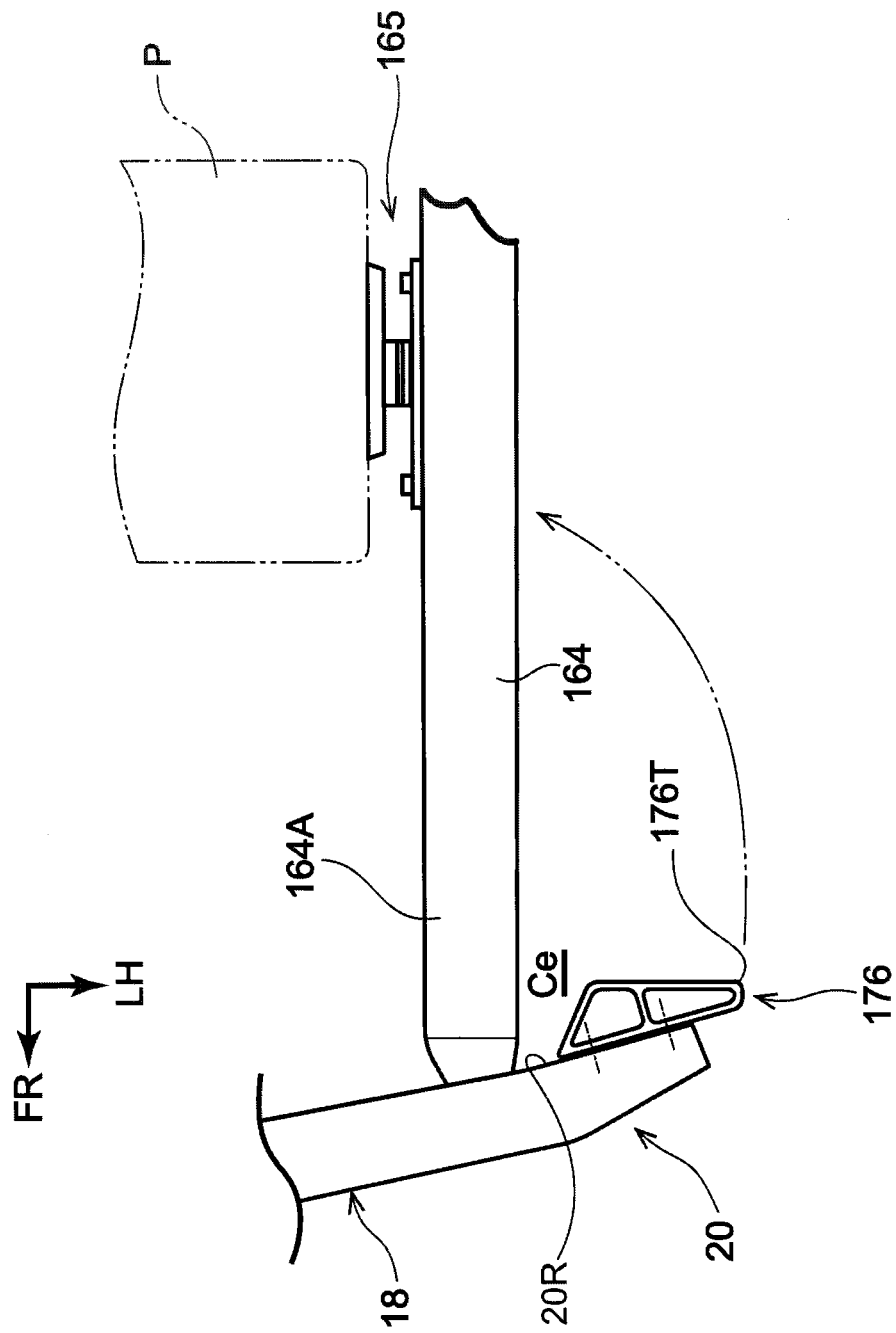
FIG. 25 is a plan view illustrating a second modified example of a spacer member configuring a vehicle body end section structure according to the tenth exemplary embodiment.

A spacer member 176 according to a modified example illustrated in FIG. 25 extends, at the rear, further out toward the vehicle width direction outside than the spacer member 172. In a small overlap collision, the spacer member 176 generates lateral force pressing the front side member 164 in the vehicle width direction as shown by the trajectory illustrated by the arrow in FIG. 25 due to compression deformation of the energy absorption section 164A, and due to folding deformation of the jutting-out portion 20 (bumper reinforcement 166). Similarly to in the modified example illustrated in FIG. 24, this configuration also increases the overall range over which the spacer member 176 abuts the front side member 164. Accordingly, pressing structural components inside the engine compartment, such as the power unit P, toward the opposite side to the collision side promotes lateral movement of the vehicle itself, reducing the extent of interference with the colliding body in the vehicle width direction.

Note that the leading ends 174T, 176T of the spacer members 174, 176 according to the respective modified examples are configured so as not to impinge on the front wheel Wf on a rotation trajectory (not illustrated in the drawings) about the connection location J on the vehicle width direction opposite side. Similar operation and advantageous effects to those of the ninth exemplary embodiment can be obtained in the event of a minor collision.

A resin, aluminum or the like, or a steel material or another material, or a combination of some or all of these materials may be employed as the material of spacer members 172, 174, 176 of the tenth exemplary embodiment and the respective modified examples.

Eleventh Exemplary Embodiment

Explanation follows regarding a vehicle body front section structure 210 according to an eleventh exemplary embodiment of the present invention, with reference to the drawings. Note that the vehicle body front section structure 210 is formed with basic symmetry (left-right symmetry) about a vehicle width direction center line of the vehicle body applied with the vehicle body front section structure 210, and so explanation is given regarding the structure on one side (the left side) in the vehicle width direction, with explanation regarding the structure on the other side (the right side) omitted.

General Vehicle Configuration

Figure 26A:
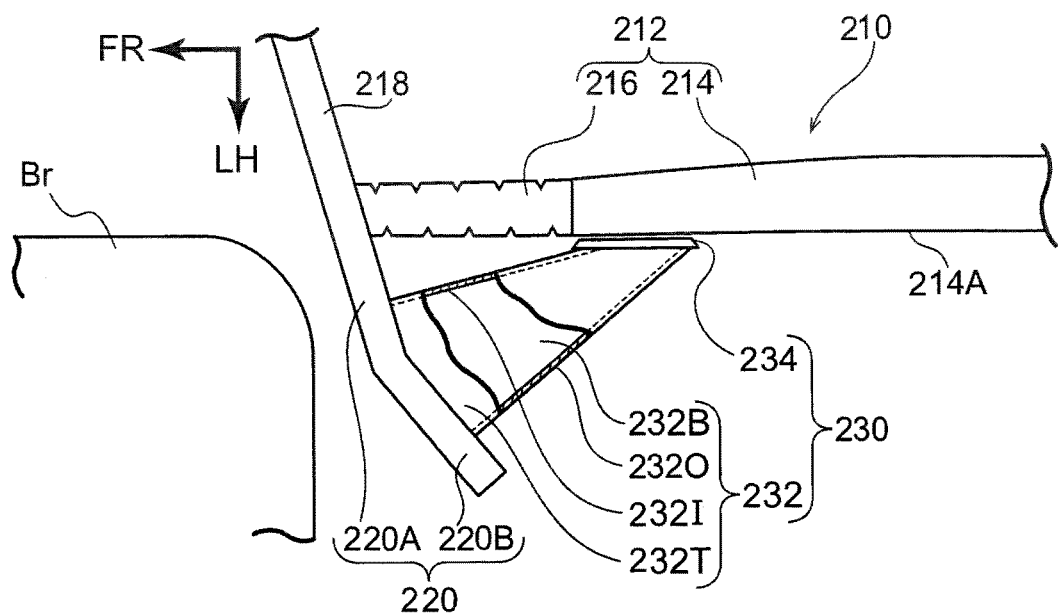
FIG. 26A is a partially cut away plan view illustrating relevant portions of a vehicle body front section structure according to an eleventh exemplary embodiment.

FIG. 26A is a plan view illustrating relevant portions of the vehicle body front section structure 210. As illustrated in FIG. 26A, the vehicle body front section structure 210 includes framework members 212 that are long in the front-rear direction. The framework members 212 are provided as a left and right pair, and the pair of framework members 212 are aligned side-by-side in the vehicle width direction (the right side framework member 212 is omitted from illustration). Each of the framework members 212 is mainly configured by a front side member 214, and a crash box 216 provided at the front end of the front side member 214. Although not illustrated in the drawings, a rear portion of the front side member 214 extends under the lower side of a dash panel to below the floor of the vehicle compartment.

Each front side member 214 has a closed cross-section structure as viewed in cross-section taken orthogonally to the length (front-rear) direction (not illustrated in the drawings). Similarly, each crash box 216 has a closed cross-section structure as viewed in a cross-section taken orthogonally to the length (front-rear) direction.

Each of the crash boxes 216 is configured so as to undergo compression deformation (crushing) more readily than the front side members 214 with respect to load in the front-rear direction. Accordingly, the respective framework members 212 are configured such that the crash boxes 216 undergo compression deformation first when load is received from bumper reinforcement 218, described later. The crash boxes 216 of the present exemplary embodiment are energy absorption sections of the framework members 212, and correspond to an energy absorption section of the present invention.

The bumper reinforcement 218, serving as a bumper framework section, spans between the front ends of the left and right crash boxes 216. The bumper reinforcement 218 configures a framework member that is long in the vehicle width direction, and has a closed cross-section structure as viewed in cross-section taken orthogonally to the length direction. Both length direction end portions of the bumper reinforcement 218 configure jutting-out portions 220 that jut out to the vehicle width direction outsides of the framework members 212. The jutting-out portions 220 may be configured by the bumper reinforcement 218 itself, or may be configured as extensions (extension members) connected to the bumper reinforcement 218. The jutting-out portions 220 may also be configured by a combination of the bumper reinforcement 218 and extensions (may be understood as either extension members or reinforcement members).

The bumper reinforcement 218 is formed with a closed cross-section structure, for example by extrusion molding aluminum, or an aluminum alloy. In the present exemplary embodiment, the cross-section profile of the bumper reinforcement 218 is configured as a profile of three rectangular shaped frames stacked one above the other (a cross-section profile resembling a rectangle divided into three from top-to-bottom) (similarly to the bumper reinforcement 218 illustrated in FIG. 32A).

Although omitted from illustration, a power unit P is disposed between the left and right front side members 214 in the vehicle body front section structure 210. In the present exemplary embodiment, the power unit P is rigidly or resiliently supported by the front side members 214 through a mount member, a suspension member, or the like.

Jutting-Out Portions

In the vehicle body front section structure 210 with the basic structure described above, each of the jutting-out portions 220 has a bent structure in plan view. Specifically, a vehicle width direction inside portion of the jutting-out portion 220 configures a first angled portion 220A, and a vehicle width direction outside portion of the jutting-out portion 220 configures a second angled portion 220B.

The first angled portion 220A is angled with respect to the vehicle width direction such that a vehicle width direction outside portion thereof is positioned to the rear of a vehicle width direction inside portion. The second angled portion 220B is angled with respect to the vehicle width direction such that a vehicle width direction outside portion thereof is positioned further to the rear than a vehicle width direction inside portion, and the second angled portion 220B has a greater angle with respect to the vehicle width direction than the first angled portion.

More specifically, the jutting-out portion 220 is a vehicle width direction outside portion that begins from a position located at 75% of the total vehicle width toward outside. In other words, a vehicle width direction dimension of a portion of the vehicle that locates at the vehicle width direction outside of the framework member 212 corresponds to 25% of the total vehicle width. Note that the vehicle width direction outside end of the jutting-out portion 220 is positioned at inside in the vehicle width direction with respect to the vehicle width direction outside edge of the vehicle (a position at 100% of the total vehicle width).

Figure 26B:
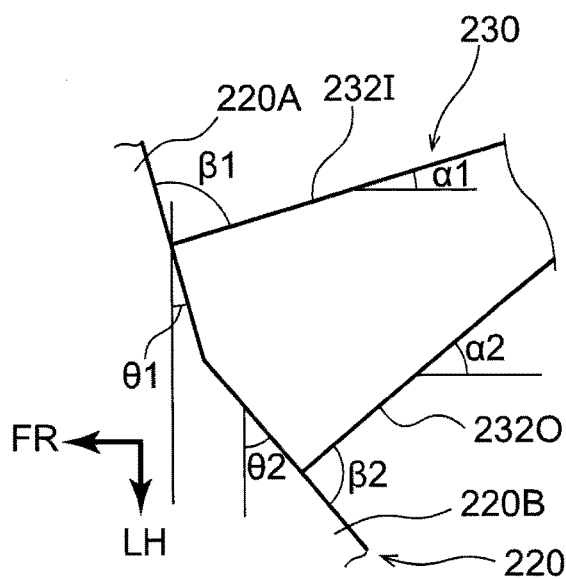
FIG. 26B is a partially enlarged plan view to explain dimensions and shapes of a jutting-out portion and slide spacer configuring relevant portions of a vehicle body front section structure according to the eleventh exemplary embodiment.

The jutting-out portion 220 is configured by the first angled portion 220A that locates from the position of 75% to a position of 80% of the total vehicle width. The jutting-out portion 220 is configured by the second angled portion 220B that locates from the position of 80% of the total vehicle width to the vehicle width direction outside portion. In the present exemplary embodiment, an angle $\theta1$ (see FIG. 26B) of the first angled portion 220A with respect to the vehicle width direction is set to 25° or below, and an angle $\theta2$ (see FIG. 26B) of the second angled portion 220B with respect to the vehicle width direction is set to angle $\theta1+15°$ or above.

Slide Spacer

The vehicle body front section structure 210 with the basic structure described above includes a slide spacer 230 serving as a spacer member. The slide spacer 230 occupies a space between the jutting-out portion 220 of the bumper reinforcement 218 and the framework member 212, and is provided (connected) to the jutting-out portion 220. The slide spacer 230 functions as a load transmission member that transmits (a portion of) rearward load, that has been input to the jutting-out portion 220, to a front portion of the front side member 214. The rearward load is transmitted as a component force toward the vehicle width direction inside to the front portion of the front side member 214.

In the present exemplary embodiment, the slide spacer 230 is configured with a higher bending strength and compression (buckling) strength than the bending strength of the front side member 214. The slide spacer 230 is thus configured to deform the front side member 214 as described later, while hardly compressing or deforming itself. Specific explanation follows thereof.

The slide spacer 230 is mainly configured by a spacer body 232, and a slide plate portion 234 that slides with respect to an outside wall 214A of the front side member 214 that faces the vehicle width direction outside. The spacer body 232 and the slide plate portion 234 have an integral configuration (are integrated together) in the slide spacer 230 in the present exemplary embodiment.

Spacer Body

A front end portion of the spacer body 232 is fastened and fixed (connected) to a back face side of the jutting-out portion 220 using fastening implements such as nuts and bolts, not illustrated in the drawings. A rear end of the spacer body 232 is connected to the slide plate portion 234, as described later. The spacer body 232 accordingly couples between the jutting-out portion 220 and the slide plate portion 234. The spacer body 232 has a closed cross-section structure as viewed in cross-section taken orthogonally to the length (substantially front-rear) direction (not illustrated in the drawings).

Specifically, the closed cross-section structure of the spacer body 232 is configured by a top wall 232T, a bottom wall 232B, an inside wall 232I, and an outside wall 232O. The inside wall 232I couples together the first angled portion 220A of the jutting-out portion 220 and a front portion of the slide plate portion 234. The outside wall 232O couples together the second angled portion 220B of the jutting-out portion 220 and a rear portion of the slide plate portion 234.

In the present exemplary embodiment, the inside wall 232I is configured by a flat plate portion forming a straight line shape oriented in a direction such that in plan view, a rear side thereof is closer to the front side member 214 than a front side, and couples together the first angled portion 220A and the front portion of the slide plate portion 234. Similarly, the outside wall 232O is configured by a flat plate portion forming a straight line shape oriented in a direction such that in plan view, a rear side thereof is closer to the front side member 214 than a front side, and couples together the second angled portion 220B and the rear portion of the slide plate portion 234.

The inside wall 232I and the outside wall 232O are set at different angles with respect to the front-rear direction, such that a separation (distance in the vehicle width direction) between their rear end sides is narrower than at the front end sides. Namely, an angle $\alpha2$ of the outside wall 232O with respect to the front-rear direction is set larger than an angle $\alpha1$ of the inside wall 232I with respect to the front-rear direction (the length direction of the framework member 212). The outside wall 232O is thus closer to the inside wall 232I at the rear side thereof than at the front side.

The angle $\alpha1$ of the present exemplary embodiment is set such that an angle $\beta1$ formed between the back face of the first angled portion 220A and the inside wall 232I is from 90° to 105°. The angle $\alpha2$ is set such that an angle $\beta2$ formed between the back face of the second angled portion 220B and the outside wall 232O is from 75° to 90°.

Note that in the present exemplary embodiment, the outside wall 232O extends further to the rear than the inside wall 232I, and the position of the rear end thereof in the vehicle width direction is aligned with the position of the rear end of the inside wall 232I in the vehicle width direction. The rear end of the spacer body 232 is thereby open toward the vehicle width direction inside.

Slide Plate Portion

The slide plate portion 234 is configured in a flat plate shape, and is connected to the rear end of the spacer body 232 so as to face the outside wall 214A of the front side member 214 across a gap in the vehicle width direction. The slide plate portion 234 closes off the opening at the rear end of the spacer body 232. Note that the slide plate portion 234 may be configured to have projecting walls projecting out toward the vehicle width direction outside from peripheral edges of the flat plate.

The slide plate portion 234 of the present exemplary embodiment is not restrained with respect to the front side member 214. Namely, the slide spacer 230 is not restrained with respect to the front side member 214. Accordingly, configuration is made so as to permit sliding of the slide spacer 230 with respect to the front side member 214 when rearward load acts on the jutting-out portion 220.

Slide Spacer Summary

In the slide spacer 230 described above, the inside wall 232I configuring the spacer body 232 corresponds to a second wall of the present invention, and the outside wall 232O corresponds to a third wall of the present invention. The slide plate portion 234 of the slide spacer 230 corresponds to a first wall of the present invention.

Operation

Next, explanation follows regarding operation of the eleventh exemplary embodiment.

First, explanation follows regarding operation in a collision mode in which a barrier Br that is a colliding body collides principally on the left side, this being one side in the vehicle width direction of the vehicle applied with the vehicle body front section structure 210. A small overlap collision, or a diagonal collision (oblique collision), are examples of such a collision mode.

Note that a small overlap collision is a frontal vehicle collision, defined for example by IIHS as a collision in which the extent of overlap with the collision counterpart is 25% or less of the vehicle width direction. For example, a collision at the vehicle width direction outside of the front side member 214 that is a vehicle body frame (located at a position of 75% of the total vehicle width) corresponds to a small overlap collision. In the present exemplary embodiment, an example of a small overlap collision at a relative speed of 64 km/hr. is envisaged. A diagonal collision is, for example, defined by NHTSA as being in a diagonal direction (for example, at a relative angle of 15° with respect to the collision counterpart, with the extent of the overlap being approximately 35% of the vehicle width direction). In the present exemplary embodiment, an example of a diagonal collision at a respective speed of 90 km/hr. is envisaged.

Explanation follows regarding an example of a small overlap collision.

Figure 27A:
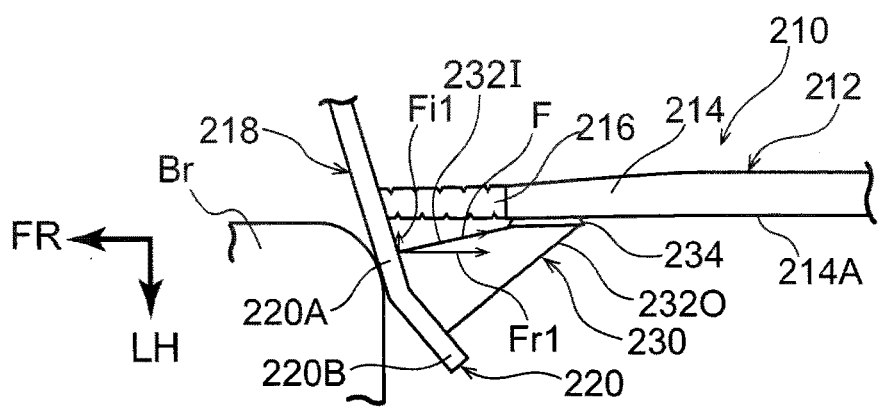
FIG. 27A is a plan view to explain an energy absorption process by a vehicle body front section structure according to the eleventh exemplary embodiment, illustrating an initial stage of a collision.

In a small overlap collision of the vehicle applied with the vehicle body front section structure 210 configured as described above, the first angled portion 220A of the jutting-out portion is input with rearward collision load F. When the jutting-out portion 220 bends due to the collision load, as illustrated in FIG. 27A, the slide plate portion 234 of the slide spacer 230 abuts the outside wall 214A of the front side member 214. The collision load F input to the jutting-out portion 220 is thereby transmitted to the front side member 214 through the slide spacer 230.

Namely, the jutting-out portion 220 of the bumper reinforcement 218 is supported from the rear by the slide spacer 230 and the front side member 214, and folding of the jutting-out portion 220 at the fixing location to the crash box 216 is prevented or effectively suppressed. Specifically, the collision load F is transmitted along the inside wall 232I that has a small angle α1 with respect to the front-rear direction, and so a component force Fi1 toward the vehicle width direction inside is small. The component force Fi1 is accordingly supported by the rigidity (reaction force) of the front side member 214. However, a component force Fr1 of the rearward collision load F is transmitted to the crash box 216.

Figure 27B:
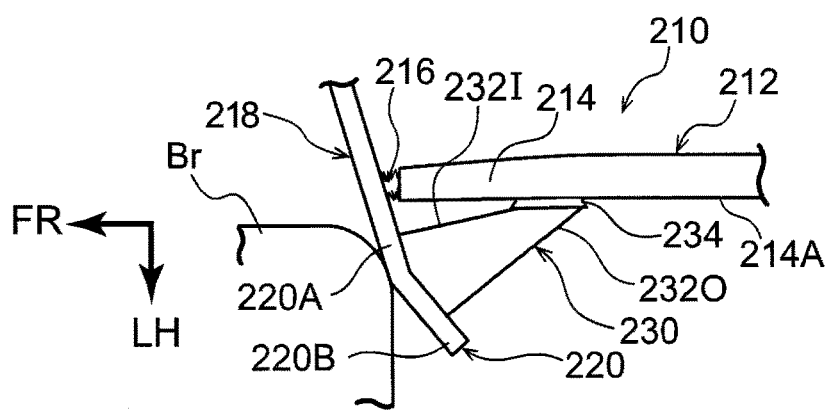
FIG. 27B is a plan view to explain an energy absorption process by a vehicle body front section structure according to the eleventh exemplary embodiment, illustrating a compression deformed state of a crash box.

When this occurs, as illustrated in FIG. 27B, the slide plate portion 234 of the slide spacer 230 slides (moves toward the rear while in contact) with respect to the front side member 214 while the crash box 216 undergoes compression deformation. The slide spacer 230 accordingly permits compression of the crash box 216 while a load transmission location is moved toward the rear, without the front side member 214 folding. Namely, the slide spacer 230 is prevented or effectively suppressed from affecting the energy absorption stroke of the crash box 216.

Figure 27C:
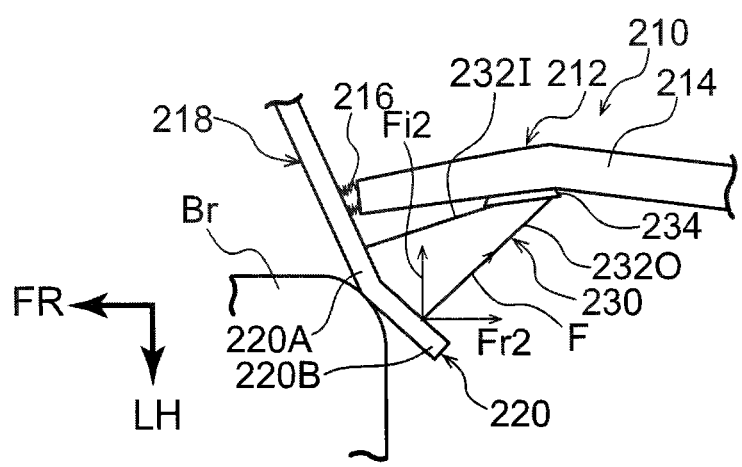
FIG. 27C is a plan view to explain an energy absorption process by a vehicle body front section structure according to the eleventh exemplary embodiment, illustrating a state in which a front side member is starting to fold.

When the crash box 216 has undergone compression deformation to its energy absorption limit, load is also input from the barrier Br to the second angled portion 220B of the jutting-out portion 220 due to the incursion amount of the barrier Br increasing as illustrated in FIG. 27C. Note that in the jutting-out portion 220, the angle θ2 of the second angled portion 220B is set larger than the angle θ1 of the first angled portion. The direction of the collision load F is accordingly more toward the vehicle width direction inside than when load is input to the first angled portion 220A. More specifically, the collision load F can be efficiently transmitted to the front side member 214 along the outside wall 232O (as axial force).

Since the angle α2 of the outside wall 232O with respect to the front-rear direction is greater than the angle α1 of the inside wall 232I, a component force Fr2 of the rearward collision load F is smaller than the component force Fr1, and a component force Fi2 toward the vehicle width direction inside is larger than the component force Fi1. The front side member 214 folds toward the vehicle width direction inside as a result of transmitting the vehicle width direction inside component force Fi2 to a specific location (the contact position of the slide plate portion 234 that has finished sliding).

Figure 27D:
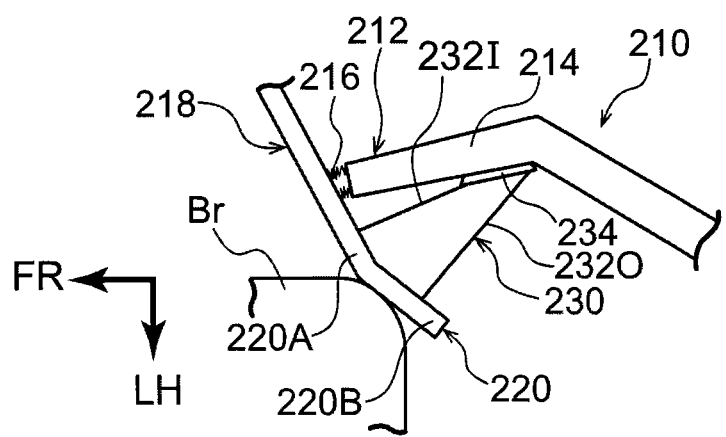
FIG. 27D is a plan view to explain an energy absorption process by a vehicle body front section structure according to the eleventh exemplary embodiment, illustrating a state in which folding of a front side member has progressed.

As illustrated in FIG. 27D, energy absorption is exhibited from the intermediate stage to the final stage of the collision due to the folding of the front side member 214 (load (reaction force) continues to be generated accompanying energy absorption). Namely, collision energy is continuously absorbed by folding of the front side member 214, until the front side member 214 has completely folded.

In the vehicle body front section structure 210 according to the eleventh exemplary embodiment, collision load to the jutting-out portion 220 can be efficiently transmitted to the front side member 214 while suppressing adverse impact on the energy absorption stroke of the crash box 216.

Load dispersion through the power unit P may be anticipated when the folded front side member 214 impinges on the power unit P during energy absorption. Moreover, the component force Fi2 input to the power unit P, that is one of sections where mass is concentrated in the vehicle, moves the vehicle itself toward the opposite side to collision side, such that a reduction in input load may be anticipated due to promoting passing of the vehicle with the barrier Br.

Modified Examples of the Jutting-Out Portion

Figure 28:
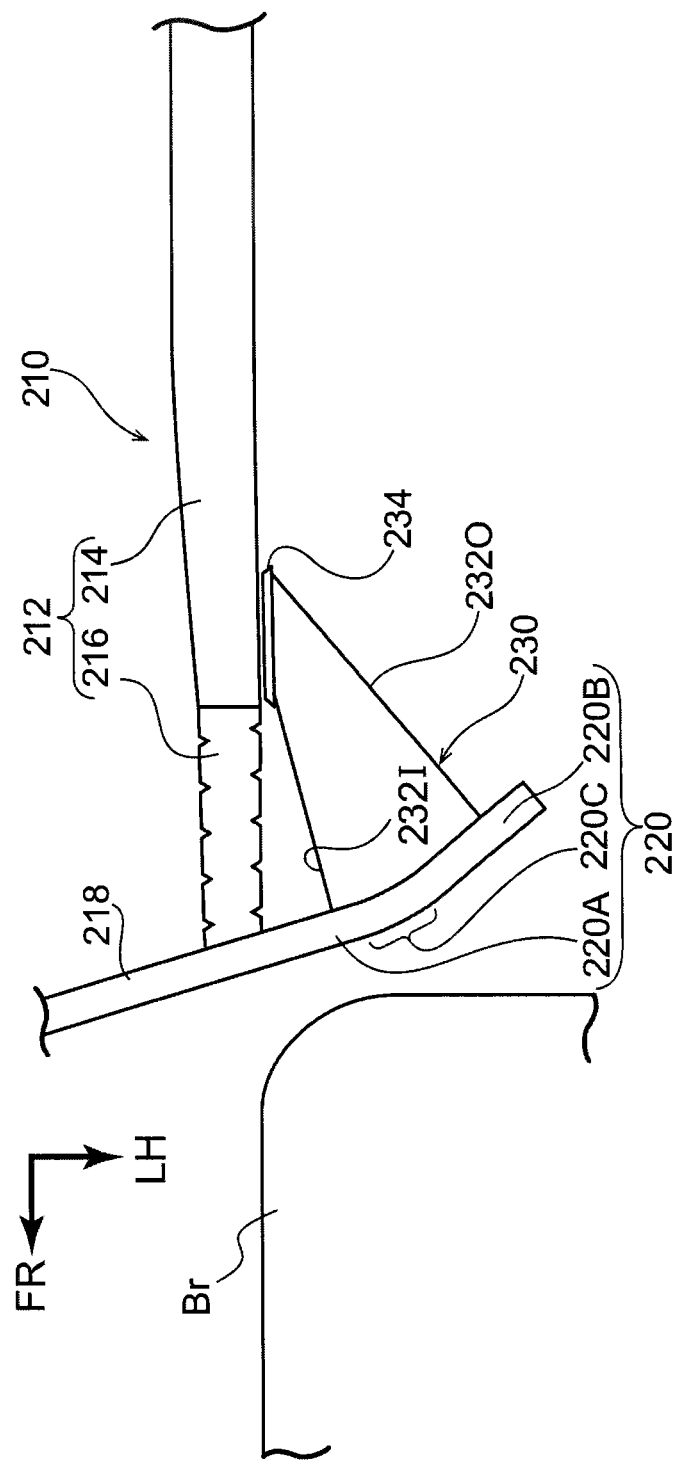
FIG. 28 is a plan view illustrating a modified example of bumper reinforcement configuring a vehicle body front section structure of the eleventh exemplary embodiment.

In the eleventh exemplary embodiment described above, an example is given in which the jutting-out portion 220 has a bent structure in plan view; however the present invention is not limited thereto. For example, as illustrated in FIG. 28, the jutting-out portion 220 may have a rounded shape portion 220C with a curved shape connects the first angled portion 220A and the second angled portion 220B. This modified example also has basically the same operation as the eleventh exemplary embodiment, thereby enabling similar advantageous effects.

Although not illustrated in the drawings, the bumper reinforcement 218 may be formed in an arc shape (curved shape) forming a protrusion toward the front in plan view. In such a configuration, the curvature of the jutting-out portion may be increased further at the outside than at a vehicle width direction inner side, or the entire jutting-out portion may have uniform curvature. Namely, similar operation and advantageous effects to those of the eleventh exemplary embodiment can be consistently exhibited, as long as a tangent to a vehicle width direction outside portion of the jutting-out portion has a larger angle with respect to the vehicle width direction than a tangent to a vehicle width direction inside portion.

Modified Example of the Slide Spacer

Figure 29:
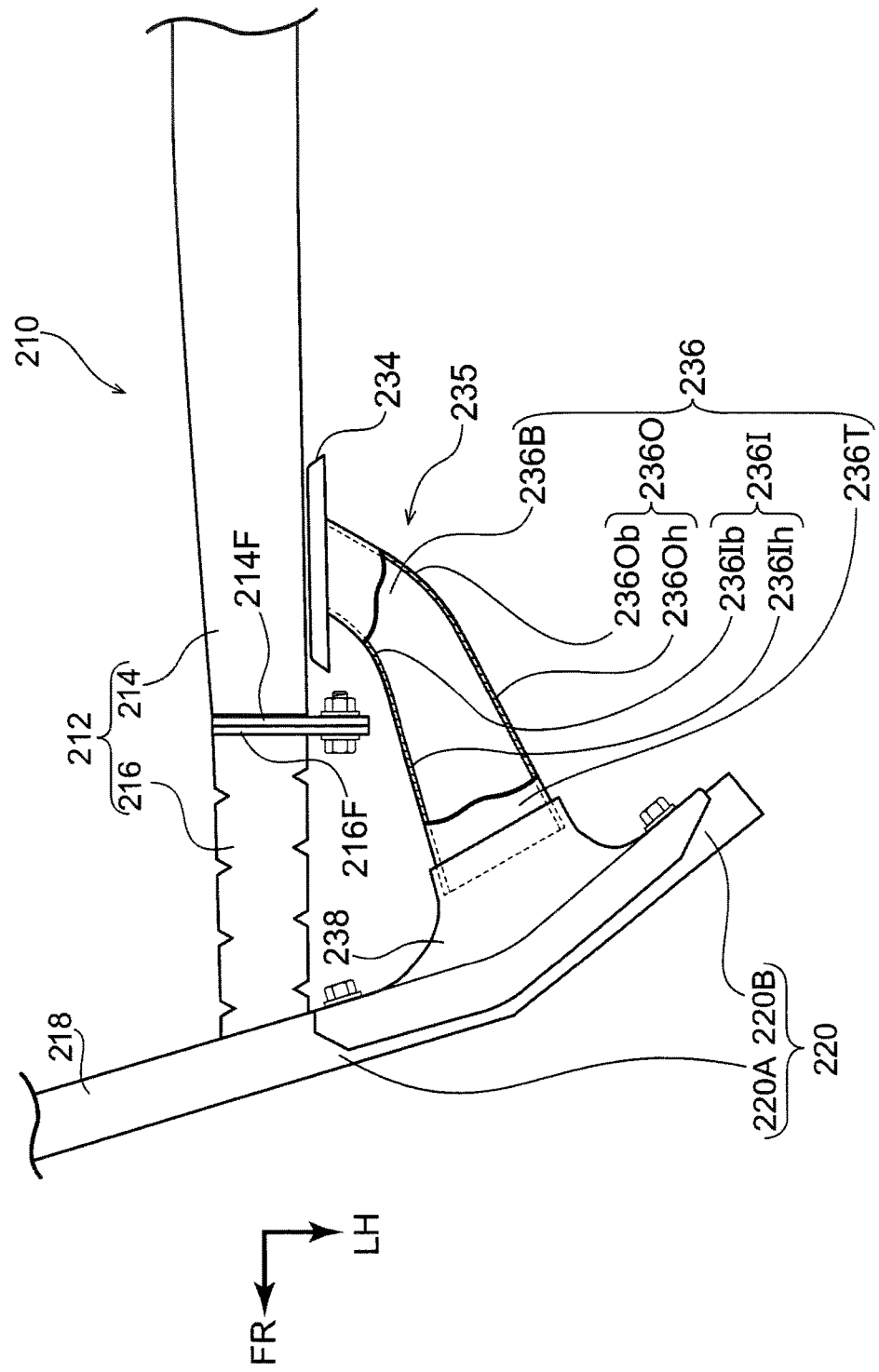
FIG. 29 is a partially cut away plan view illustrating a modified example of a slide spacer configuring a vehicle body front section structure of the eleventh exemplary embodiment.

In the eleventh exemplary embodiment, an example is given in which the inside wall 232I and the outside wall 232O are configured from flat plates with straight line shapes along their entire lengths in plan view; however the present invention is not limited thereto. For example, as illustrated in FIG. 29, a slide spacer 235 may be employed that has a spacer body 236 including curved portions at an inside wall 236I and an outside wall 236O.

Specifically, the slide spacer 235 according to this modified example is configured including the spacer body 236, a slide plate portion 234, and a fixing member 238 that fixes the spacer body 236 to the jutting-out portion 220. The spacer body 236 is configured with a closed cross-section structure by a top wall 236T, a bottom wall 236B, the inside wall 236I, and the outside wall 236O. The inside wall 236I couples together the first angled portion 220A of the jutting-out portion 220 and a front end of the slide plate portion 234, and the outside wall 236O couples together the second angled portion 220B of the jutting-out portion 220 and a rear end of the slide plate portion 234.

The inside wall 236I is configured with a flat plate portion 236Ih that has a straight line shape oriented in a direction such that in plan view, a rear side thereof is closer to the front side member 214 than a front side, and a curved plate portion 236Ib that is curved so as to be positioned further toward the vehicle width direction inside (front side) than an imaginary extension line (not illustrated in the drawings) of the flat plate portion 236Ih toward the rear. Similarly, the outside wall 236O is configured with a flat plate portion 236Oh that has a straight line shape and is inclined greater than the flat plate portion 236Ih in plan view, and a curved plate portion 236Ob that is curved so as to be positioned further toward the vehicle width direction inside (front side) than an imaginary extension line (not illustrated in the drawings) of the flat plate portion 236Oh toward the rear. The slide spacer 235 is thereby configured such that the outside wall 236O is closer to the inside wall 236I at the rear side thereof than at the front side at least at a front portion of the spacer body 236.

The fixing member 238 is fixed to a front end of the spacer body 236 by fastening, welding, or the like in a state covering the entire periphery of the spacer body 236, and is fixed to the jutting-out portion 220 by, for example, fastening a flange formed at a front end side.

This modified example has basically the same operation as the eleventh exemplary embodiment, thereby enabling similar advantageous effects. In a configuration provided with the slide spacer 235 according to this modified example, rear portions of the inside wall 236I and outside wall 236O are configured by the curved plate portions 236Ib, 236Ob, thus enabling the slide spacer 235 to be disposed without impinging on other components. For example, in the example illustrated in FIG. 29, the front side member 214 and the crash box 216 are connected together by flanges 214F, 216F provided jutting out toward the vehicle width direction outside at mutual connection end sides thereof. In the slide spacer 235 of the present modified example, the slide plate portion 234 can face the front side member 214 at an appropriate location while curling around the flanges 214F, 216F to. Although not illustrated in the drawings, configuration may also be made so as to avoid impinging on ducts laid out inside the engine compartment.

Twelfth Exemplary Embodiment

Figure 30:
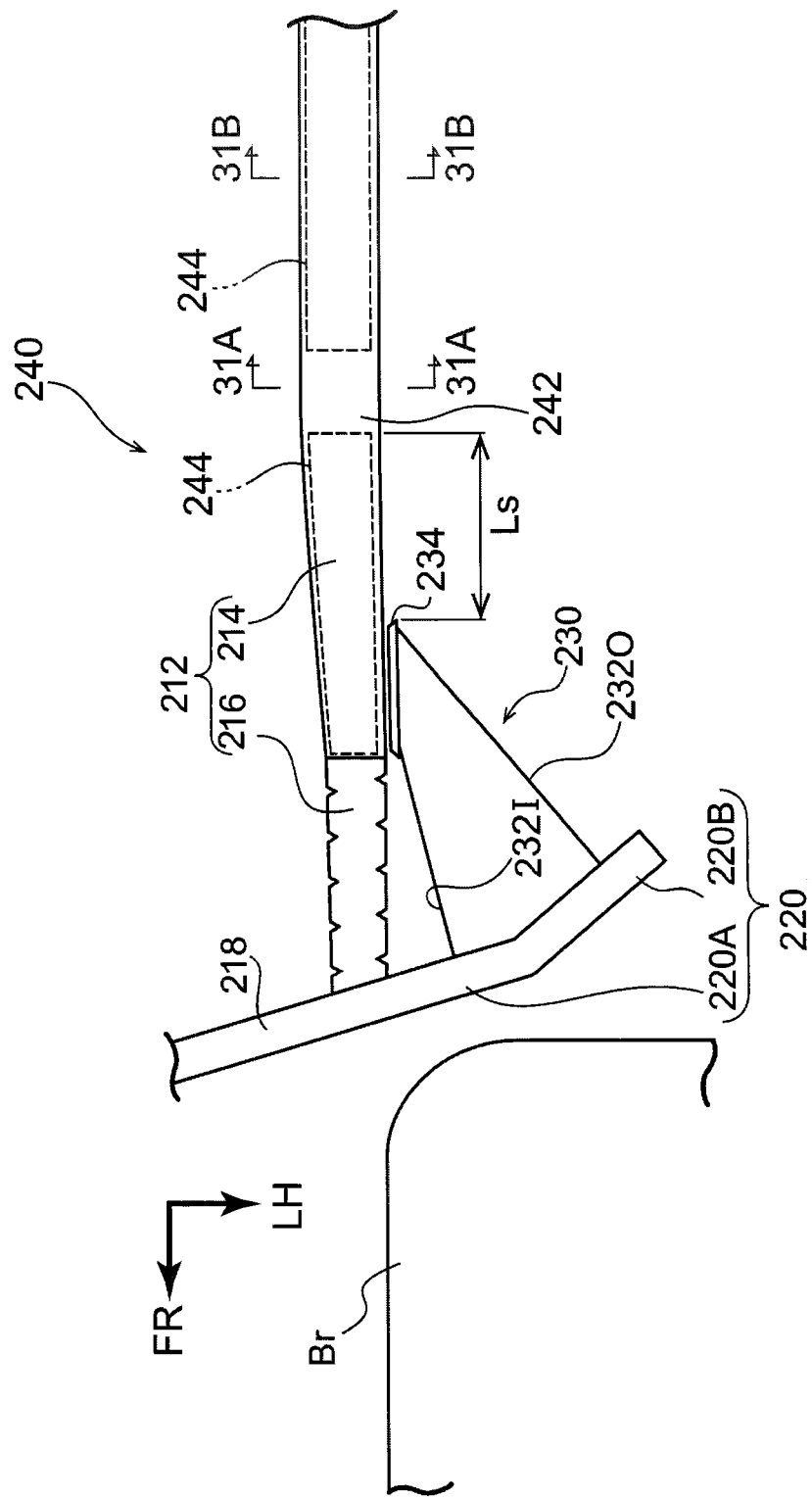
FIG. 30 is a plan view illustrating relevant portions of a vehicle body front section structure according to a twelfth exemplary embodiment.
Figure 31A:
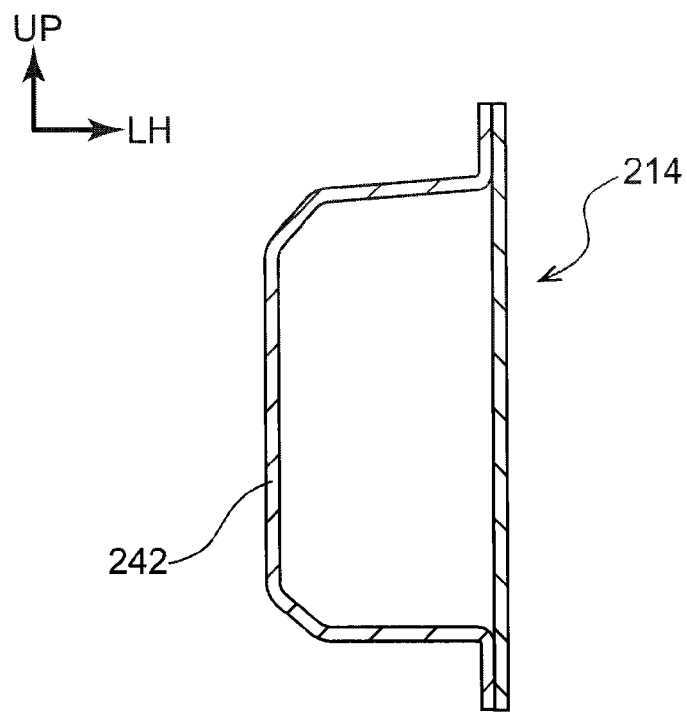
FIG. 31A is a cross-section taken along line 31A-31A in FIG. 30, and illustrates a vehicle body front section structure according to the twelfth exemplary embodiment.
Figure 31B:
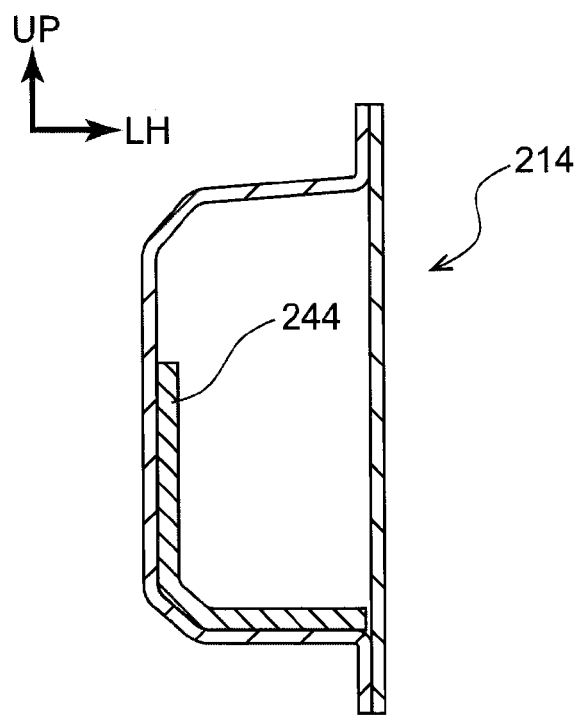
FIG. 31B is a cross-section taken along line 31B-31B in FIG. 30, and illustrates a vehicle body front section structure according to the twelfth exemplary embodiment.

Next, explanation follows regarding a twelfth exemplary embodiment, with reference to FIG. 30 to FIG. 31B. Note that configurations basically the same as those of the eleventh exemplary embodiment are allocated the same reference numerals as the configurations of the eleventh exemplary embodiment, and explanation and illustration thereof may be omitted.

FIG. 30 is a perspective view illustrating relevant portions of a vehicle body front section structure 240. The vehicle body front section structure 240 differs from the eleventh exemplary embodiment in that a low strength portion 242, set with a lower strength than other portions with respect to load (bending) toward the vehicle width direction inside, is formed at a portion of the front side member 214 in the front-rear direction.

The low strength portion 242 is disposed at a position where a distance Ls to the low strength portion 242 from the location of the front side member 214 facing the slide plate portion 234 of the slide spacer 230 is the same as the energy absorption stroke of the crash box 216. The front side member 214 is configured with the low strength portion 242 at a location where load is transmitted from the slide plate portion 234 after energy absorption by the crash box 216.

The low strength portion 242 of the present exemplary embodiment is configured as a non-reinforced portion. Specifically, as illustrated in FIG. 30 and FIG. 31B, reinforcement 244 is laid out along the length direction of the front side member 214 at general portions that locate other than the low strength portion. As illustrated in FIG. 30 and FIG. 31A, the reinforcement 244 is omitted at the low strength portion 242. Accordingly, the low strength portion 242 has lower strength than the general portions of the front side member 214. Note that with respect to axial direction compression, the front side member 214 formed with the low strength portion 242 secures the required bearing strength with respect to load transmission (support) in a full overlap frontal collision. Other configurations of the vehicle body front section structure 240, including portions not illustrated, are similar to the corresponding configurations in the vehicle body front section structure 210 according to the eleventh exemplary embodiment.

The vehicle body front section structure 240 has basically the same operation as the vehicle body front section structure 210 according to the eleventh exemplary embodiment, thereby enabling similar advantageous effects. Moreover, due to forming the low strength portion 242 to the front side member 214, the component load Fi2 toward the vehicle width direction inside is transmitted from the slide spacer 230 to the low strength portion 242 after energy absorption by the crash box 216. The front side member 214 accordingly folds around the low strength portion 242, enabling stable energy absorption (to be continued). Namely, there is improved robustness with respect to folding of the front side member 214.

Thirteenth Exemplary Embodiment

Next, explanation follows regarding a thirteenth exemplary embodiment, with reference to FIG. 32 to FIG. 34B. Note that configurations basically the same as those of the eleventh exemplary embodiment are allocated the same reference numerals as the configurations of the eleventh exemplary embodiment, and explanation and illustration thereof may be omitted.

Figure 32:
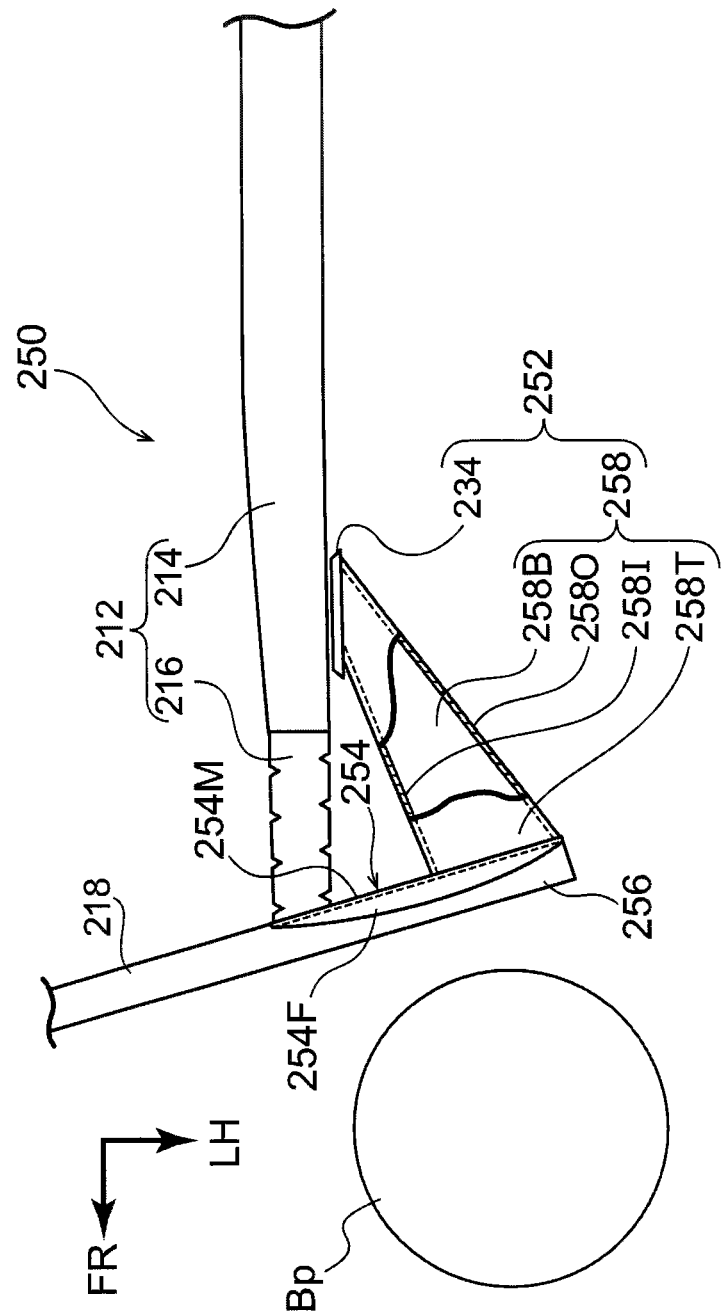
FIG. 32 is a partially cut away plan view illustrating relevant portions of a vehicle body front section structure according to a thirteenth exemplary embodiment.

FIG. 32 is a plan view illustrating relevant portions of a vehicle body front section structure 250. The vehicle body front section structure 250 differs from the eleventh exemplary embodiment in the provision of a plate member 254 that couples together a front end of the framework member 212 and a front end of a slide spacer 252. In the vehicle body front section structure 250, the shape of a vehicle width direction end portion of the bumper reinforcement 218, namely the shape of a jutting-out portion 256, differs from that of the jutting-out portion 220, and there is a corresponding difference between the shape of the slide spacer 252 and the shape of the slide spacer 230.

First, explanation follows regarding the jutting-out portion 256. The jutting-out portion 256 is formed in a straight line shape at a uniform angle with respect to the vehicle width direction. Note that the jutting-out portion 256 (bumper reinforcement 218) may also be formed with a gently curving arc shape. The slide spacer 252 extends from a vehicle width direction outside portion of the jutting-out portion 256 toward the front side member 214. Specifically, the slide spacer 252 is mainly configured by a spacer body 258, and a slide plate portion 234 connected to a rear end of the spacer body 258.

A front end portion of the spacer body 258 is fastened and fixed (connected) to a back face side of the jutting-out portion 256 by fasteners such as nuts and bolts, not illustrated in the drawings. The spacer body 258 has a closed cross-section structure configured by a top wall 258T, a bottom wall 258B, an inside wall 258I, and an outside wall 258O. The inside wall 258I is configured by a straight line shaped flat plate portion oriented in a direction such that in plan view, a rear side thereof is closer to the front side member 214 than a front side. The inside wall 258I couples together a vehicle width direction intermediate portion of the jutting-out portion 256 and a front portion of the slide plate portion 234. The outside wall 258O is configured by a straight line shaped flat plate portion oriented at a greater angle than the inside wall 258I in plan view. The outside wall 258O couples together a vehicle width direction outside end portion of the jutting-out portion 256 and a rear portion of the slide plate portion 234.

Due to the above configuration, the slide spacer 252 is configured such that the outside wall 258O is closer to the inside wall 258I at the rear side thereof than at the front side.

Figure 33A:
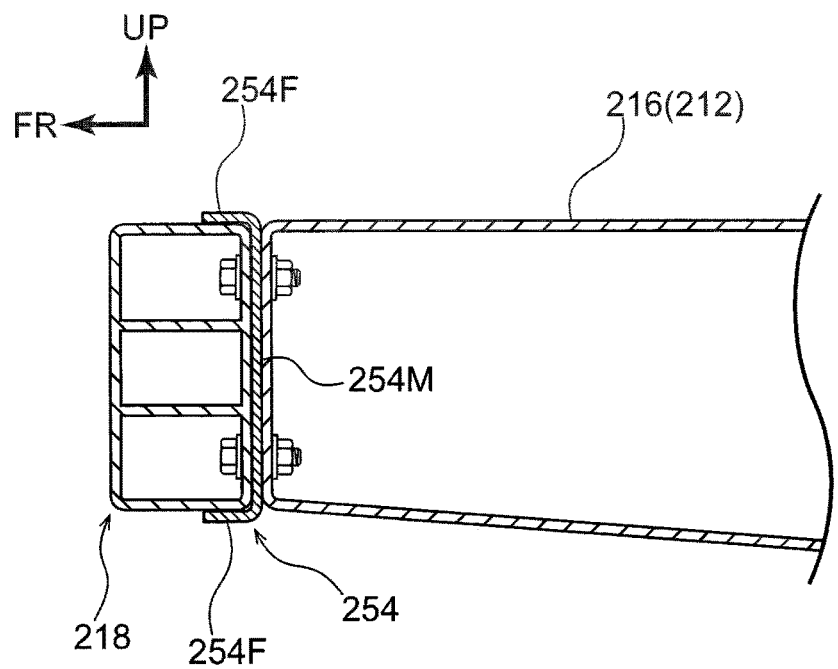
FIG. 33A is a cross-section illustrating a vehicle body front section structure according to the thirteenth exemplary embodiment.
Figure 33B:
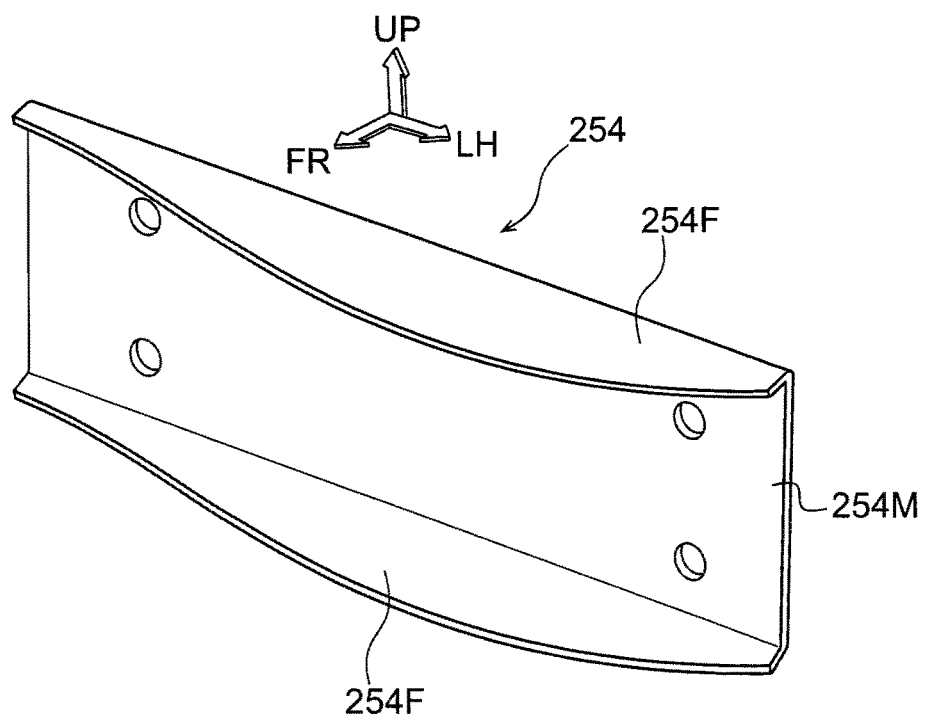
FIG. 33B is a perspective view illustrating a plate member of a vehicle body front section structure according to the thirteenth exemplary embodiment.

As illustrated in FIG. 33A and FIG. 33B, the plate member 254 includes a plate body 254M, and a pair of upper and lower flanges 254F extending from upper and lower edge portions of the plate body 254M toward the front, such that the plate member 254 forms an angular C-shaped cross-section open toward the front. A vehicle width direction inside end portion of the plate member 254 is fixed to the crash box 216 and the bumper reinforcement 218 in an interposed state of the plate body 254M between the crash box 216 and the bumper reinforcement 218. A fixing structure using nuts and bolts is employed in the embodiment illustrated.

Although not illustrated in the drawings, a vehicle width direction outside end portion of the plate member 254 is fixed to the slide spacer 252 and the jutting-out portion 256 in a state in which the plate body 254M is interposed between the slide spacer 252 and the jutting-out portion 256. In this fixed state, the upper and lower flanges 254F cover a portion of the bumper reinforcement 218 (jutting-out portion 256) from above and below.

Operation

Next, explanation follows regarding operation of the thirteenth exemplary embodiment.

In a small overlap collision, with the exception of operation and advantageous effects obtained by the first angled portion 220A and the second angled portion 220B of the jutting-out portion 220, the vehicle body front section structure 250 configured as described above has basically the same operation as the vehicle body front section structure 210 according to the eleventh exemplary embodiment, thereby enabling similar advantageous effects.

Explanation follows regarding operation in a collision between a vehicle width direction end portion of a vehicle applied with the vehicle body front section structure 250 and a pole barrier Bp, with reference to FIGS. 34A to 34D.

Figure 34A:
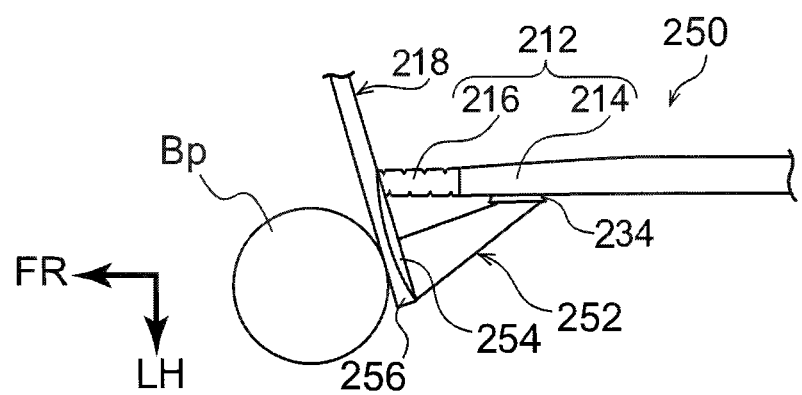
FIG. 34A is a plan view to explain an energy absorption process by a vehicle body front section structure according to the thirteenth exemplary embodiment, illustrating an initial stage of a collision.

When the vehicle width direction end portion of the vehicle applied with the vehicle body front section structure 250 configured as described above is involved in a collision with the pole barrier Bp, the jutting-out portion 256 is input with rearward collision load F. When the jutting-out portion 256 bends due to the collision load, as illustrated in FIG. 34A, the slide plate portion 234 of the slide spacer 252 abuts the outside wall 214A of the front side member 214. The collision load that has been input to the jutting-out portion 256 is accordingly transmitted to the front side member 214 through the slide spacer 252.

Namely, the jutting-out portion 256 of the bumper reinforcement 218 is supported from the rear by the slide spacer 252 and the front side member 214, such that folding at the fixing location to the crash box 216 is prevented or effectively suppressed. Specifically, the collision load F is transmitted along the inside wall 258I, and a component force Fi1 of the collision load F toward the vehicle width direction inside is supported by the bending rigidity (reaction force) of the front side member 214. A component force Fr1 of the rearward collision load F is transmitted to the crash box 216.

Figure 34B:
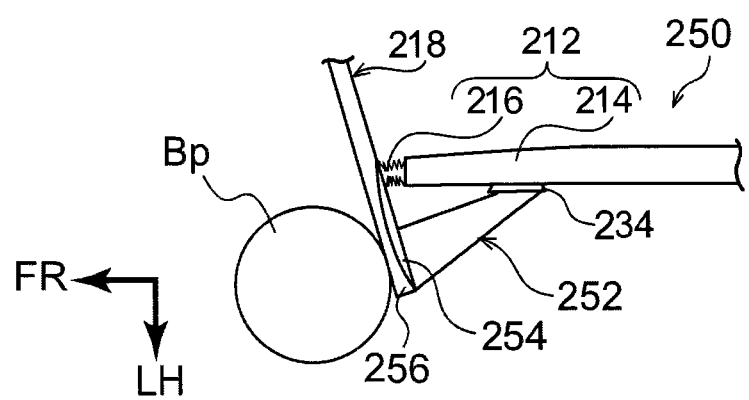
FIG. 34B is a plan view to explain an energy absorption process by a vehicle body front section structure according to the thirteenth exemplary embodiment, illustrating a compression deformed state of a crash box.

When this occurs, as illustrated in FIG. 34B, the slide plate portion 234 of the slide spacer 252 slides (moves toward the rear while in contact) with respect to the front side member 214 while the crash box 216 undergoes compression deformation. The slide spacer 252 thereby permits compression of the crash box 216 while the load transmission location moves toward the rear without the front side member 214 folding. Namely, the slide spacer 252 is prevented or effectively suppressed from affecting the energy absorption stroke of the crash box 216.

Figure 34C:
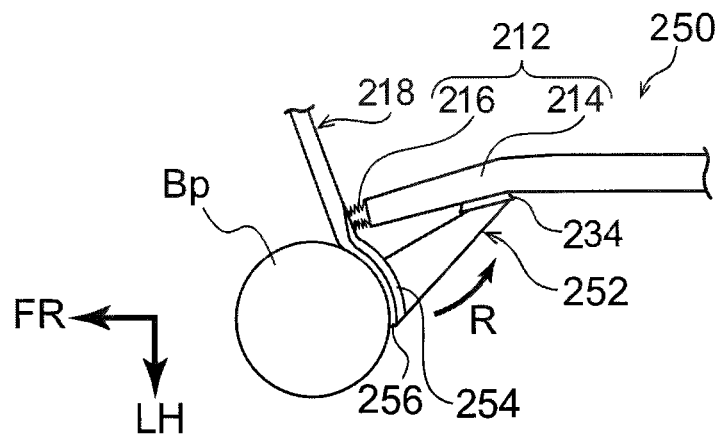
FIG. 34C is a plan view to explain an energy absorption process by a vehicle body front section structure according to the thirteenth exemplary embodiment, illustrating a state in which a front side member is starting to fold.

Moreover, when the crash box 216 has undergone compression deformation up to its energy absorption limit, as illustrated in FIG. 34C, the plate member 254 undergoes relative rotation in the direction of arrow R while deforming around the pole barrier Bp either together with the jutting-out portion 256, or independently, following breakage of the jutting-out portion 256. Namely, even supposing the jutting-out portion 256 were to break as a result of localized input, the plate member 254 still transmits a component force toward the vehicle width direction inside through the outside wall 258O of the slide spacer 252 to the front side member 214. When this occurs, the slide spacer 252 pushes the front side member 214 toward the vehicle width direction inside at the contact position of the slide plate portion 234, thereby folding the front side member 214 toward the vehicle width direction inside.

Figure 34D:
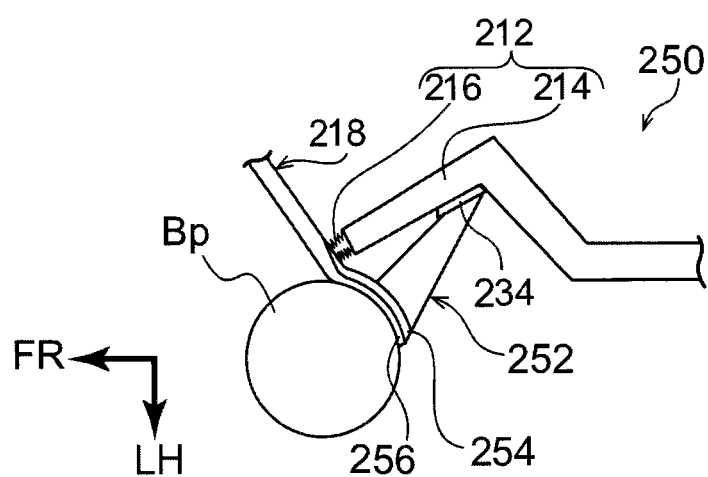
FIG. 34D is a plan view to explain an energy absorption process by a vehicle body front section structure according to the thirteenth exemplary embodiment, illustrating a state in which folding of a front side member has progressed.

As illustrated in FIG. 34D, energy absorption is exhibited from the intermediate stage to the final stage of the collision due to this folding of the front side member 214 (load F continues to be generated accompanying energy absorption). Namely, collision energy is continuously absorbed by folding of the front side member 214, until the front side member 214 has completely folded.

The vehicle body front section structure 250 according to the thirteenth exemplary embodiment thereby enables load from the collision with the jutting-out portion 256 to be efficiently transmitted to the front side member 214, while suppressing adverse impact on the energy absorption stroke of the crash box 216.

Note that in each of the exemplary embodiments and modified examples above, explanation has been giving regarding the advantageous effects exhibited in a small overlap collision or a collision with the pole barrier Bp. However, in the event of a diagonal collision (oblique collision), each of the exemplary embodiments and modified examples exhibit similar advantageous effects to those in a small overlap collision.

In the respective exemplary embodiments and modified examples described above, examples have been illustrated in which the vehicle body front section structure is symmetrical about a vehicle width direction center line; however the present invention is not limited thereto. For example, configuration according to the present invention may be employed on one side in the vehicle width direction. In such cases, for example, measures against small overlap collisions and diagonal collisions at the other side in the vehicle width direction may be implemented by other structures.

Moreover, in the respective exemplary embodiments and modified examples described above, examples have been illustrated in which the slide plate portion 234 of the slide spacer 230, 235, 252 is not restrained with respect to the front side member 214. However, the present invention is not limited thereto. For example, the slide plate portion 234 may be restrained with respect to the front side member 214 by a restraint structure in which the restraint is released when collision load is input to the jutting-out portion. In such cases, the face of the slide plate portion 234 facing toward the vehicle width direction inside may face the outside wall 214A of the front side member 214 (without making contact), or may be configured so as to contact the outside wall 214A. Configurations provided with a restraint structure enable vibration of the slide spacer to be suppressed during normal travel. Moreover, for example, configuration may be made such that the slide plate portion 234 of the slide spacer 230 contacts the outside wall 214A without being restrained with respect to the front side member 214.

Moreover, in the eleventh to thirteenth exemplary embodiments and the modified examples thereof described above, examples have been described that include the framework member 212 configured by coupling together the front side member 214 and the crash box 216; however the present invention is not limited thereto. For example, configuration may be made with a front side member that is not provided with a crash box, but that is configured at a front end side with an energy absorption section with lower compression strength than other portions.

Note that in the first to the eighth exemplary embodiments, examples have been described that include the bumper reinforcement 18 provided with the extension 24; however the present invention is not limited thereto. For example, in the first to the eighth exemplary embodiments, configuration may be made including the bumper reinforcement 166 that does not include the extension 24. Similarly, in the ninth and tenth exemplary embodiments, examples have been described that include the bumper reinforcement 166 that does not include the extension 24; however the present invention is not limited thereto. In the ninth and tenth exemplary embodiments, configuration may be made including the bumper reinforcement 18 that includes the extension 24.

In the first to the eighth exemplary embodiments, examples have been described that include the framework member 12, 154 configured by coupling the crash box 16, 158 to the front side member 14, 156. However, the present invention is not limited thereto. For example, in the first to the eighth exemplary embodiments, configuration may be made including the front side member 164 that does not include a crash box. Similarly, in the ninth and tenth exemplary embodiments, examples have been described that include the front side member 164 that does not include a crash box. However the present invention is not limited thereto. For example, in the ninth and the tenth exemplary embodiments, configuration may be made including the framework member 12, 154 that is configured by coupling the crash box 16, 158 to the front side member 14, 156.

In the first to the eighth exemplary embodiments, examples have been described in which the slide spacer 30, 62, 102, 122, 132, 142, 152 is disposed on the connection location J side with respect to the rotation trajectory T; however the present invention is not limited thereto. Namely, it is sufficient that the slide spacer 30 etc. is configured so as to be capable of transmitting load from the jutting-out portion 20 to the front side member 14 etc. while the slide spacer 30 etc. slides with respect to the front side member 14, 164. Accordingly, for example, configuration may be made in which the slide spacer 30 etc. is disposed at a position that could impinge on the front wheel Wf accompanying compression of the crash box 16.

In the third to the eighth exemplary embodiments, examples have been described in which the slide spacer 30, 102, 122, 132, 142, 152 faces the front side member 14 across the gap C, similarly to in the first exemplary embodiment. However, the present invention is not limited thereto. For example, a structure such as that of the second exemplary embodiment, in which the slide spacer is coupled to the front side member 14 such that the coupling can be released by input in a small overlap collision, may be applied to the slide spacer 30, 102, 122, 132, 142, 152 described above.

In the respective exemplary embodiments described above, examples have been described in which the vehicle body front section structure 10, 60, 80, 100, 120, 130, 140, 150, 160, 170 is provided with spacer members (slide spacers) at the jutting-out portions 20 on both vehicle width direction sides; however the present invention is not limited thereto. For example, the slide spacer 30, 102, 122, 132, 142, 152, or the spacer member 162, 172, 174, 176 may be provided to the jutting-out portion 20 on only one side in the vehicle width direction. In such cases, the side not provided with the slide spacer or spacer member may employ a vehicle-mounted component in conjunction with a slide member, or may adopt another structure as a small overlap collision countermeasure.

In the respective exemplary embodiments described above, examples have been described in which the present invention is applied to the vehicle body front section structure 10, 60, 80, 100, 120, 130, 140, 150, 160, 170; however the present invention is not limited thereto. For example, the present invention may be applied to a vehicle body rear section structure.

Obviously various other modifications to the invention as respectively described above may be implemented within a range not departing from the spirit of the invention.

The invention claimed is:

1. A vehicle body end section structure comprising:
a framework member that is long in a vehicle front-rear direction, that comprises an energy absorption section at a front end side in the vehicle front-rear direction, and that is disposed offset with respect to center in the vehicle width direction;
a jutting-out portion that is formed at a bumper framework section connected to a vehicle front end of the framework member, that juts out further to the vehicle width direction outside than the framework member, and that is shaped such that a vehicle width direction outside portion of the jutting-out portion is positioned further to the vehicle rear than a vehicle width direction inside portion of the jutting-out portion;
a first wall that faces an outside face, that looks outward in the vehicle width direction, of the framework member across a gap, or that contacts the outside face;
a second wall that couples together a back face of the jutting-out portion and a vehicle front-rear direction front side portion of the first wall; and
a third wall that is provided at the vehicle width direction outside of the second wall, that is angled or curved such that a vehicle front-rear direction rear side of the third wall is positioned to be closer to the second wall than a vehicle front-rear direction front side of the third wall, and that couples together a back face of the jutting-out portion and a vehicle front-rear direction rear side portion of the first wall.

2. The vehicle body end section structure of claim 1, wherein:
the jutting-out portion is shaped, in plan view, to include a first angled portion angled with respect to the vehicle width direction such that a vehicle width direction outside of the first angled portion is positioned further to the vehicle front-rear direction rear side than a vehicle width direction inside, and a second angled portion disposed at the vehicle width direction outside of the first angled portion, at a greater angle with respect to the vehicle width direction than the first angled portion;
the second wall couples together a back face of the first angled portion and the vehicle front side portion of the first wall; and
the third wall couples together a back face of the second angled portion and the vehicle rear side portion of the first wall.

3. The vehicle body end section structure of claim 1, further comprises a plate member including a portion at a vehicle width direction inside, the portion is interposed at a connection location between a front end of the framework member and the bumper framework section, and the plate member further includes another portion at a vehicle width direction outside, the other portion is interposed between a back face of the jutting-out portions and the second wall and third wall.

4. The vehicle body end section structure of claim 1, wherein:
a low strength portion, having lower strength with respect to bending load than other portions, is formed at the framework member at a position offset toward the rear from the facing location or contact location of the first wall, by an amount of an energy absorption stroke of the energy absorption section.

5. The vehicle body end section structure of claim 1, wherein:
at least front portions in the vehicle front-rear direction of the second wall and the third wall are formed by flat plate portions with a straight line shape in plan view.

6. The vehicle body end section structure of claim 1, wherein: an end portion of a spacer member on a framework member side is separated from the framework member.

* * * * *